Feb. 15, 1938.   R. A. SCHAFER ET AL   2,108,779
MULTIPLE MACHINE TOOL
Filed Aug. 15, 1933   21 Sheets-Sheet 6
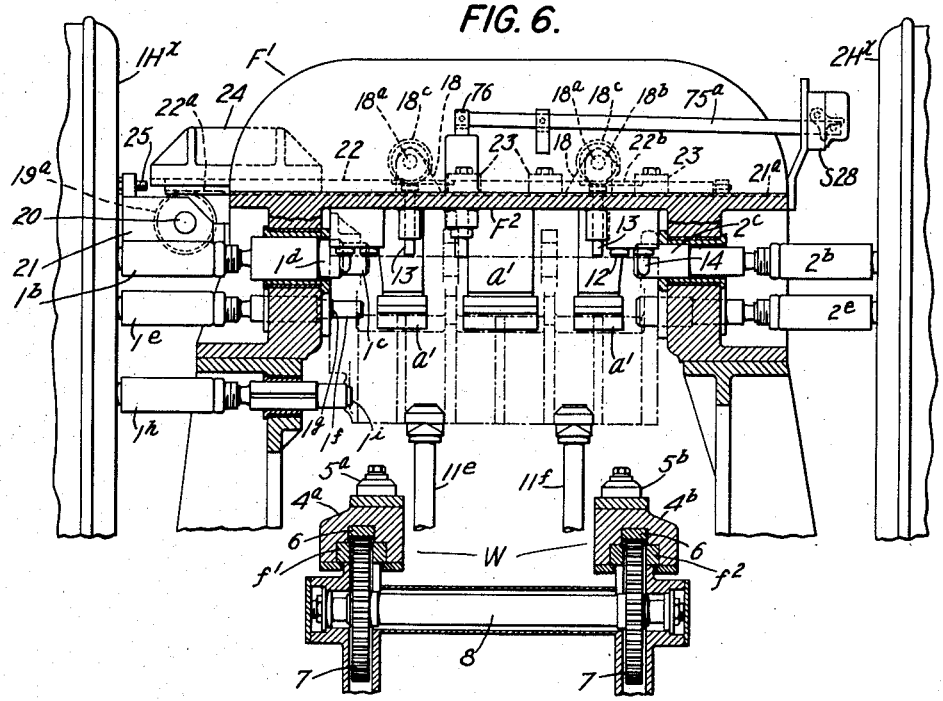
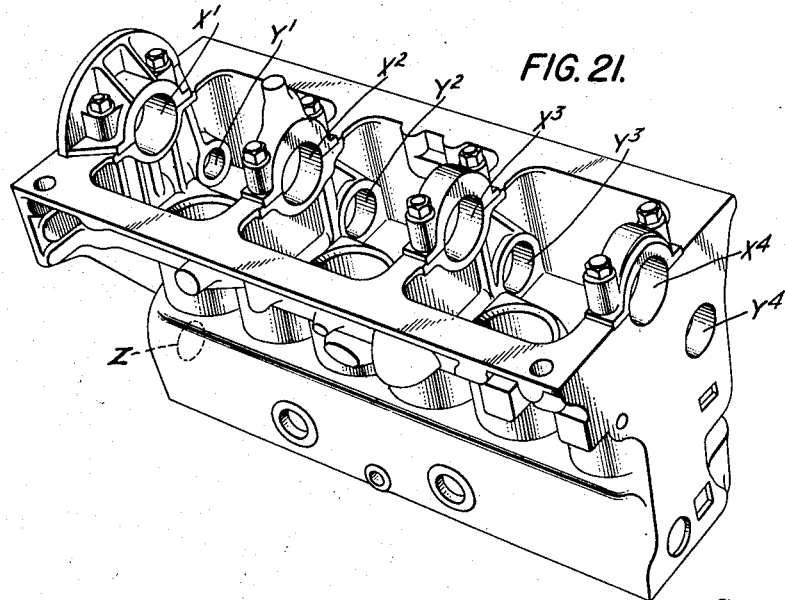
Inventors
ROBERT A. SCHAFER
CHARLES H. MUHL
EARL E. OPEL
JOHN B. BEISSMAN
By Attorneys
Nathan, Bowman & Helfrich Feb. 15, 1938.    R. A. SCHAFER ET AL    2,108,779
MULTIPLE MACHINE TOOL
Filed Aug. 15, 1933    21 Sheets-Sheet 7

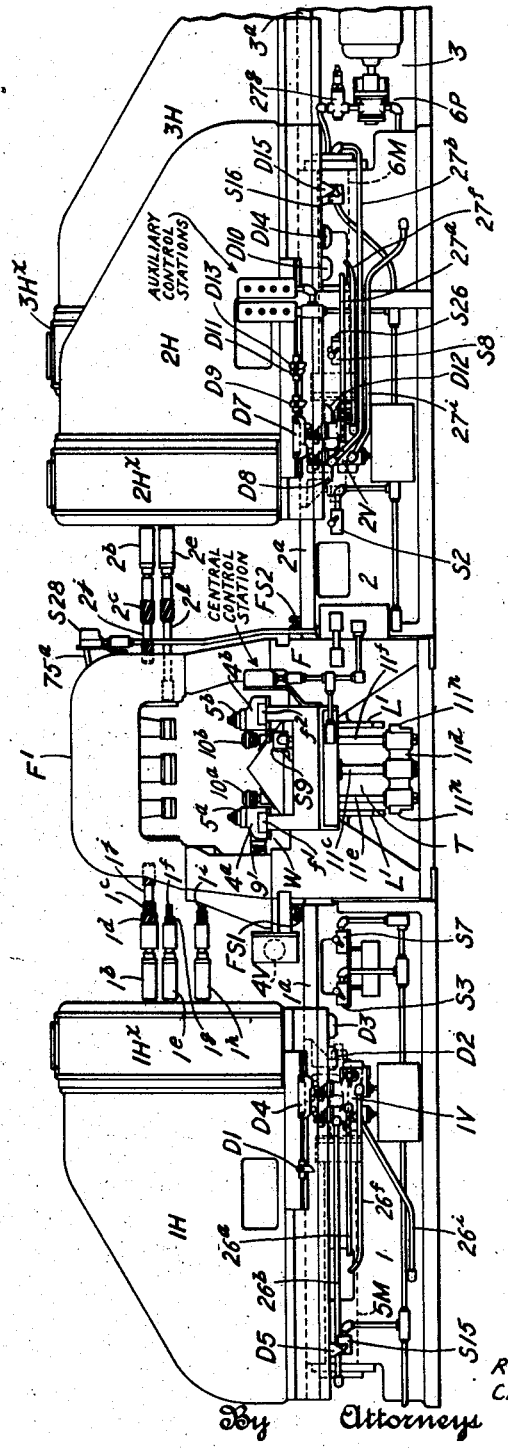

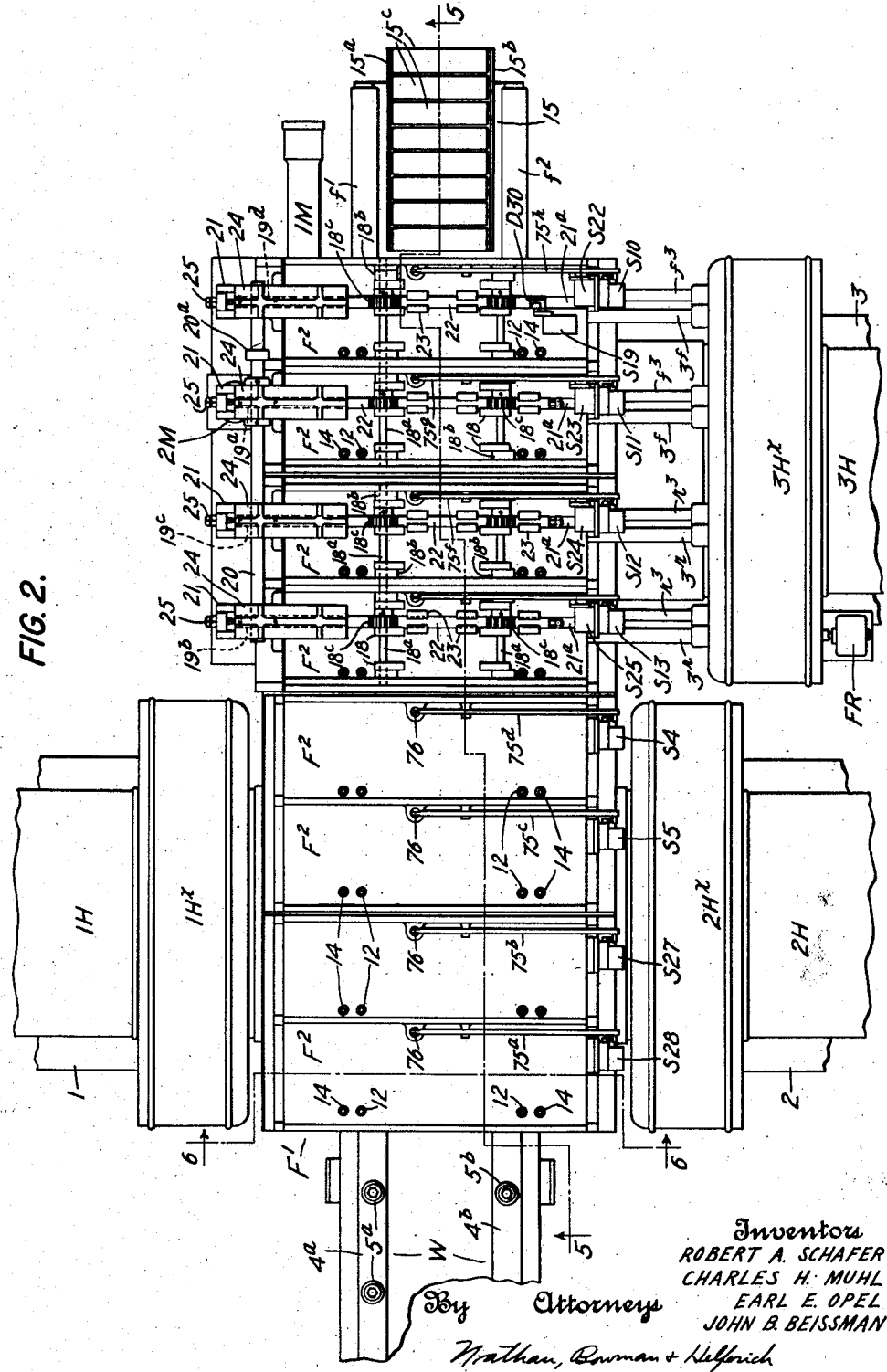

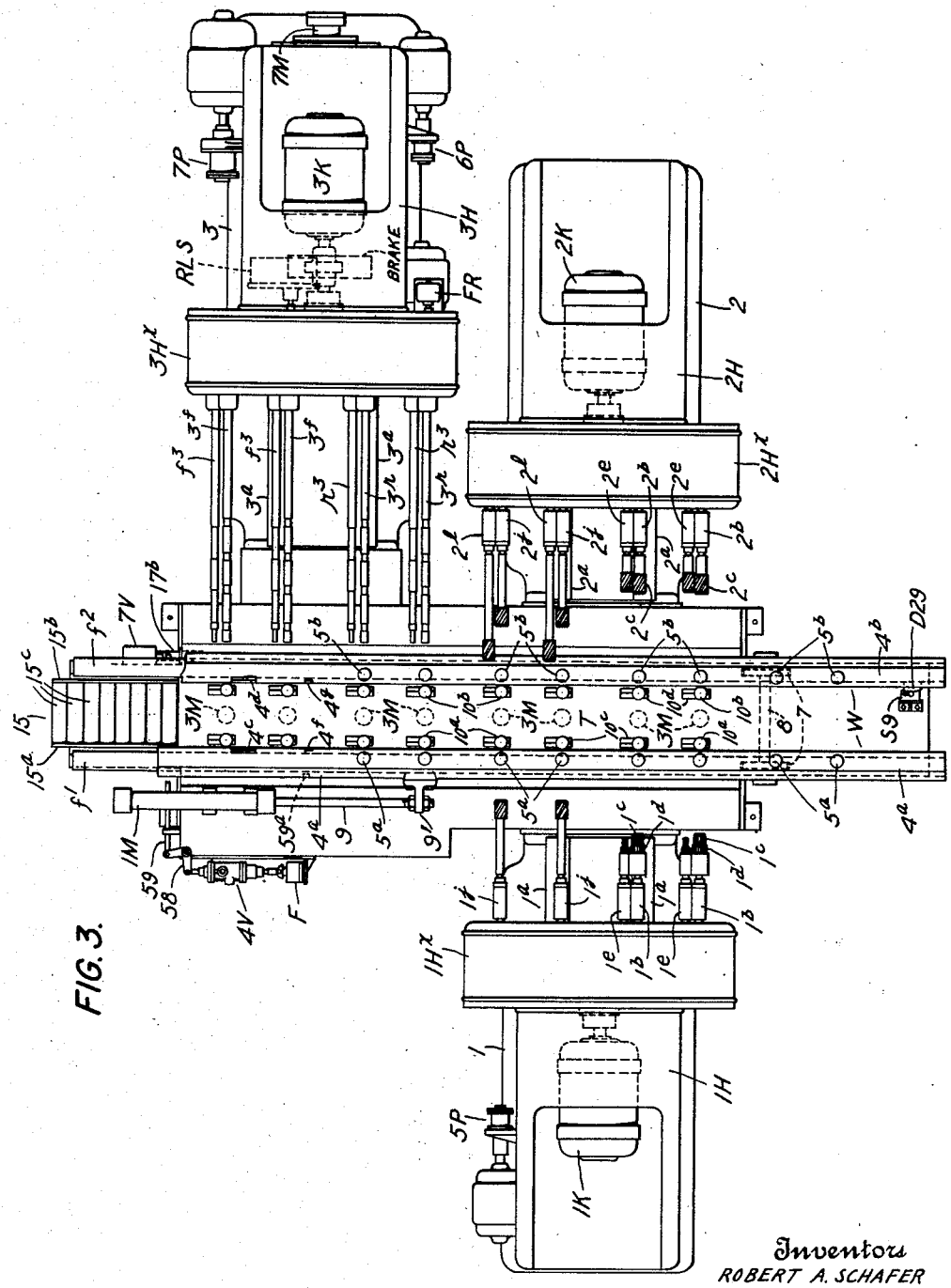

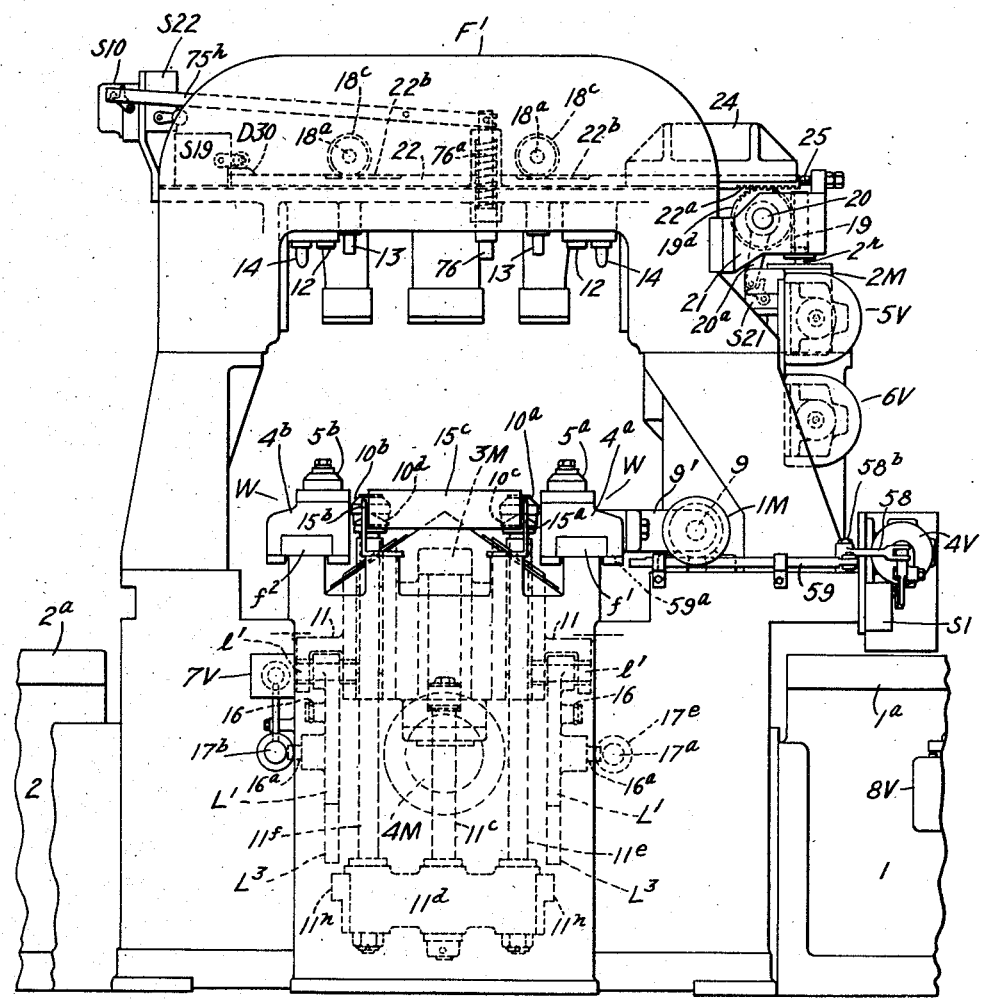

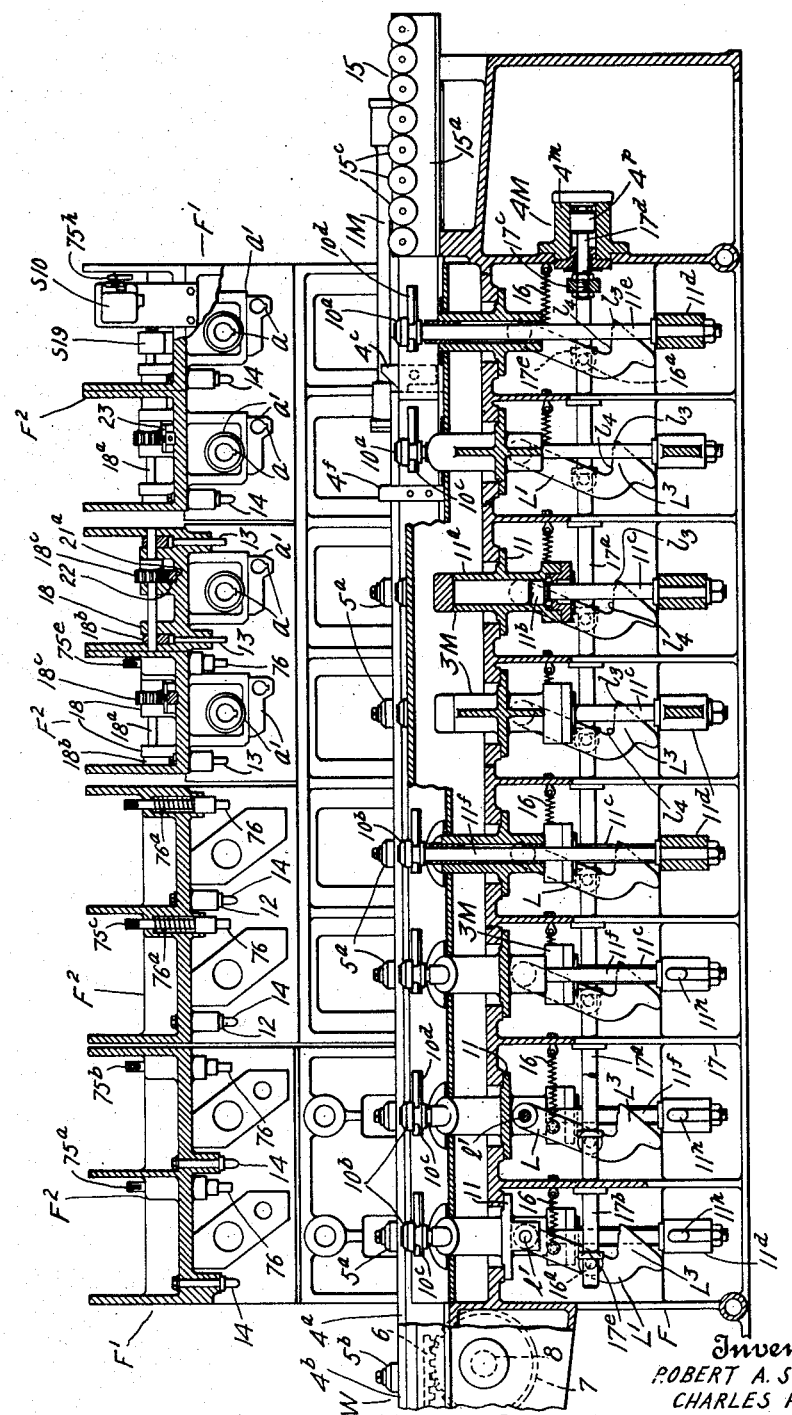

Inventors
ROBERT A. SCHAFER
CHARLES H. MUHL
EARL E. OPEL
JOHN B. BEISSMAN
By Nathan, Bowman & Helfrich Attorneys Feb. 15, 1938.    R. A. SCHAFER ET AL    2,108,779
MULTIPLE MACHINE TOOL
Filed Aug. 15, 1933    21 Sheets-Sheet 8
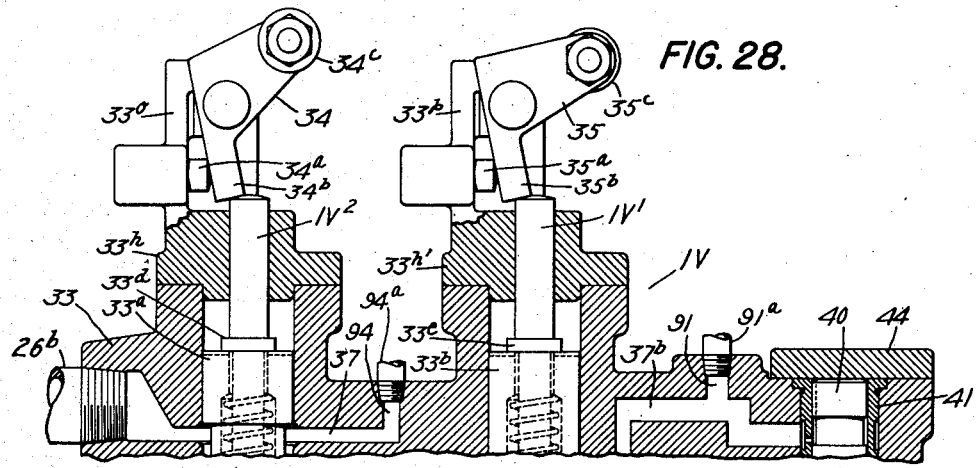
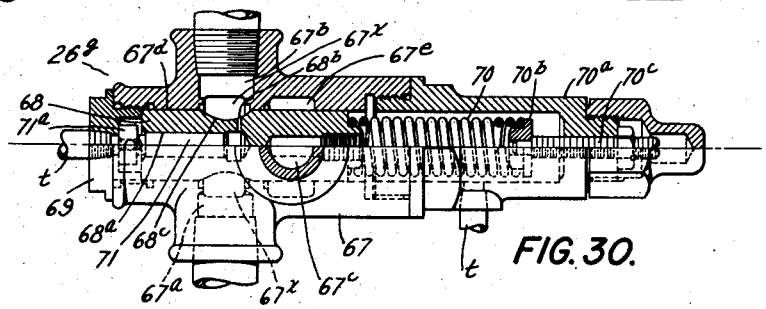
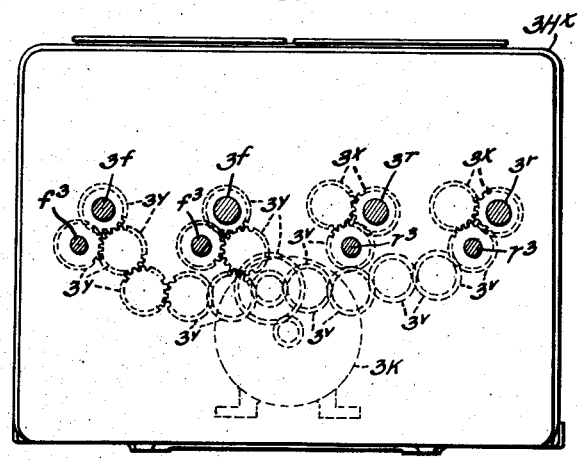
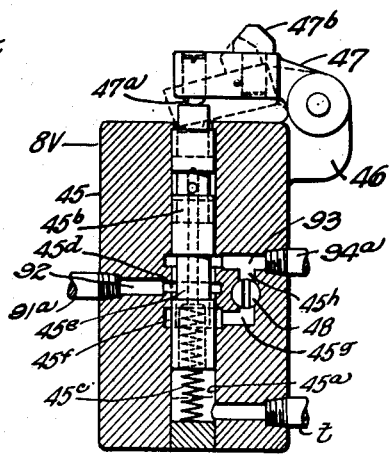
Inventors
ROBERT A. SCHAFER
CHARLES H. MUHL
EARL E. OPEL
JOHN B. BEISSMAN
By Nathan, Bowman + Helfrich
Attorneys

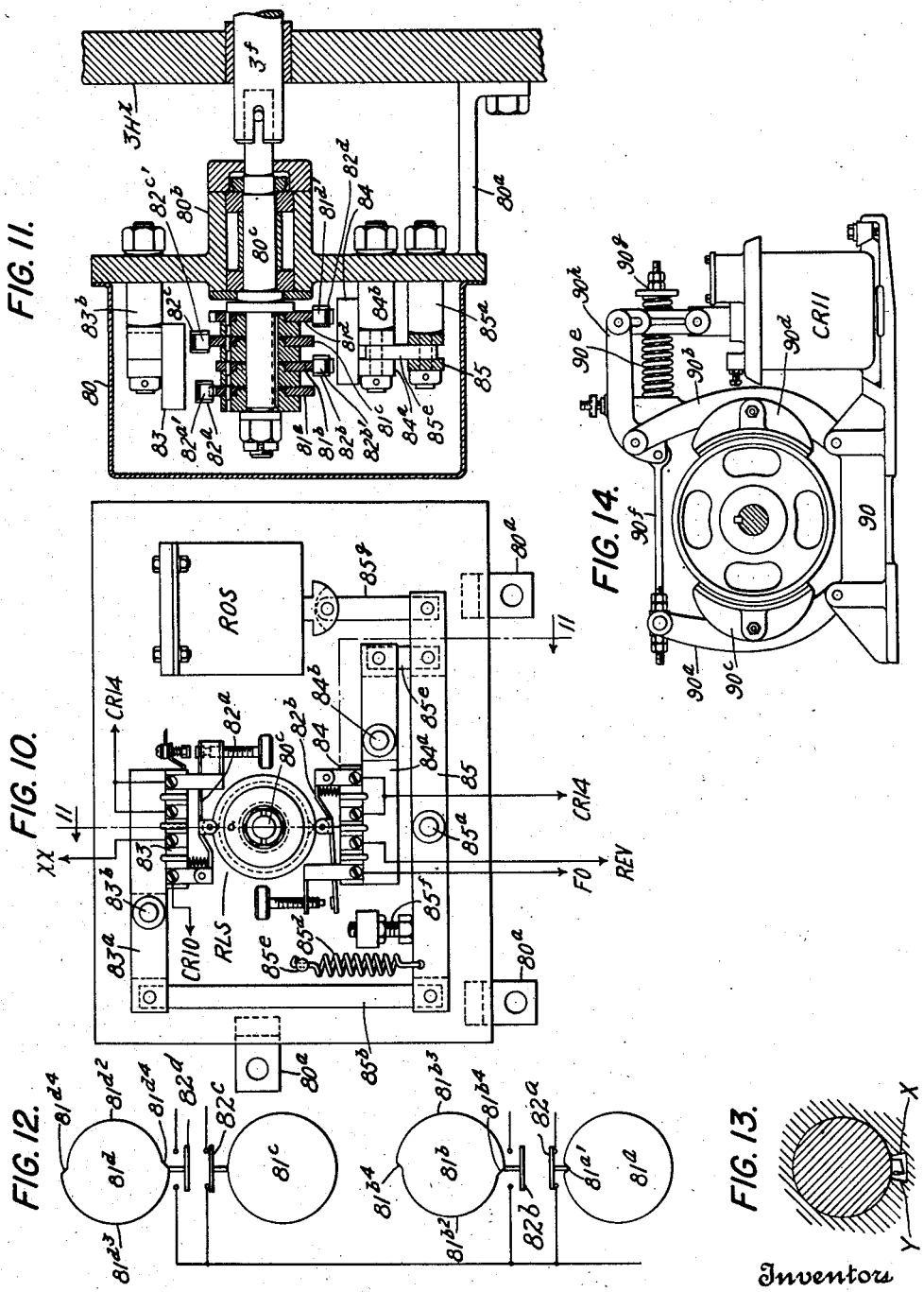

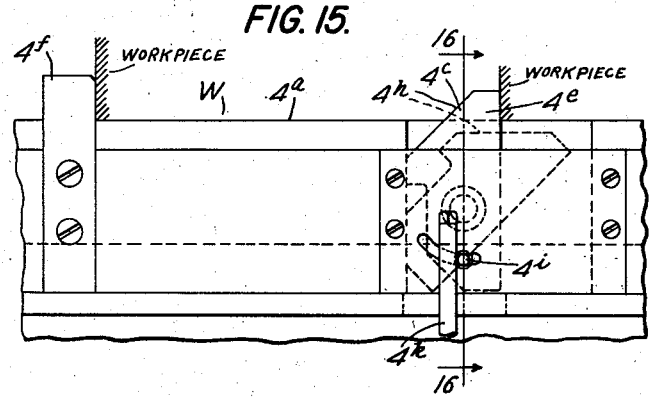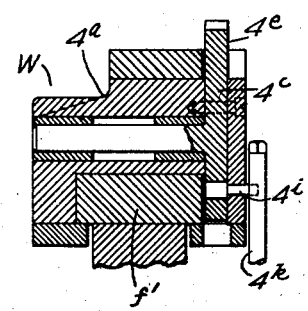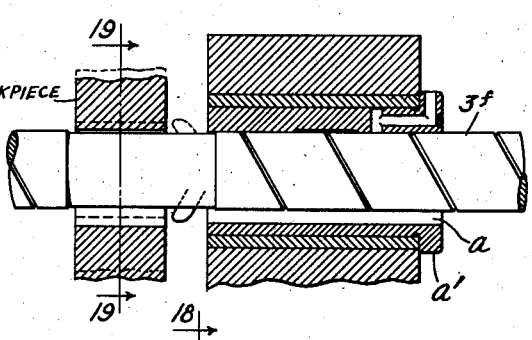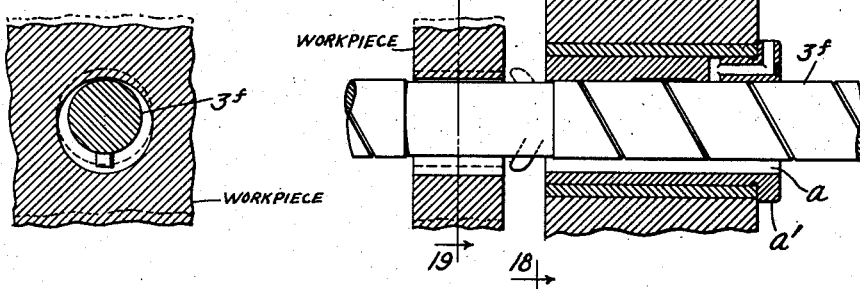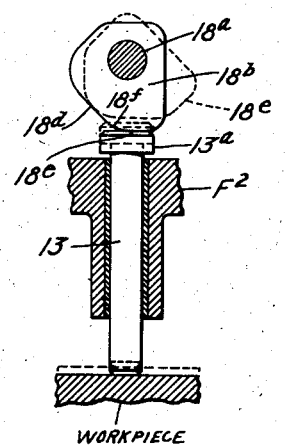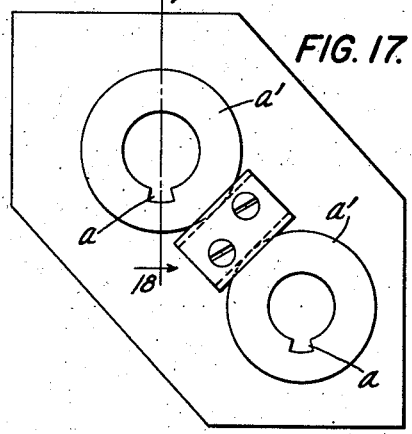

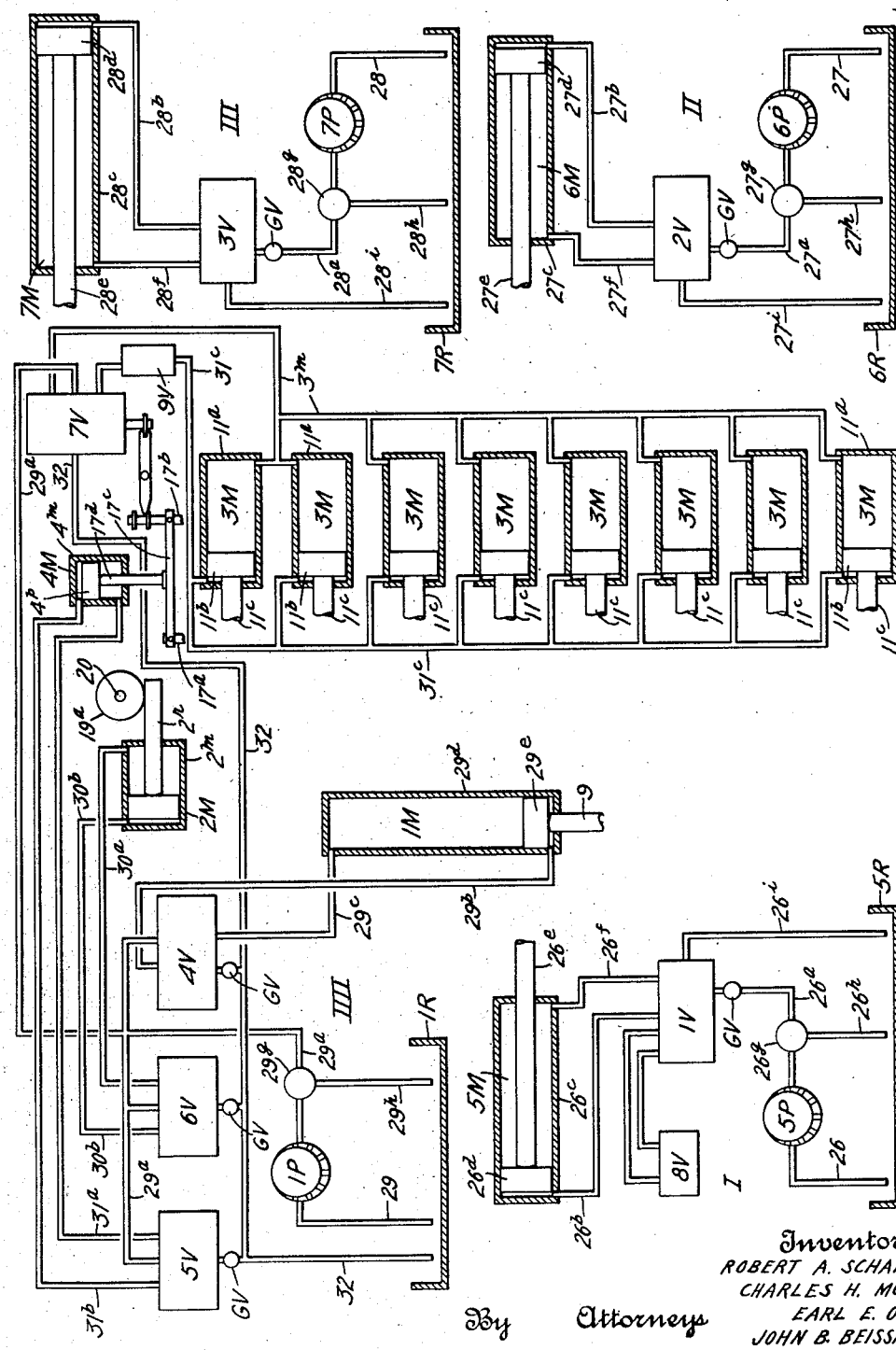

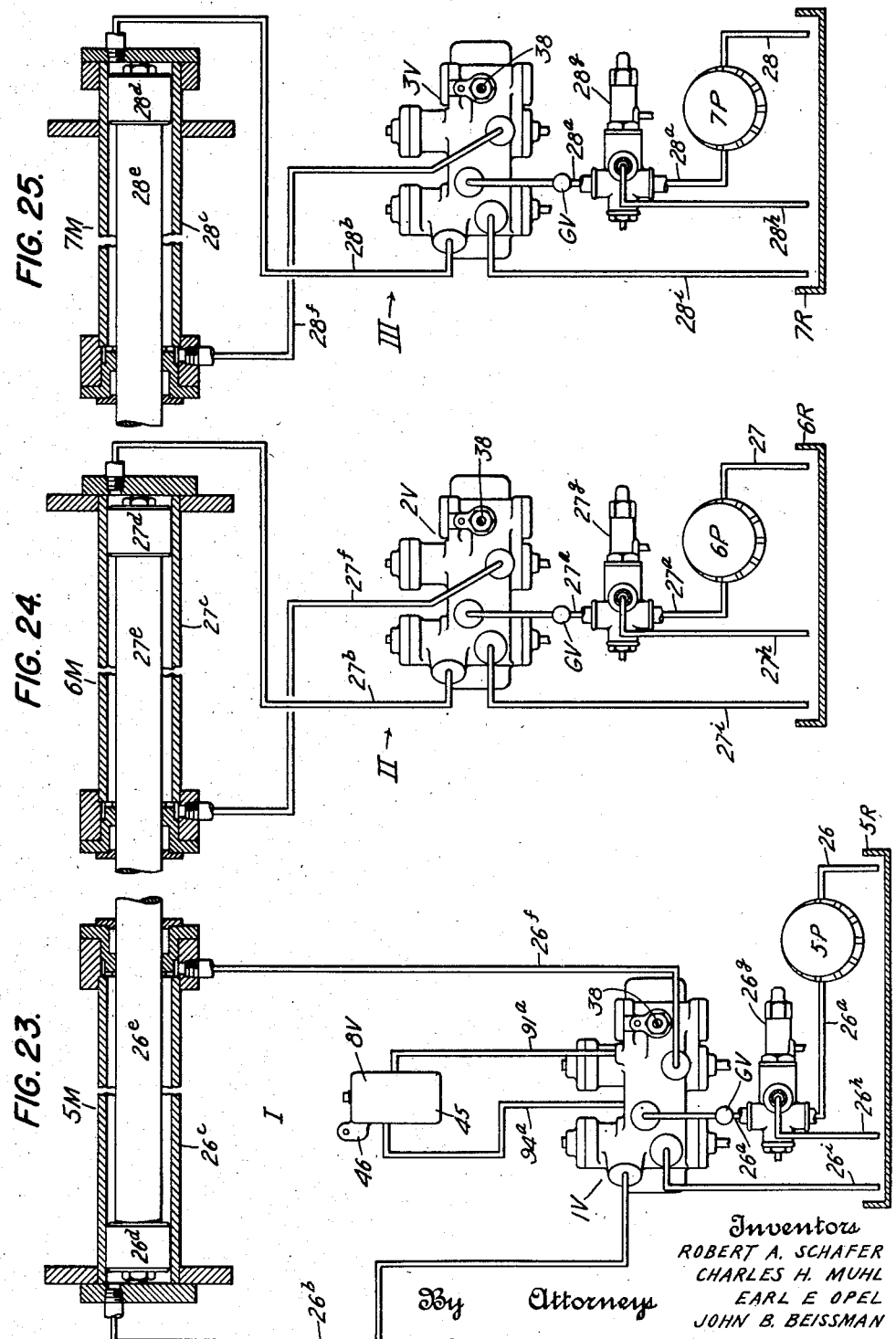

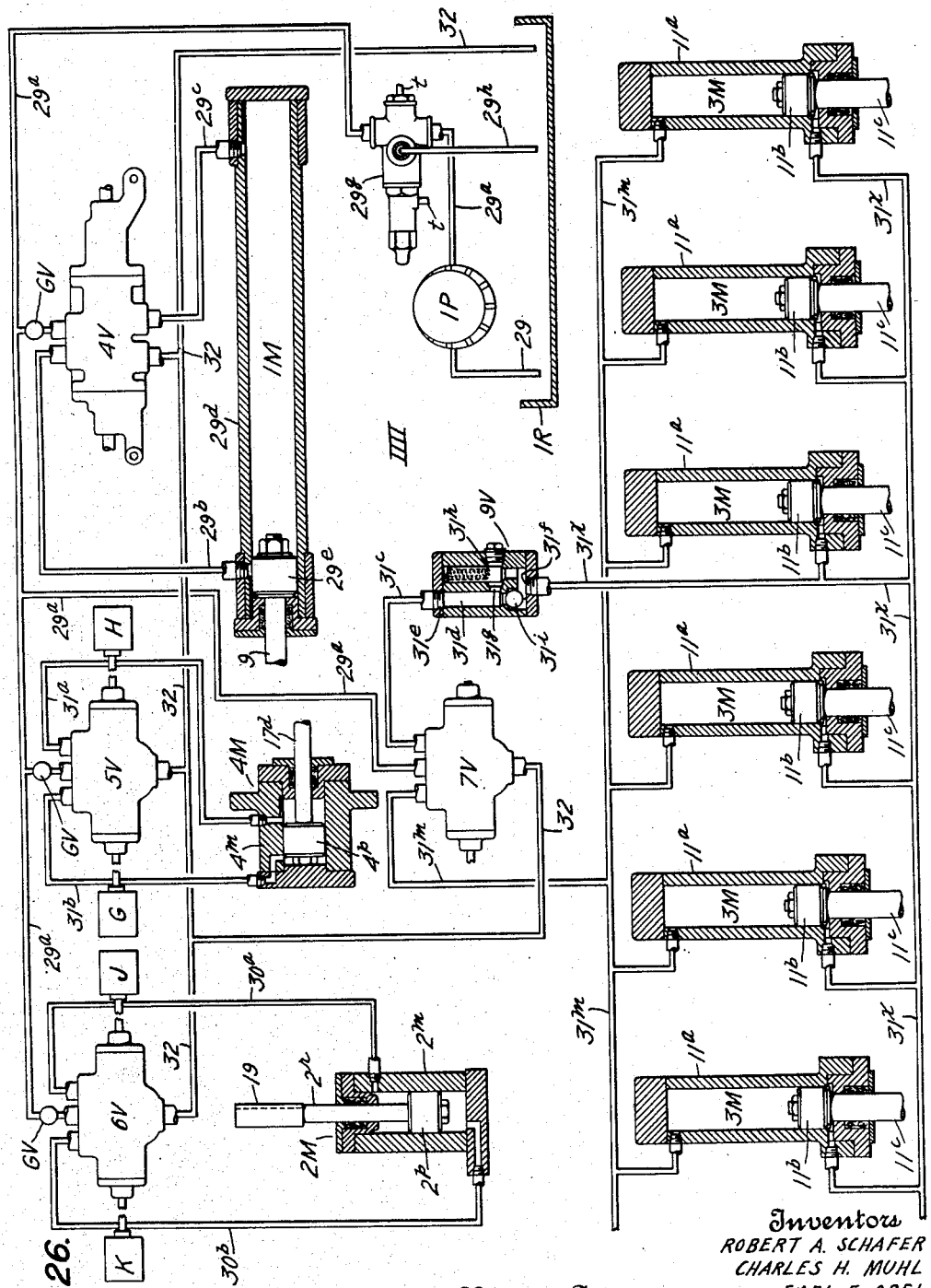

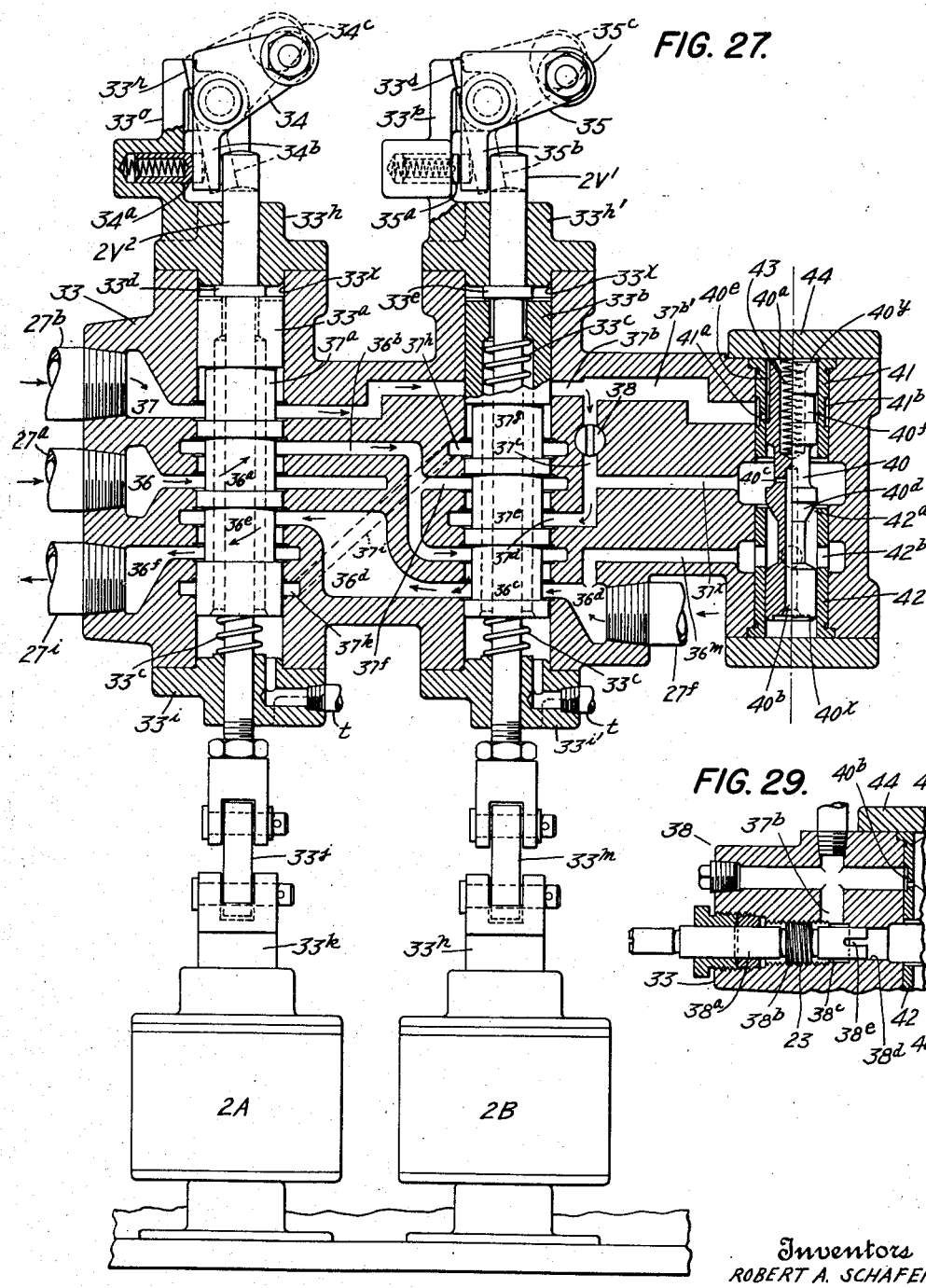

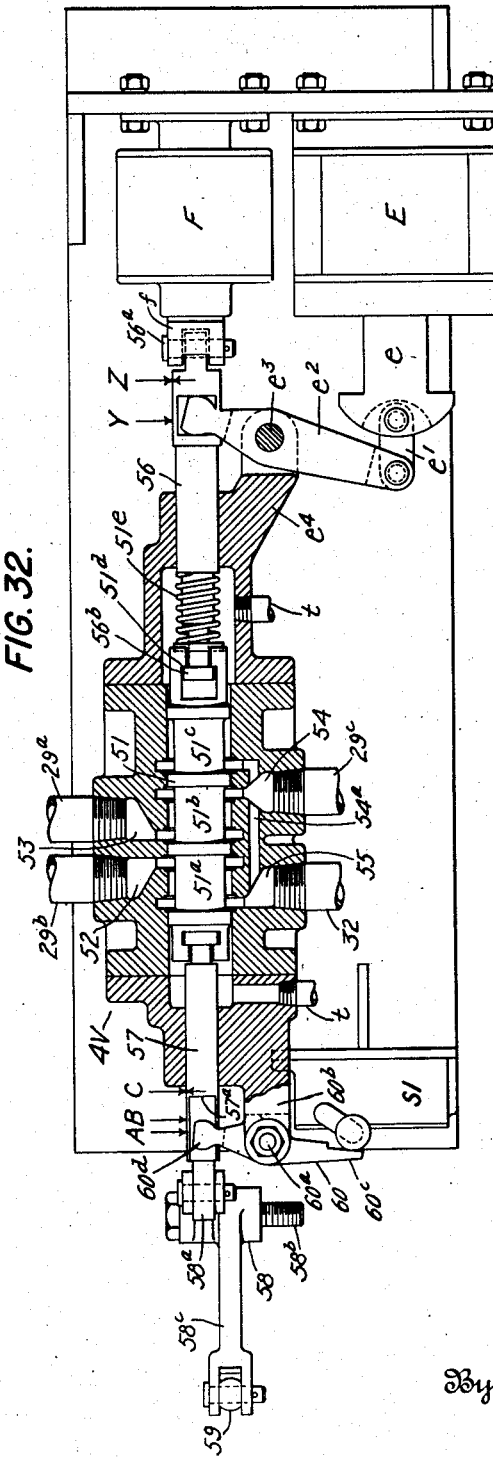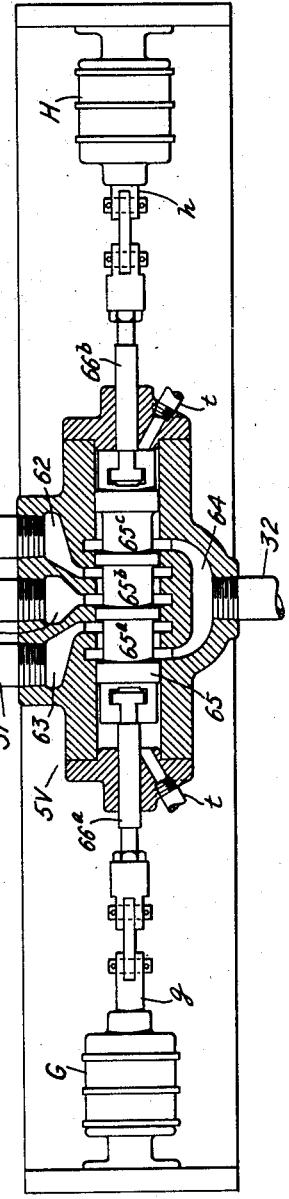

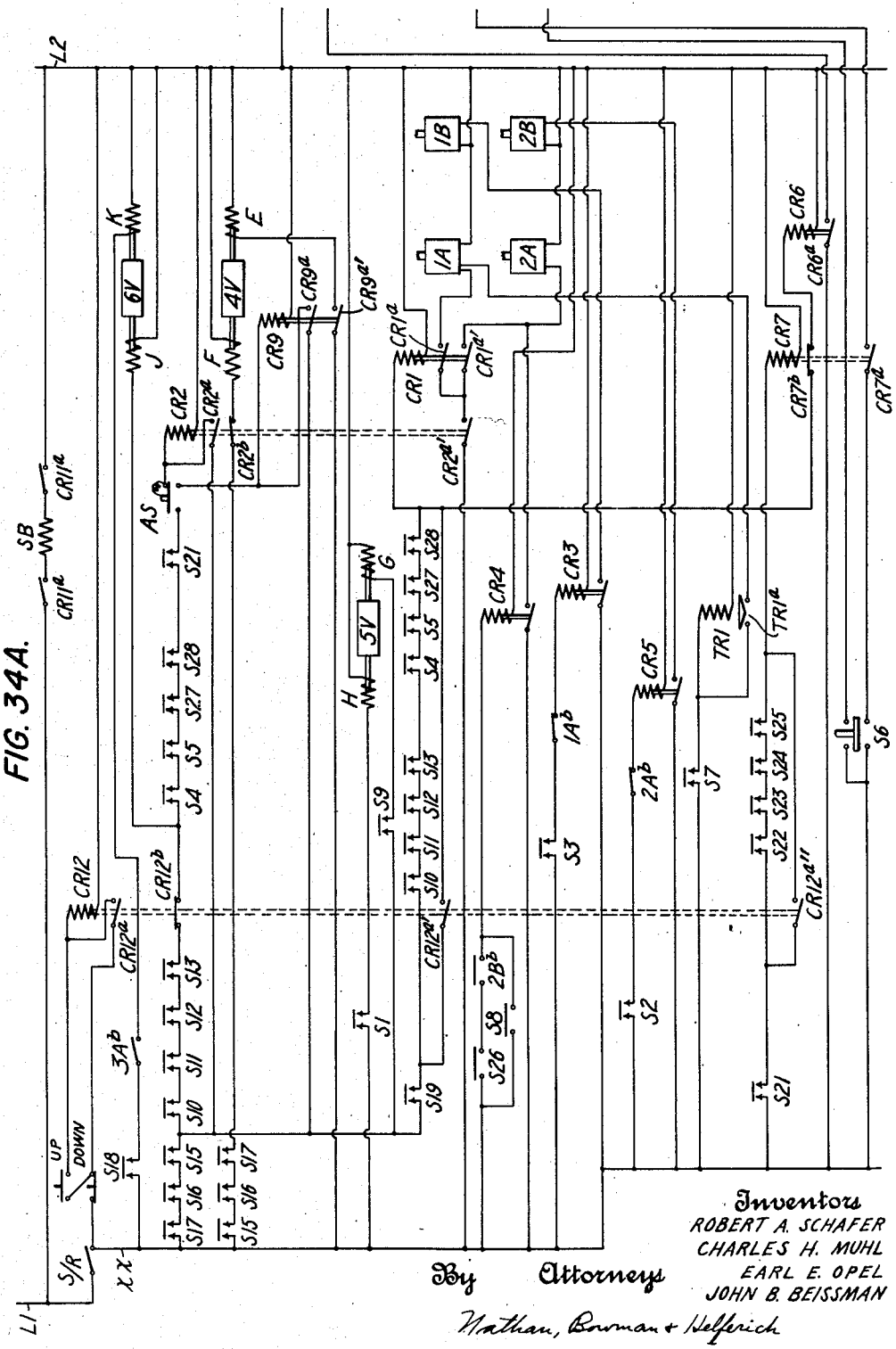

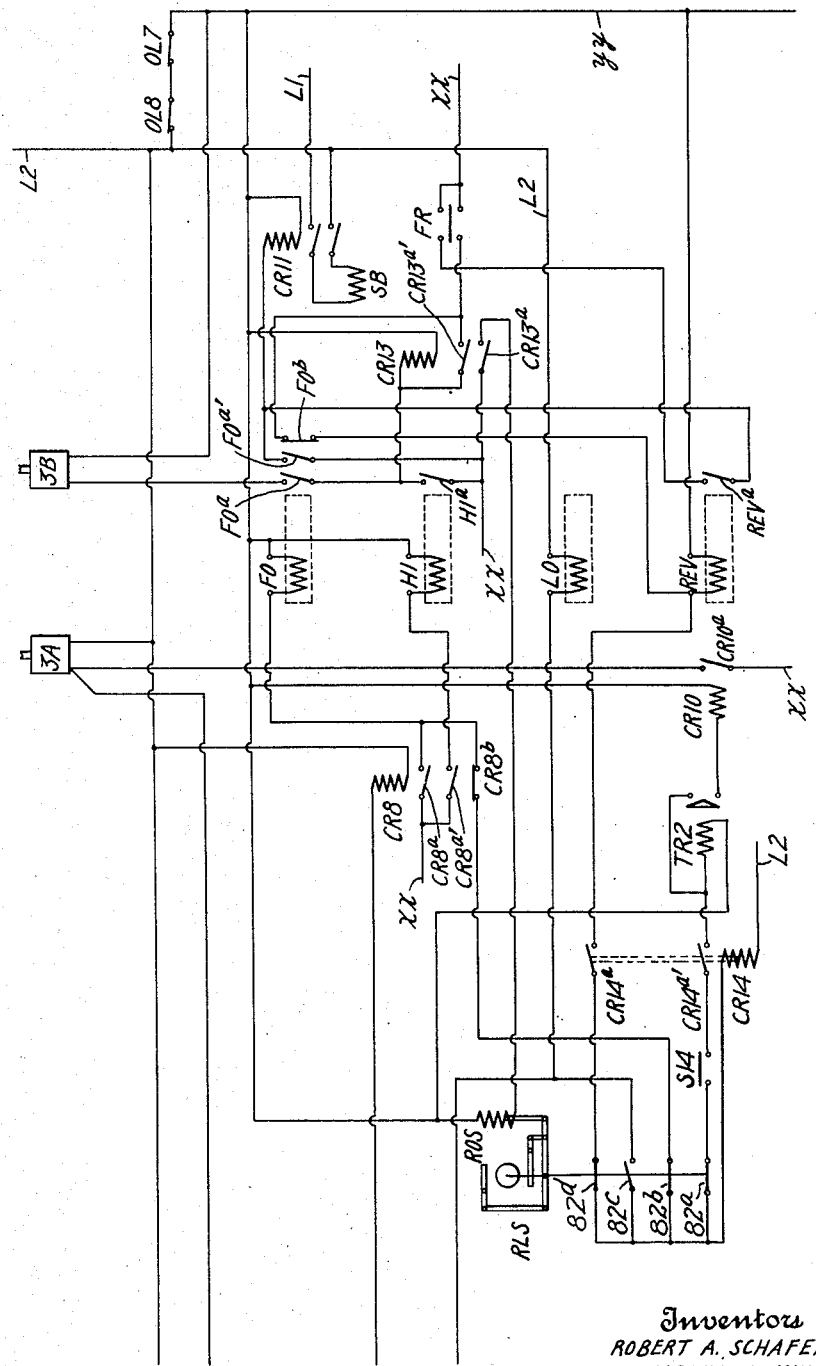

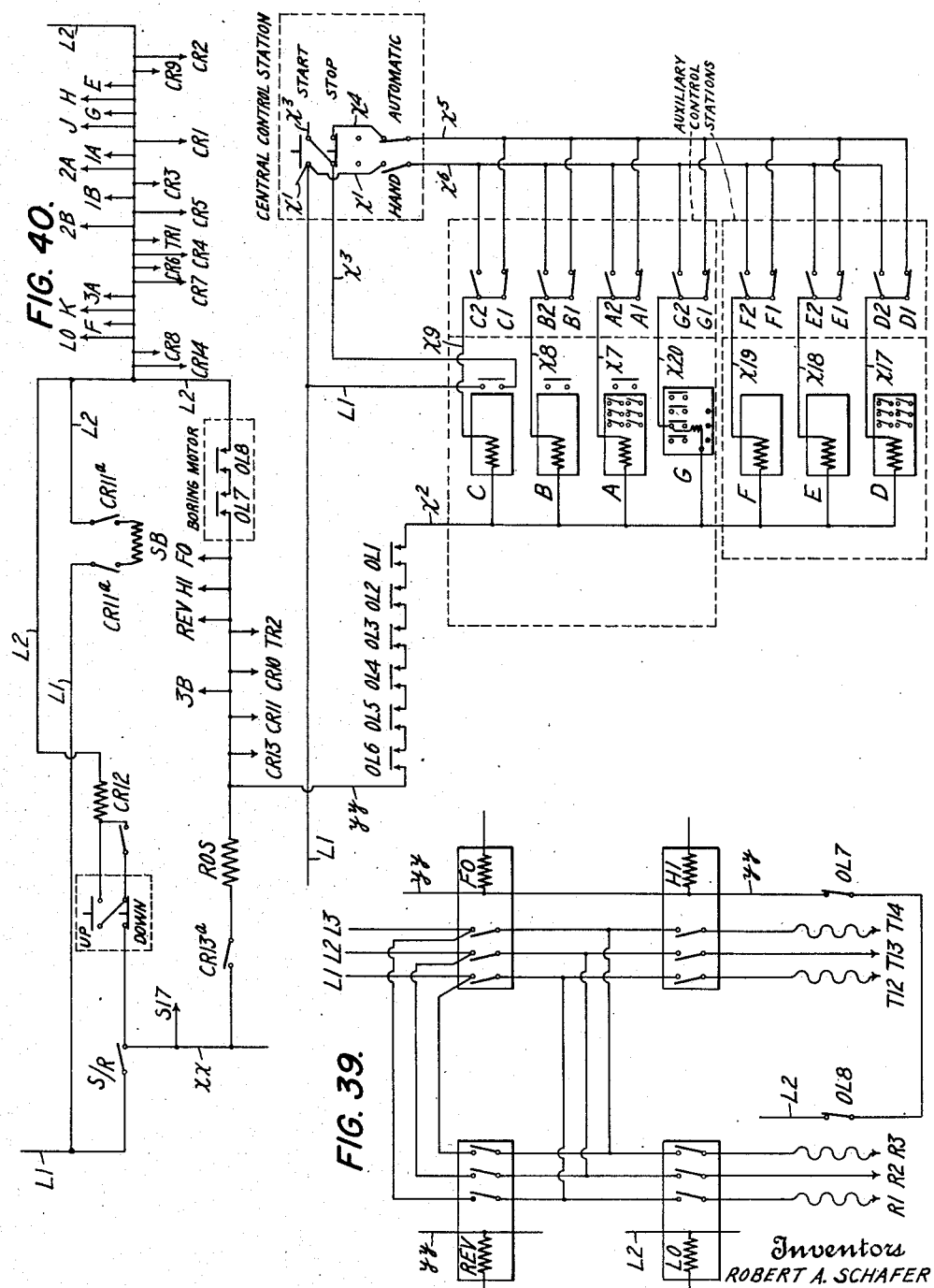

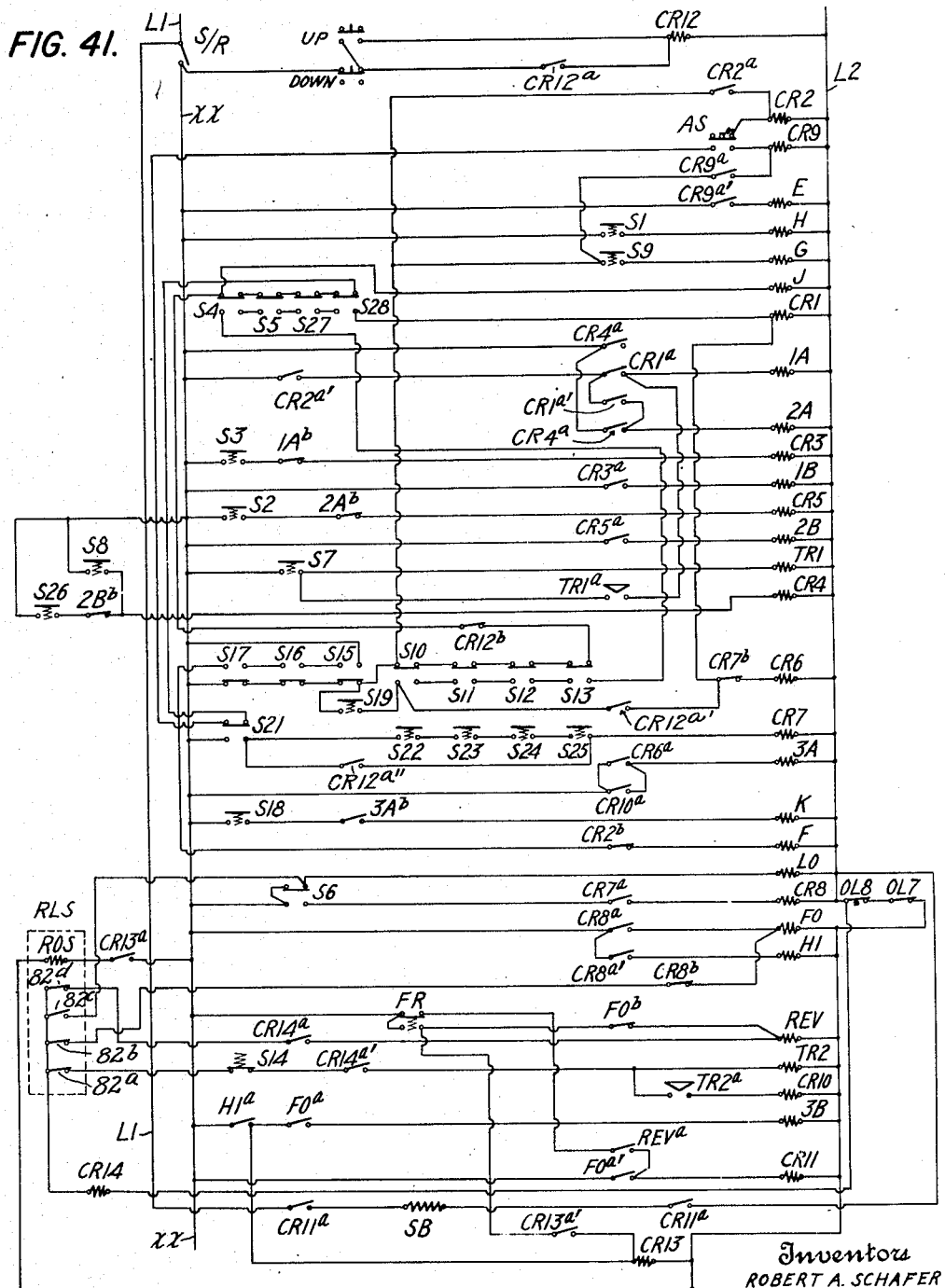

Patented Feb. 15, 1938

2,108,779

UNITED STATES PATENT OFFICE 2,108,779

MULTIPLE MACHINE TOOL

Robert A. Schafer, Charles H. Muhl, Earl E. Opel, and John B. Beissman, Richmond, Ind., assignors to The National Automatic Tool Company, Richmond, Ind., a corporation of Indiana Application August 15, 1933, Serial No. 685,242

40 Claims. (Cl. 77—22)

This invention relates to machine tools and more particularly to an improved automatic machine tool of the station type adapted simultaneously to perform a plurality of machining operations on a plurality of workpieces in a plurality of operative stations, with automatically controlled means for moving the workpieces successively to the various operating stations and into machining position.

A primary object of this invention is to render available improved ways and means for handling workpieces and for rapidly performing a plurality of machining operations thereon with a maximum of efficiency and with a minimum of labor.

More specifically, an object of this invention is to provide a completely automatic machine tool capable of performing a plurality of machining operations on a workpiece as it is passed through the machine.

Another object is to provide a station type machine tool capable of simultaneously operating on a plurality of workpieces at each machining station, whereby the capacity of the machine may be at least double that of conventional machines which operate on only a single workpiece at each station.

Another object is to provide automatically actuated means for periodically advancing the workpieces from one station to the next, together with automatic means for removing the workpieces from the conveyor and placing them in suitable fixtures in each of the machining stations.

Still another object is to provide means for positioning, adjacent to and coaxial with, each of a plurality of aligned bores in a workpiece, a rotatable cutting tool the effective cutting path of which is greater in diameter than the diameter of said bores. This has been effected by fitting the tool spindles with fly-cutters projecting from one side only of the spindles, arresting the rotation of those tool spindles in a predetermined angular position with the projecting fly-cutter aligned with clearance grooves formed in the bearing bushings in the work fixtures, temporarily arresting the movement of the workpieces as they are inserted into said fixtures in a position where the bores to be enlarged are slightly eccentric to the axis of the tool spindles, projecting the spindles and their attached cutters through the fixture bushings and through the aligned bores and then shifting the workpieces into final working position in the fixtures with the axis of the bores coaxial with the tool spindles.

A still further object of this invention is to provide improved means for giving to each of the various translatable tool heads the proper direction and most efficient rate of translation throughout the entire cycle of the machine.

Another object is to provide a system of interlocks between the various movable elements of the machine tool whereby incompatible operation of the parts of the machine is effectively prevented.

Still other objects are to provide improved hydraulic means for giving the various reciprocable elements of the machine their reciprocating movements and to provide improved electric controls for the hydraulic systems.

Other objects and advantages will be in part indicated in the following description and in part rendered apparent therefrom in connection with the annexed drawings.

For convenience, this invention will be shown and described as embodied in an automatic machine tool adapted to perform a plurality of boring and reaming operations on automobile cylinder blocks. It is to be understood, however, that this invention is in nowise limited to this embodiment and that it may assume various other forms and be adapted to produce various other machining operations on entirely different workpieces. The present embodiment has been selected only because it affords an excellent opportunity to disclose the various features of this invention and the advantages arising therefrom.

The workpiece, selected to illustrate the operation of the machine, consists of an automobile cylinder block which has a plurality of aligned main or crank-shaft bearings required to be core-reamed, rough bored and finished bored; a plurality of cam shaft bearings also required to be core-reamed, rough bored and finished bored, and a welch plug hole which requires reaming and counterboring. In the end of the cylinder block at which the welch plug hole is located the main shaft bearing and the cam shaft bearing also require counter-boring. Stated briefly, the machine, disclosed herein as a preferred typical embodiment of the invention, comprises a reciprocating work-carrier adapted to advance workpieces step-by-step through the machine and successively to a plurality of machining stations, which (when the machine is adapted for the workpiece shown herein) will be four in number. Machine tool heads located alongside the work-carrier at the various stations simultaneously (or successively as the case may be) act upon the workpieces to perform the necessary machining operations. Preferably the workpieces proceed through the machine in pairs, both being simultaneously operated on at each machining station. A loading station located in advance of the first machining station enables the operator to place pairs of unfinished workpieces on the work-carrier. The finished workpieces are carried away from the last station by a suitable conveyor.

At each station there are provided, above the work-carrier, suitable fixtures adapted to hold the workpieces in position to be operated on by the various tools, which fixtures also guide and steady the tool spindles during the machining operations. Work transferrers, at each of the stations, pick the workpieces off the work-carrier and place them in the fixtures for the machining operations and thereafter again place them on the work-carrier for advancement to the next station.

At the first machining station, which, for convenience, will be called a first core-reaming station (although other operations may be performed) two opposed heads, located at opposite sides of the work-carrier, simultaneously act upon the workpieces to ream out certain core holes which have been roughly cast therein. The welch plug hole also is reamed and counterbored. After this operation the workpiece is automatically replaced on the work-carrier and advanced to a second core-reaming station in which the remainder of the core holes are reamed. Next the workpieces are advanced to a third, or rough boring station, at which all the previously core-reamed holes, except the welch plug hole, are rough bored. From there the workpieces are advanced and transferred into a fourth or finish boring station where the final boring operations are performed, after which the finished workpieces are automatically placed upon a suitable conveyor and removed from the machine. As shown herein, the tools at the first and second stations may be provided by opposed tool heads and the tools for the third and fourth stations may be provided by a single tool head, but individual heads may be provided at each station, if desired. The various means for actuating the work-carrier, the work-transferrers and the tool heads, for holding the workpieces in their fixtures and for controlling the movements of the various elements will later be described in detail.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is a front elevation of a machine tool embodying the present invention.

Fig. 2 is a plan view thereof, with certain portions broken away.

Fig. 3 is a plan view, the arch frame and parts carried thereby later to be described, being omitted to disclose the parts therebeneath.

Fig. 4 is a rear view of the central pedestal and the arch frame and parts carried thereby.

Fig. 5 is a vertical longitudinal section substantially on the line 5—5 of Fig. 2.

Fig. 6 is a vertical section substantially on the line 6—6 of Fig. 2.

Fig. 9 is a similar view of the right rear tool head.

Fig. 10 is a face view of a rotary limit switch later to be described.

Fig. 11 is a vertical section substantially on the line 11—11 of Fig. 10.

Fig. 12 is a diagrammatic view showing the position of certain switch-actuating discs, forming a part of the rotary limit switch, when the boring bars are at rest.

Fig. 13 is a detail sectional view through one of the boring bars and one of its bearing bushings, showing the boring tool aligned with a clearance slot in the bushing, which is the position it occupies when the switch actuating discs are in the position shown in Fig. 12.

Fig. 14 is a detail view of a solenoid actuated brake later to be described.

Fig. 15 is a detail view of the work-ejecting means.

Fig. 16 is a detail section on the line 16—16 of Fig. 15.

Fig. 17 is a face view of one of the sets of boring bar bearing bushings.

Fig. 18 is a section on the line 18—18 of Fig. 17.

Fig. 19 is a section on the line 19—19 of Fig. 18, showing the bore in the workpiece located eccentric to the axis of the boring bar, in which position it is temporarily held by stops, later to be referred to.

Fig. 20 is a detail sectional view showing the temporary work-stops which hold the workpiece in the position shown in Fig. 19, while the boring bars, and the boring tools carried thereby, are projected through the bores to be machined.

Fig. 21 is an underside perspective view of one type of workpiece upon which the present machine is adapted successively and automatically to operate.

Fig. 22 is a diagrammatic view illustrating the various hydraulic systems for effecting indexing movements of the work-carrier; for actuating the work-transfer devices, the latch mechanisms, the temporary work-stops; and for effecting reciprocation of the tool heads.

Figs. 23, 24, and 25 are views somewhat similar to portions of Fig. 22, but showing more in detail the hydraulic systems for actuating the left front tool-head, the right front tool-head and the right rear tool-head, respectively.

Fig. 26 is a more detailed diagrammatic view of the hydraulic system for actuating the work-carrier; the work-transfer devices, the latch mechanisms and the temporary work-stops.

Fig. 27 is a sectional development of a valve adapted to control the reciprocation of the right front tool-head, it being understood that the valve which controls the reciprocation of the right rear tool-head is similar in construction.

Fig. 28 is a sectional development of the upper portion of the control valve for the left front tool-head, it being understood that that portion of the valve which is broken away is similar to the valve shown in Fig. 27.

Fig. 29 is a detail sectional view of a feed rate control valve one of which forms a part of each of the valves shown in Figs. 27 and 28.

Fig. 30 is a detail view partly in section, of a pressure relief valve, one of which is embodied in each of the hydraulic systems above referred to.

Fig. 31 is a detail sectional view of a second feed rate control valve embodied in the hydraulic system which actuates the left front tool-head.

Fig. 32 is a sectional view of a valve which controls the actuation of the reciprocating feed carriage.

Fig. 33 is a sectional view of a valve which controls the hydraulic circuit adapted to actuate the latch mechanisms for the work-transfer devices; it being understood that the valve which controls the hydraulic circuit which actuates the temporary work-stops and the valve which controls the actuation of the work-transfer devices are similar in construction.

Fig. 34A, taken with Fig. 34B, represents in diagrammatic form the interlocked electrical circuits controlling the movements of the respective heads and boring-head spindles.

Figure 35:
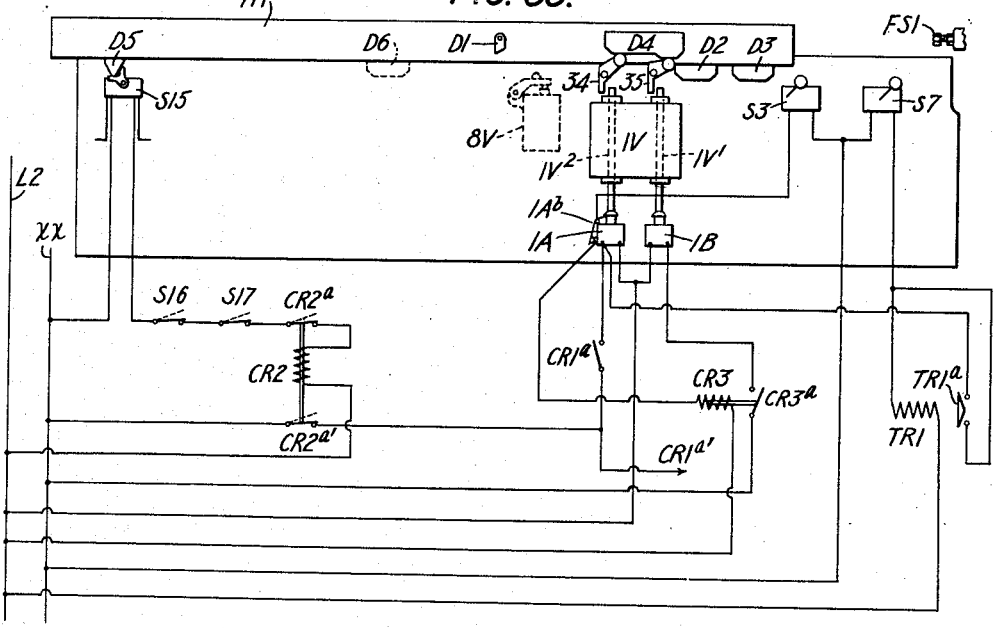

Fig. 35 is a wiring diagram for the devices controlling the movements of head 1H.

Figure 36:
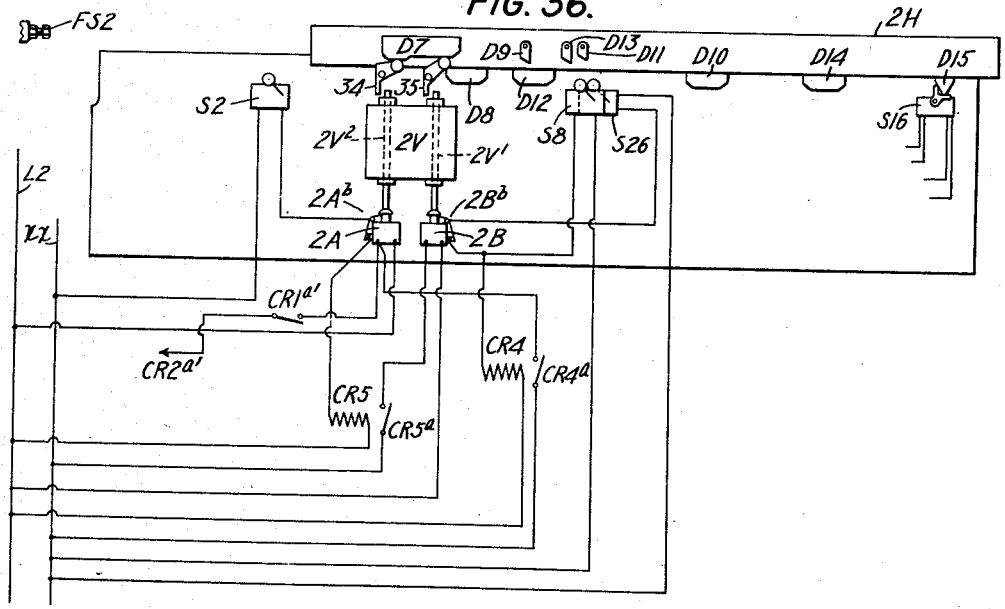

Fig. 36 is a wiring diagram for the devices controlling the movements of head 2H.

Figure 37:
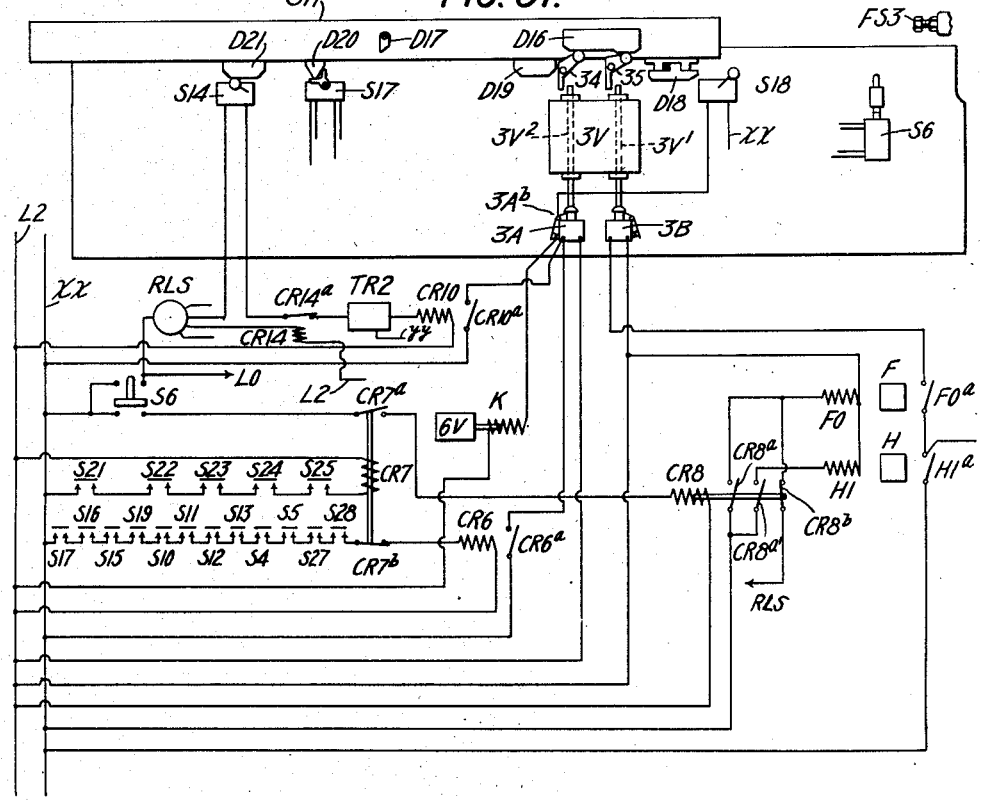

Fig. 37 is a wiring diagram for the devices controlling the movements of head 3H and the boring spindles carried thereby.

Figure 38:
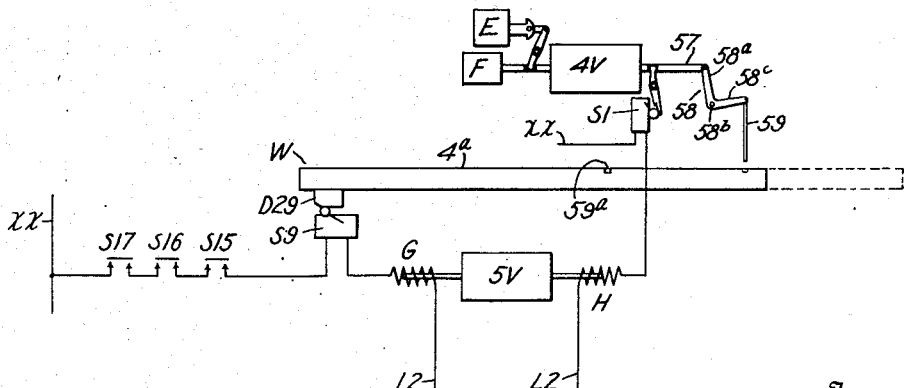

Fig. 38 is a detail of the electrical interlock actuated by the movement of the carriage.

Fig. 39 is a wiring diagram of the boring motor speed changing and reversing switches.

Fig. 40 is a wiring diagram, in diagrammatic form, of the control panel for the spindle and pump motors, illustrating also the serial arrangement of all overload switches.

Fig. 41 is an analytical diagram of the control circuits illustrated in Figures 34A, 34B, 35, 36, 37, and 38.

*General description*

Referring more specifically to the drawings the machine-tool disclosed comprises a central main frame or pedestal F which forms a support for a reciprocating intermittent work-carrying mechanism W, and work-transferring mechanism T later to be described. Left and right sub-frames 1 and 2 are secured to the forward portion of the central main frame and a sub-frame 3 is secured to the central main frame rearwardly of the sub-frame 2. The sub-frames 1, 2, and 3 form supports for translatable tool-heads 1H, 2H, and 3H respectively, which carry the necessary tool spindles for operating on each workpiece as it is passed step-by-step through the machine-tool. An arch frame $F^1$, supported on the central main frame at opposite sides of the work-carrier, carries suitable fixtures $F^2$ for locating the workpieces relative to the tools at each of the various machining stations and for guiding and supporting the tool spindles during the machining operations. The arch frame also carries various stops, switches, etc. later to be described, which cooperate with other devices to control the action of the machine. The various translatable and reciprocable parts of the machine are preferably actuated hydraulically and individual hydraulic systems are provided for actuating each of the tool-heads 1H, 2H, and 3H. A separate hydraulic system is provided for actuating the work-carrying or indexing mechanism W, the work-transferring mechanism T which removes the workpieces from the index mechanism and places them in their respective fixtures, certain temporary limit stops for the workpieces, and latch devices to maintain the workpieces in their fixtures. These four hydraulic systems are illustrated in Figs. 22, 23, 24, 25, and 26 and will later be described in detail.

Suffice it here to say that the head 1H is actuated by an hydraulic motor 5M; the head 2H, by an hydraulic motor 6M; the head 3H, by hydraulic motor 7M; the work-carrier W by hydraulic motor 1M, the temporary stops by hydraulic motor 2M; the work-transferring devices T by hydraulic motors 3M; and the latches by hydraulic motor 4M.

The machine-tool, as illustrated herein, as a preferred embodiment of the invention has five stations, to wit: a loading station in advance of the heads 1H and 2H, a first machining station in which the workpieces are operated on by a first set of tools carried by the heads 1H and 2H, a second machining station in which the workpieces are operated on by a second set of tools provided by the heads 1H and 2H, a third machining station in which the workpieces are rough bored by a first set of tools provided by the head 3H and a fourth machining station in which the workpieces are finish bored by a second set of tools carried by the head 3H. From the last machining station the workpieces are automatically placed on a suitable conveyor (see Figs. 5 and 15) and removed from the machine.

It is believed that the construction and operation of the machine disclosed herein may more readily be understood by reference to a specific workpiece which the machine is adapted automatically to machine. Fig. 21 shows a six cylinder motor block having four main or crank shaft bearings $X^1$, $X^2$, $X^3$, and $X^4$, four cam shaft bearings $Y^1$, $Y^2$, $Y^3$ and $Y^4$, and a welch plug hole Z (shown in dotted lines). The main shaft bearings and the cam shaft bearings are required to be core-reamed, rough-bored and finish bored. The left main shaft bearing $X^1$ also is required to be counterbored and chamfered (as shown in Fig. 6); the left cam shaft bearing is required to be counterbored; and the welch plug hole is required to be core-reamed and counterbored. In the first operating station the head 1H core-reams, counterbores and chamfers the main shaft bearing $X^1$, core-reams and counterbores the cam shaft bearing $Y^1$ and core-reams and counterbores the welch plug hole. While the head 1H is performing those operations the head 2H core-reams the main shaft bearing $X^4$ and the cam shaft bearing $Y^4$ in the opposite end wall of the workpiece.

In the second machining station a suitable tool, carried by the head 1H, is projected through the bearing $X^1$ and core-reams the main shaft bearing $X^2$. Also in the second machining station one tool carried by the head 2H is projected through the main shaft bearing $X^4$ and core-reams the main shaft bearing $X^3$. Another tool carried by the head 2H is projected through the cam shaft bearing $Y^4$ and core-reams the cam shaft bearing $Y^3$ after which the head is given a further advance and the same tool core-reams the cam shaft bearing $Y^2$. Thus, with all the bearings core-reamed, the workpiece is advanced to the third machining station in which boring tools carried by the head 3H simultaneously rough bore each of the main shaft and cam shaft bearings. The workpiece is then advanced to the fourth, or last, machining station where other boring tools, carried by the head 3H, simultaneously finish bore each of the previously core-reamed and rough bored main shaft and cam shaft bearings.

*Work-carrier*

The pedestal F is provided at its upper portion with spaced horizontally disposed guide rails $f^1$ and $f^2$ upon which are slidingly fitted conveyor slide bars $4^a$ and $4^b$, provided with a plurality of upwardly extending circular work-receiving plugs $5^a$, $5^b$, respectively. These plugs are adapted to have placed upon them, in the loading station, and in inverted position, the motor blocks to be machined, the plugs entering the end cylinder bores, or, in other words, the bores of cylinders numbers 1 and 6. Each of the slide bars $4^a$—$4^b$ is provided at its underside with a rack-bar 6 which engages a pinion 7 secured upon a shaft 8 journaled in the forward portion of the pedestal. Thus reciprocation of one slide bar will effect, through the rack and pinion connection, similar reciprocation of the other slide bar. A feed index hydraulic motor 1M is connected, by piston rod 9, with a bracket 9' secured to the slide bar $4^a$ whereby reciprocatory movements are transmitted to the feed slide bars. The machine tool is adapted simultaneously to operate on two workpieces in each machining station. Therefore, at the loading station the operator places two inverted motor blocks side by side on two adjacent pairs of the work-receiving plugs $5^a$—$5^b$. The indexing movement of the work-carrier is such that the two motor blocks are simultaneously advanced to the first, second, third and fourth machining stations and finally conveyed away from the machine-tool. The means for controlling the movement of the work-carriers and the tool-heads is described elsewhere in this specification.

Work-transfer devices

After the workpieces have been carried into the machining stations by the plugs $5^a$—$5^b$ they are picked off the work-carrier and transferred into suitable fixtures $F^2$ adapted to hold them in a predetermined position during the machining operations. As shown in the drawings this is effected in the present machine by pairs of vertically movable hydraulically actuated transfer devices comprising circular plugs $10^a$—$10^b$. These plugs are normally located below the horizontal path of travel of the workpieces and are adapted to be elevated into the bores of cylinders numbers 2 and 5 of the cylinder blocks. The transfer plugs are provided with oppositely extending shoulders $10^c$—$10^d$ which engage the underside of the work and cause it to be elevated with the transfer devices.

The work-transferring devices, which are eight in number (i. e. two at each operating station) are all similar in construction and, therefore, a detail description of one will suffice for all. Fixed to the upstanding side walls of the pedestal F are eight horizontally disposed cross members 11 each of which is provided, substantially midway between its ends, with a vertically arranged hydraulic motor 3M comprising a cylinder $11^a$, a piston $11^b$ reciprocably mounted in said cylinder and secured upon a piston rod $11^c$. To the lower end of the piston rod $11^c$ there is secured a cross-head $11^d$, to the opposite ends of which are attached the lower ends of vertically arranged work-elevating rods $11^e$ and $11^f$. These rods carry at their upper ends the work-transferring plugs $10^a$ and $10^b$ respectively. Thus it will be seen that upon each upward movement of the piston $11^b$ in the cylinder $11^a$ the plugs $10^a$ and $10^b$ will be slid into the second and fifth cylinder bores and the shoulders $10^c$ and $10^d$ will lift the workpiece off the plugs $5^a$ and $5^b$ and place the piece in the fixture $F^2$ carried by the arch frame $F^1$.

After the workpieces have been lifted off the plugs $5^a$—$5^b$ the work-carrier bars $4^a$—$4^b$ and the locating plugs carried thereby are retracted (i. e. moved toward the front of the machine) and when, after a machining operation, the transfer plugs $10^a$—$10^b$ and the workpiece thereon are again lowered, the workpieces are each placed upon a pair of locating and indexing plugs two steps in advance of the plugs from which it was previously removed. Thus the pairs of workpieces are periodically advanced from the loading station to the various machining stations and from the last machining station to the removal conveyor later to be referred to.

Fixed stops 12 provided by each of the fixtures $F^2$ engage the uppermost surface of the workpieces when in each machining station and accurately position the workpiece vertically relative to the tools. In the third and fourth stations adjustable stops 13 temporarily hold the workpieces slightly spaced from the fixed stops until the tool-spindles have been inserted through the holes to be bored, after which the temporary stops are removed and the workpieces are moved against the fixed stops 12. The purpose of the temporary stops, their construction and the means for actuating them are described under another heading.

To accurately locate the work horizontally relative to the tools the fixtures $F^2$ are provided with downwardly projecting dowel pins 14 adapted to enter suitable dowel holes formed in the workpiece as the workpiece is elevated into final machining position.

Latch devices

To maintain the workpieces elevated, i. e., in machining position against the fixed stops 12, there is provided a plurality of latch devices adapted to engage and hold the work-transfer rods $11^e$—$11^f$. Each of these devices comprises a latch lever $L^1$ pivoted at its upper end on a pin $l'$ carried by one of the cross-members 11 of the work-transfer devices. The lower off-set portions $L^3$ of the latch levers are adapted, when the workpieces have been elevated, to engage beneath lugs $11^n$ projecting from the cross-head $11^d$ to hold the work-transfer devices elevated. Coil springs 16, connected at one end with the latch levers and at the other end with the pedestal F, normally tend to draw the ends $L^3$ of the latch levers beneath the lugs $11^n$. They are, however, held out of engagement with said lugs except when the workpieces are elevated as will be described.

The off-set portion $L^3$ of each latch lever L in the two boring stations is formed with arcuate seats $l^3$ and $l^4$ arranged at slightly different distances from the fulcrum point of the lever. The seat $l^3$ is adapted to engage beneath the lug $11^n$ while the workpiece is in engagement with the temporary work-stops 13 and the seat $l^4$ engages beneath the lug when the workpiece is elevated into its final upward position in engagement with the fixed stops 12.

To actuate the latch levers, there are reciprocably mounted in bearings 17 provided by the pedestal, two rods $17^a$ and $17^b$ connected together at their rear end by a cross-head $17^c$ which in turn is connected to a piston-rod $17^d$ forming a part of an hydraulic motor 4M. This motor comprises a horizontally disposed cylinder $4^m$ supported by the pedestal and a piston $4^p$ secured upon the piston rod $17^d$ and fitted within the cylinder $4^m$.

Collars $17^e$, on the rods $17^a$—$17^b$, are adapted, when the piston is moved forward, to engage pins 16ᵃ projecting from the latch levers L¹ thereby to swing the levers clockwise (as viewed in Fig. 5) in opposition to the springs 16 thereby to disengage the off-set portions L³ of the latch levers from the lugs 11ⁿ and thereby permit the workpieces to be lowered out of machining position. When the piston 4ᵖ is moved rearwardly in the cylinder 4ᵐ the collars are withdrawn and the springs 16 move the ends L³ of the latch levers into the path of reciprocation of the lugs 11ⁿ and when the work-transfer devices are again elevated the lugs cam the levers to one side in opposition to the springs 16 and thereafter the ends of the latch levers again snap beneath the lugs 11ⁿ and maintain the work-transfer devices elevated.

Temporary work-stops

In the rough-boring and finish-boring operations (both of which are performed by the head 3H) each boring bar is provided with four aligned bits or fly-cutters, one for each bearing to be bored. Heretofore, when simultaneously boring a plurality of aligned bearings it has been the practice to insert the boring bar through the bearing bushings in the fixture and into the workpiece and then to affix cutting bits into the boring bars adjacent each bearing to be bored. This was necessary by reason of the fact that the diameter of the circular path of the cutting bits was greater than the diameter of the bearing bushings for the boring bars, provided by the work-holding fixture, and the holes in the workpiece through which the boring bar was required to pass. This removal and replacement of the tools for each boring operation consumed considerable time and, therefore, restricted production and added materially to the cost thereof.

This invention has effectively overcome the necessity of removing and replacing the cutting bits. This has been accomplished by bringing the boring bars to rest after each boring operation in a predetermined angular position with the cutter bits aligned with clearance apertures $a$ formed in the spindle bearing bushings $a^1$ provided by the fixtures F². This is shown most clearly in Figs. 5, 17, and 18.

As the workpieces are moved into machining position in the fixtures they are temporarily arrested approximately ⅛ inch from the fixed limit stops 12 provided by the fixtures. This is effected by temporary stops, later to be described. In this position the holes in the workpiece to be bored are located eccentric to the axis of the boring spindle, as shown in Figs. 18 and 19. Inasmuch as the diameter of the boring bar, plus the projection of the cutter bit, is less than the diameter of the hole to be bored, the cutter bar, with its attached bits, may be projected through the bearing bushings and the holes in the workpiece until each bit is brought adjacent to the bearing which it is intended to bore. Thereafter the temporary stops are removed, the workpiece is elevated against the fixed stops, and the boring bar is rotated and fed forward, whereupon the cutter bits simultaneously perform their boring operations on their respective portions of the workpieces. After the boring is completed the tool spindles are again arrested in said predetermined angular position and the boring bars and their attached bits are withdrawn from the workpiece and the bearing bushings in the fixture.

The temporary work-stops and the means for actuating them are shown most clearly in Figs. 2, 4, 5, 6, and 20. These stops consist of vertically arranged pins 13 slidably mounted in bearings provided by the fixtures F². The lower ends of these pins are adapted to engage upper flat portions of the workpiece. Rotatably journaled in bearings 18 on the upper side of the fixtures are shafts 18ᵃ, upon which are secured cams 18ᵇ and pinions 18ᶜ. The cams are flat disks each having an irregular periphery adapted to engage the head portion 13ᵃ of one of the temporary stop pins 13. Each cam is provided with peripheral flat 18ᵈ and a peripheral flat 18ᵉ, the latter being approximately ⅛ inch farther from the axis of the shaft 18ᵃ than the flat 18ᵈ. A cam surface 18ᶠ connects the flats 18ᵈ and 18ᵉ. Fig. 20 shows, in full lines, one of the cams in the position in which it temporarily holds the stop pin in its lowermost position and in dotted lines in the position in which it permits the pin to be raised by the workpiece in coming into final working position against the fixed stops 12. After the boring operations on the workpiece have been completed and the workpiece lowered, the cams 18ᵇ are rotated clockwise, as viewed in Fig. 20 approximately 45 degrees and the cam surfaces 18ᶠ force the pins 13 downwardly into temporary work-holding position, in which position they are held by the radial flats 18ᵉ of the cams. Oscillatory movements are given to the shafts 18ᵃ and the cams 18ᵇ by an hydraulic motor 2M supported upon the arch frame F¹. This motor comprises a cylinder 2ᵐ, a piston 2ᵖ fitted therein and connected to a piston rod 2ʳ. This rod has connected to it a rack 19 which meshes with a gear 19ᵃ fixed upon a horizontally disposed shaft 20 journaled in bearing brackets 21 secured upon the frame F¹. Gears 19ᵇ, 19ᶜ, and 19ᵈ, similar to gear 19ᵃ, also are secured upon the shaft 20.

Slidably mounted in transverse grooves 21ᵃ formed in the upper surfaces of the fixtures F², are slide bars 22 provided at their undersides with rack teeth 22ᵃ which mesh with the gears 19ᵃ, 19ᵇ, 19ᶜ, and 19ᵈ. At their upper sides the bars 22 are provided with rack teeth 22ᵇ which engage the cam actuating gears 18ᶜ. Guides 23, provided by the fixtures F², maintain the slide bars 22 in their grooves 21. At their rear ends each of the slide bars passes through a channel formed in the underside of a bracket 24 which serves to guide the slide bars and also to hold them in engagement with the gears 19ᵃ, 19ᵇ, 19ᶜ, and 19ᵈ. Adjustable stop screws 25 fixed in upstanding portions of the brackets 21 are arranged in the path of movement of the slide bars 22 and serve to limit the rearward movement thereof. From the foregoing it will be understood that reciprocatory movements of the piston 2ᵐ of the hydraulic motor 2M will effect oscillatory movements of the cams 18ᵇ whereby either the portion 18ᵉ is caused to engage the stops 13 to project them downwardly into temporary work-holding position or the portion 18ᵈ is caused to overlie the pins and thereby permit them to be retracted to permit the work to be moved into working position in the fixtures.

Work-ejecting means

After the two workpieces have been operated on in the final machining station they are lowered, by the work-transfer plugs 10ᵃ—10ᵇ, onto the conveyor slide bars 4ᵃ—4ᵇ, the feed carriage, at that time, being retracted toward the front of the machine and there being no work-receiving plugs 5ᵃ—5ᵇ in that station. The foremost of the two completed workpieces rests upon the slide bars forwardly of upwardly extending ejector fingers 4ᶜ and 4ᵈ (see Figs. 3, 5 and 15) pivotally mounted in the bars $4^a$—$4^b$, respectively, and the rearmost workpiece rests upon the slide bars in advance of ejector fingers $4^f$ and $4^g$ fixedly secured to the slide bars $4^a$—$4^b$. The upper portion of the fingers $4^c$ and $4^d$ are each formed with a head $4^e$ which, during forward movement of the conveyor carriage, abuts a vertical wall provided by the slide bars $4^a$—$4^b$ and presents backward tipping of the fingers.

As the feed carriage is advanced the pivoted fingers $4^c$—$4^d$ and the fixed fingers $4^f$—$4^g$ engage the two completed workpieces and push them forward onto the conveyor 15 which comprises opposed angle bars $15^a$—$15^b$, secured upon the pedestal F, and the conveyor rollers $15^c$ supported thereby. The upper surfaces of the rollers may be slightly above the upper surfaces of the slide bars $4^a$—$4^b$ and, therefore, as the workpieces are ejected from the machine they are freed from the slide bars which may then be retracted without retracting the workpieces. As the carriage is retracted the bevelled upper surfaces $4^h$ of the fingers $4^c$—$4^d$ engage the rearmost workpiece, which has been ejected by the fingers $4^f$—$4^g$. The fingers, therefore, are tipped forwardly about their pivots and pass beneath the workpiece. As the carriage approaches its retracted position pins $4^i$ projecting from the depending portions of the fingers $4^c$—$4^d$ engage fixed stops, which conveniently may be pins $4^k$ secured in the pedestal thereby causing the fingers $4^c$—$4^d$ to be swung into upright position, as shown in Fig. 15 for the next succeeding operation.

Tool-Heads

Head 1H

The left front tool-head 1H is translatably mounted on horizontally disposed guides $1^a$ provided by the sub-frame 1 and is reciprocated by the hydraulic motor 5M. This head carries two rotatable tool-spindles $1^b$, each of which carries a reaming tool $1^c$ adapted to core-ream the left main bearing $X^1$ of one of the two workpieces being operated on, and a counter-boring tool $1^d$ adapted to counter-bore and chamfer that bearing.

This head also carries two rotatable tool-spindles $1^e$ each of which carries a reaming tool $1^f$ adapted in the first machining station to core-ream the left cam-shaft bearing $Y^1$ and a counter-boring tool $1^g$ adapted to counter-bore said left cam shaft bearing of one of the workpieces. Two other rotatable tool-spindles $1^h$, carried by the head 1H each carry a reaming tool $1^i$ adapted in the first machining station to core-ream a welch plug hole in one of the workpieces and a counter-boring tool adapted to counter-bore said welch plug hole.

Figure 7:
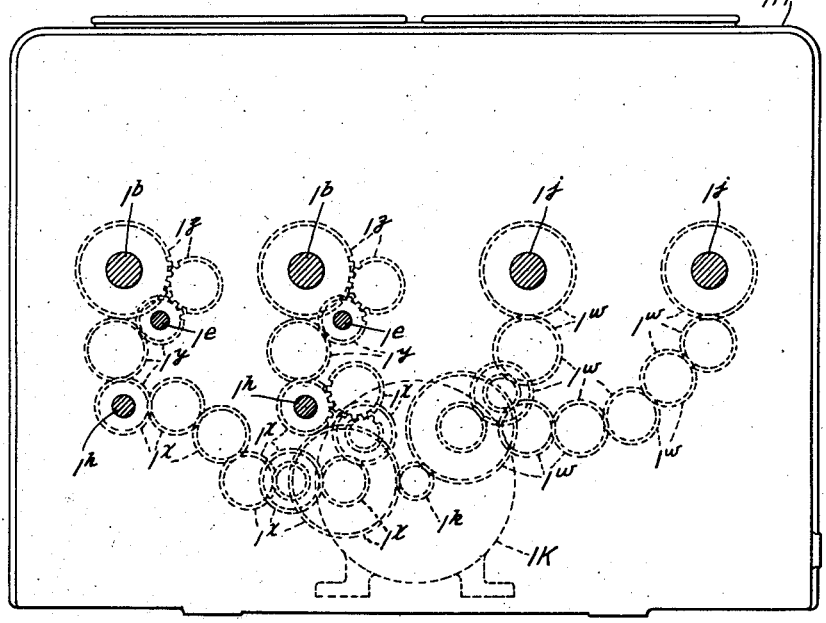
Fig. 7 is a face view of the left front head showing diagrammatically the gear drive from the actuating motor to the various tool spindles.

All of these tool-spindles are rotated by an electric motor 1K carried by the tool-head as best shown in Figs. 3 and 7. The armature shaft of the motor 1K carries a gear $1^k$ which, through a suitable gear train, designated generally as $1^x$, embodied in the cluster box $1H^x$ of the head 1H, rotates the tool-spindles $1^h$. These spindles, through gears designated generally as $1^y$ rotate the spindles $1^e$. The tool-spindles $1^b$ are rotated from the spindles $1^e$ through gears designated generally as $1^z$.

The head 1H also carries two rotatable tool spindles $1^j$ carrying suitable reaming tools which, in the second machining station, are projected through the previously reamed bearings $X^1$ and core-ream the main shaft bearing $X^2$ of each of the two workpieces. These spindles are driven from the motor 1K by a gear train designated generally as $1^w$.

Head 2H

The right front tool-head 2H, which operates upon the four workpieces simultaneously with the head 1H, is translatably mounted on horizontally disposed guides $2^a$ provided by the sub-frame 2, and is reciprocated by the hydraulic motor 6M. This head carries two rotatable tool-spindles $2^b$ aligned with the spindles $1^b$ of the head 1H. Each of these spindles carries a reaming tool $2^c$ adapted in the first machining station to core-ream the right main shaft bearings $X^4$ of one of the workpieces. Two other spindles $2^e$ rotatably journaled in the head 2H in alignment with the spindles $1^e$ of head 1H carry reaming tools adapted to core-ream the right cam shaft bearings $Y^4$.

Figure 8:
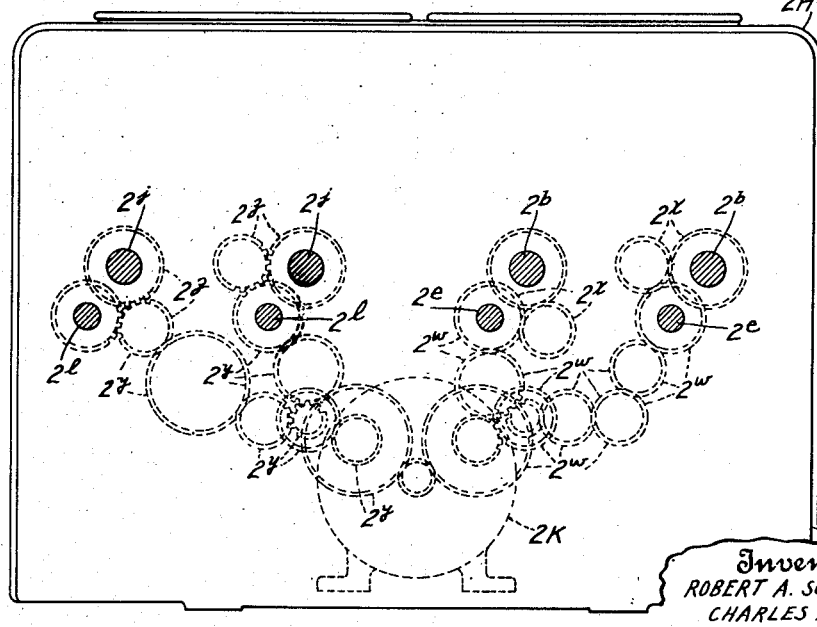
Fig. 8 is a similar view of the right front tool head.

An electric motor 2K carried by the head 2H serves to rotate the tool-spindles $2^e$. As shown in Fig. 8, these spindles are rotated from the armature shaft of the motor 2K by means of a gear train designated generally as $2^w$ embodied in the cluster box $2H^x$ of the head 2H. The spindles $2^b$ are rotated from the spindles $2^e$ by a gear train designated generally as $2^x$.

Tool-head 2H also is provided with two rotatable tool-spindles $2^j$ corresponding in position with the spindles $2^b$ and aligned with the spindles $1^j$ of the head 1H. These spindles carry tools adapted in the second machining station to be projected through the previously reamed main shaft bearings $X^4$ and to core-ream bearings $X^3$ of the workpieces. Another pair of rotatable tool-spindles $2^l$ corresponding in position to the spindles $2^e$, carry tools adapted, in the second machining station, to be projected through the previously reamed bearings $Y^4$, first to core-ream the cam shaft bearing $Y^3$ and then to be advanced to and to core-ream the cam shaft bearing $Y^2$. The spindles $2^l$ are rotated from the motor 2K by a gear train designated generally as $2^y$, while gears designated generally as $2^z$ rotate the spindles $2^j$ from the spindles $2^l$.

Head 3H

The tool head 3H is located rearwardly of the head 2H and provides the tools for the third and fourth machining stations. This head is translatably mounted on horizontally disposed guides $3^a$ provided by the sub-frame 3 and is reciprocated by the hydraulic motor 7M.

The head 3H is provided with two rotatable spindles $3^r$ carrying boring tools adapted to perform rough boring operations on all four aligned main-shaft bearings of the two workpieces previously operated on in the second machining station and two rotatable spindles $r^3$ adapted to carry boring tools to rough bore the four aligned cam-shaft bearings of said two workpieces. The spindles $r^3$ are rotated from an electric motor 3K carried by the head 3H through the medium of a train of gears, designated generally as $3^v$ located within the cluster box $3H^x$ of the head 3H. Rotation is transmitted from the spindles $r^3$ to the spindles $3^r$ by gears designated generally as $3^x$.

The tool-head 3H also is equipped with a pair of tool-spindles $3^f$ each carrying boring tools adapted to finish bore the main shaft bearings of a workpiece and a pair of spindles $f^3$ carrying boring tools adapted to finish bore the cam-shaft bearings. These spindles operate on the two simultaneously machined workpieces in the fourth or final machining station. The spindles $f^3$ and 3ᶠ are rotated from the electric motor 3K through the medium of a gear train carried by the cluster box 3Hˣ and designated generally as 3ʸ in Fig. 9.

*Hydraulic systems*

Fig. 22 shows a composite diagrammatic layout of the various hydraulic systems of the present machine. The portion I of this figure represents the hydraulic system for actuating the left front tool-head 1H; the portion II, the hydraulic system for actuating the right front tool-head 2H; the portion III, the hydraulic system for actuating the head 3H, and the portion IIII, the hydraulic system for actuating the reciprocating feed carriage, the work-transfer devices which transfer the workpieces from the feed carriage into the work-holding fixtures, the latch mechanism which maintains the workpieces in the fixtures and the temporary work-stops.

To facilitate an understanding of these systems they will first be described very generally with reference to Fig. 22 and later they will be described more in detail with reference to other figures.

The hydraulic system I for actuating the head 1H comprises a reservoir 5R which may be located in the sub-frame 1 which supports the head. Fluid, preferably oil, is drawn from this reservoir through conduit 26 by a pump 5P and transmitted to a control valve 1V which, in turn, directs it at predetermined times to the rear end of the hydraulic motor 5M to effect forward movement of the head 1H, at rapid traverse or feed rates, or to the forward end of the motor to effect rapid retraction of the head, or to the reservoir 5R when the operating cycle has been completed. A relief valve 26ᵍ (shown in section in Fig. 30) is connected with the pump discharge line and with the reservoir 5R. This relief valve regulates the pressure capable of being transmitted to the valve 1V and the motor 5M. The rate at which the head 1H is fed forward may be regulated by a second feed rate control valve 8V connected with the valve 1V as later will be described.

The hydraulic system II for actuating the right front tool-head 2H comprises a reservoir 6R, located in the supporting sub-frame 2 for the head 2H, a pump 6P which draws fluid, preferably oil, from the reservoir through intake conduit 27 and transmits it to a control valve 2V. This valve, in turn, alternately transmits the fluid under pressure to the rear end of motor 6M to effect forward movement of the tool-head at rapid traverse or feed rates, or into the opposite end of the cylinder to retract the tool-head at a rapid traverse rate or back to the reservoir when the operating cycle has been completed. The maximum pressure in the system is determined by a relief valve 27ᵍ connected with the pump discharge conduit and having a by-pass connected back to the reservoir.

The hydraulic system designated as III actuates the tool-head 3H which carries the tools for the third and fourth operating stations. This system is similar to system II and comprises a reservoir 7R, pump 7P adapted to draw fluid from the reservoir through conduit 28 and to transmit it through suitable conduits to a control valve 3V, which, in turn, is connected with opposite ends of the hydraulic motor 7M which actuates the head 3H. This valve effects rapid traverse forward of the tool-head to position the various tools adjacent the bearings they are intended to bore, a slow forward feed to effect the boring operations and a rapid traverse return to withdraw the tools from the completed workpieces. A by-pass line connected with the valve returns the fluid back to the reservoir while the head is stationary between operating cycles. Maximum pressure available in the system is determined by a relief valve 28ᵍ connected with the pump discharge line and having a connection back to the reservoir.

The hydraulic circuit IIII, shown in Fig. 22, comprises a reservoir 1R, a pump 1P adapted to draw fluid therefrom through conduit 29 and discharge it through a conduit connected with a valve 6V. This valve is connected by suitable conduits to the opposite ends of the hydraulic motor 2M which serves to control the movement of the temporary work-stops hereinbefore referred to. The discharge line of the pump is also connected with a valve 4V which controls the actuation of feed index motor 1M, and also with a valve 5V which in turn is connected with the latch actuating motor 4M. Further, the pump discharge line is connected with a work-transfer-control valve 7V adapted to be shifted by the latch-actuating mechanism and serving in one position to direct fluid to the lower ends of the work-transferring hydraulic motors 3M to elevate the workpieces into the fixtures and, in another position, to direct fluid into the opposite ends thereof to lower the workpieces. Maximum pressure in the system IIII is determined by a relief valve 29ᵍ connected with the discharge line of the pump 1P and having a suitable connection back to the reservoir. Suitable drain lines also connect from the valves 4V, 5V, 6V, and 7V back to the reservoir.

The hydraulic systems, I, II, III, and IIII are shown more in detail in Figs. 23, 24, 25, and 26, to which attention is now directed in connection with the following detail description. System I comprises the reservoir 5R, the pump 5P adapted to draw fluid from the reservoir through conduit 26 and discharge it through a conduit 26ᵃ to a control valve 1V. A pressure relief valve 26ᵍ connected in the conduit 26ᵃ intermediate the pump 5P and the valve 1V and having a by-pass conduit 26ʰ limits the maximum pressure in the system. The valve 1V, is substantially similar in construction to the valves 2V and 3V, one of which is shown in section in Fig. 27, and differs therefrom only in that it is provided, in addition, with ports 91 and 94 (shown in Fig. 28) which connects by conduits 91ᵃ and 94ᵃ with intake and exhaust ports 92 and 93 respectively, of the feed rate control valve 8V shown in section in Fig. 31. From the valve 1V a conduit 26ᵇ connects with the rear end of hydraulic motor 5M which comprises a cylinder 26ᶜ carried by the sub-frame 1 and a piston 26ᵈ connected by piston rod 26ᵉ with the translatable head 1H. Another conduit 26ᶠ connects the valve 1V with the opposite end of the motor 5M. The valve 1V determines the flow of fluid into the motor 5M to effect the desired direction of translation of the tool-head and that valve, together with the valve 8V controls the rate of movement of the tool-head during a machining operation. A discharge conduit 26ⁱ extends from the valve 1V back to the reservoir to return thereto the fluid discharged by the hydraulic motor 5M in either of its reciprocations. Detail description of the valves 26ᵍ, 1V, and 8V will hereinafter be given.

Fig. 24 shows the hydraulic system II for actuating the right front tool-head 2H. As hereinbefore stated this system comprises a reservoir 6R and a pump 6P which draws fluid from the reservoir through conduit 27. A conduit 27ª connects the discharge port of the pump with a control valve 2V, (shown in section in Fig. 27) and has embodied therein a pressure relief valve 27$^g$ which determines the maximum pressure in the system and which has a by-pass conduit 27$^h$ extending back to the reservoir. This relief valve is similar in construction to relief valve 26$^g$ which is shown partly in section in Fig. 30. The valve 2V is connected by a conduit 27$^b$ with the rear end of motor 6M comprising a cylinder 27$^c$ carried by the sub-frame 2 and a piston 27$^d$, connected by piston rod 27$^e$ with the translatable head 2H. Fluid flowing through the conduit 27$^b$ effects forward movement of the head toward the work and the rate of movement is controlled by the valve 2V. Another conduit 27$^f$ connects the valve with the opposite end of the motor to effect retraction of the tool-head. A discharge conduit 27$^i$ connected with the valve 2V serves to return to the reservoir the fluid discharged by the motor 6M.

The system III for the head 3H is similar to that for the head 2H and comprises the reservoir 7R, pump 7P having intake and discharge conduits 28 and 28$^a$ respectively, the latter of which connects with the control valve 3V. Pressure relief valve 28$^g$, embodied in the conduit 28$^a$ and having a by-pass 28$^h$, limits the pressure in the system. The hydraulic motor 7M comprises a cylinder 28$^c$ carried by the sub-frame 3 and a piston 28$^d$ connected, by piston rod 28$^e$, with the head 3H. Conduits 28$^b$ and 28$^f$ connect the valve 3V with opposite ends of the cylinder 28$^c$ and serve to transmit fluid under pressure thereinto to effect forward or reverse movements of the tool-head. The rate and direction of movement of the tool head is controlled by the valve 3V. A discharge conduit 28$^i$ extending from the valve 3V back to the reservoir serves to return to the reservoir the fluid discharged by the motor 7M. The pressure relief valve 28$^g$ is similar in construction to the valve 26$^g$, shown in Fig. 30. The valve 3V is similar to the valve 2V shown in section in Fig. 27. Further illustration of these valves is, therefore, deemed unnecessary.

The hydraulic circuit IIII for actuating the work-carriers, the work-transferring devices, the work-holding latches and the temporary workstops is illustrated in Fig. 26. This system comprises a supply reservoir IR, preferably located within the sub-frame 3, a pump IP adapted to draw fluid from the reservoir through an intake conduit 29 and discharge it through a conduit 29$^a$ which connects with the intake ports of control valves 4V, 5V, 6V, and 7V. A pressure relief valve 29$^g$, connected with the conduit 29$^a$ and having a by-pass conduit 29$^h$ connected with the reservoir, serves to determine the maximum pressure in the system. The valve 29$^g$ is similar to the valve 26$^g$ shown in detail in Fig. 30. If desired, a single reservoir embodied in the sub-frame 3 may be employed for the systems III and IIII in place of the individual reservoirs 7R and IR.

The pressure line 29$^a$ connects with the control valve 4V which, in turn, is connected by conduits 29$^b$ and 29$^c$ with the opposite ends of the work-indexing motor IM. This motor comprises a cylinder 29$^d$ supported horizontally on the pedestal F and a piston 29$^e$ slidingly fitted within said cylinder and connected by piston rod 9 with the conveyor slide-bar 4$^a$, as shown in Figs. 3 and 4. Thus when fluid under pressure is admitted through the conduit 29$^b$ into the cylinder 29$^d$ the work-carriage is advanced to place a new workpiece in the first machining station and also to advance one step each workpiece in the machine. When fluid pressure is admitted into the cylinder 29$^d$ through conduit 29$^c$ the work-carriage is indexed backwardly or, in other words, retracted preparatory to a subsequent advancing movement.

The pressure line 29$^a$ also connects with valve 6V having conduit connections 30$^a$ and 30$^b$ with opposite ends of hydraulic motor 2M. This motor comprises a cylinder 2$^m$, supported by the arch frame F$^1$, a piston 2$^p$ slidingly fitted therein and a piston rod 2$^r$ connected to the piston. As hereinbefore set forth downward reciprocation of the piston rod (by flow through conduit 30$^a$) acts, through certain racks and pinions above described, to place the temporary limit stops 13 in the path of the workpieces as they are moved into the fixtures F$^2$, and upward reciprocation of the piston 2$^p$ retracts the stops and permits the workpieces to be moved into machining position.

The fluid pressure line 29$^a$ of the hydraulic system IIII also is connected with a valve 5V which, as hereinafter will be set forth, controls the action of the latch actuating hydraulic motor 4M and the work-transferring or elevating motors 3M. A conduit 31$^a$ connects the valve 5V with one end of the cylinder 4$^m$ of the latch actuating motor and flow of fluid therethrough serves to retract the piston 4$^p$ which, through the elements 17$^d$, 17$^c$, 17$^a$, and 17$^b$ withdraws the collars 17$^e$ on rods 17$^a$ and 17$^e$ away from the spring pressed latch levers L$^1$ to permit the off-set ends L$^3$ thereof to engage beneath the lugs 11$^n$, as hereinbefore described. Another conduit 31$^b$ connects the valve 5V with the opposite end of the cylinder 4$^m$ of the motor 4M.

The valve 7V, which is shifted by the latch actuating mechanism in its last ⅛ inch movement into latch and unlatching positions, has its intake port connected with the pump discharge line 29$^a$. A conduit 31$^c$ connects the valve 7V with a pressure maintaining valve 9V. Another conduit 31$^x$ connects that valve with the ends of the work-transfer cylinders 11$^a$, while a conduit 31$^m$ connects the valve 7V with the upper ends of said cylinders. Thus by actuation of the valve 7V fluid under pressure may be alternately admitted into the lower end of the cylinders to raise the workpieces into the fixtures and into the upper ends thereof to lower the workpieces therefrom. The pressure maintaining valve 9V embodied in the conduit 31$^c$ serves, when the workpieces are being lowered, to maintain a back pressure of about 400 pounds per square inch in the lower end of the cylinder and inasmuch as the relief valve 29$^g$ is set at 600 pounds this will maintain a pressure in the conduit 29$^a$ across the valve 5V and in conduit 31$^b$ which will insure that the latches will be held out while the work elevators move.

The pressure maintaining valve 9V comprises a chamber 31$^d$ having a port 31$^e$ to which the conduit 31$^c$ is connected, a port 31$^f$ to which the conduit 31$^x$ is connected, and a connecting cross-port 31$^g$. A spring pressed valve plunger 31$^h$ normally closes the port 31$^f$ from the port 31$^g$ and prevents flow of fluid from the conduit 31$^x$ to the conduit 31$^c$ until a pressure of approximately 400 pounds per square inch has been built up in the conduit 31$^x$. A ball check valve 31¹ permits a substantially unrestricted flow from the port 31ᵉ to the port 31ᶠ when the work-transfer pistons 11ᵇ are being elevated but prevents flow from the port 31ᶠ to the port 31ᵉ during the opposite movement of the piston.

Each of the valves 4V, 5V, 6V, and 7V has a discharge port connected with a discharge conduit 32 which extends back to the reservoir 1R to return thereto the fluid discharged by the various hydraulic motors. Detail description of the valves 4V, 5V, 6V, and 7V is given elsewhere in this specification.

Globe valves GV are embodied in the fluid pressure lines in advance of the valves 1V, 2V, 3V, 4V, 5V, and 6V, thereby to permit the flow through those valves to be discontinued when it is desired to control the machine manually, as hereinafter will be described.

Control valves

Control valves 2V and 3V, for controlling the movements of the heads 2H and 3H, are identical in construction and operation and, therefore, a detailed description of one will suffice for both. Valve 1V for controlling the movements of head 1H is only slightly different from the valves 2V and 3V and that slight difference will hereinafter be described with reference to Fig. 28.

Fig. 27 shows a sectional development of the valve 2V which consists of a casing 33 provided with bores 33ˣ within which are slidingly fitted piston valves 33ᵃ and 33ᵇ normally pressed upwardly, by springs 33ᶜ, into engagement with collars 33ᵈ and 33ᵉ formed on vertically arranged actuating rods 2V² and 2V¹ slidingly mounted in end caps 33ʰ—33ʰ' and 33ⁱ—33ⁱ' secured to the casing 33 and closing the bores 33ˣ. The lower end of the rod 2V² is connected, by coupling 33ʲ, with the core 33ᵏ of a solenoid 2A adapted, when energized, to draw the rod 2V² and the piston 33ᵃ downwardly, in opposition to the spring 33ᶜ. The rod 2V¹ is similarly connected by coupling 33ᵐ with the core 33ⁿ of a solenoid 2B likewise adapted, when energized, to draw downwardly the rod 2V¹ and the valve piston 33ᵇ.

Pivotally mounted on ears 33ᵒ and 33ᵖ on the end caps 33ʰ and 33ʰ', respectively, are latch levers 34 and 35 adapted, when the rods 2V² and 2V¹ are drawn downwardly by the solenoids 2A and 2B, to be swung counterclockwise into engagement with abutments 33ʳ and 33ˢ provided by the ears 33ᵒ and 33ᵖ respectively, by spring pressed plungers 34ᵃ and 35ᵃ. In this position of the latch levers 34 and 35 their depending ends 34ᵇ, 35ᵇ overlie the upper ends of the rods 2V²—2V¹, as shown in dotted lines in Fig. 27 and thereby prevent upward movement of the rods and the piston valves 33ᵃ and 33ᵇ under the influence of the springs 33ᶜ. The upper ends of the latch levers 34, 35 carry rollers 34ᶜ, 35ᶜ adapted, when the latches are in their dotted line position to be engaged by suitable dogs carried by head 2H, thereby to cause the latches to be swung to their full line position, Fig. 27 and to release the rods 2V²—2V¹ and permit them and the valve pistons to be moved upwardly to the position shown in Fig. 27, it being understood that at that time the solenoids 2A—2B are de-energized. The pressure in the bores 33ˣ at the opposite ends of the piston valves 33ᵃ and 33ᵇ is balanced at atmospheric by vents extending through the centers of the pistons. The end caps 33ⁱ and 33ⁱ' also are provided with vents t which connect with the atmosphere.

Fig. 27 shows the valves in the "stop" position, or, in other words, in the position in which they are located at the end of a machining cycle. In this position fluid discharged by the pump 6P enters the valve casing through conduit 27ᵃ, and is directed to the drain conduit 27ⁱ (which connects back to the reservoir) through chamber 36 in the valve casing, about the reduced portion 36ᵃ of the valve piston 33ᵃ, through chamber 36ᵇ, around the reduced portion 36ᶜ of the piston 33ᵇ, through chamber 36ᵈ, about the reduced portion 36ᵉ of the valve 33ᵃ and through chamber 36ᶠ as indicated by the arrows.

The forward end of the motor 6M is connected with the drain conduit 27ⁱ through conduit 27ᵇ, chamber 37 in the valve casing, about the reduced portion 37ᵃ of the valve 33ᵃ, chamber 37ᵇ, through a rate control valve 38, later to described, through passage 37ᶜ, chamber 37ᵈ, about reduced portion 37ᵉ of the valve 33ᵇ, chamber 37ᶠ which connects with chamber 36ᵇ, and thence through 36ᶜ, 36ᵈ, 36ᵉ, and 36ᶠ as above described.

The opposite end of the motor 6M also is connected with the reservoir. This connection is through conduit 27ᶠ which connects with chamber 36ᵈ, through that chamber, around 36ᵉ, through chamber 36ᶠ and thence through conduit 27ⁱ.

To effect rapid traverse forward of the head 2H solenoid 2A is energized. This draws valve piston 33ᵃ downwardly into engagement with the end cap 33ⁱ, in which position it is held by the latch lever 34. Valve piston 33ᵇ remains in the position shown in Fig. 27. Fluid from the pump 6P then flows through conduit 27ᵃ into chamber 36 and thence via 36ᵃ, 36ᵈ, 36ᶜ, 36ᵇ, 37ᵃ, and 37 through conduit 27ᵇ into the forward end of the motor 6M. Fluid in the opposite end of the motor is discharged through conduit 27ᶠ into chamber 36ᵈ where it combines with the fluid discharged by the pump and flows into the forward end of the motor.

To effect forward movement of the tool-head at a slow or "feed" rate the latch 34 is caused to release the valve rod 2V² whereupon the spring 33ᶜ moves the rod and the valve piston 33ᵃ upwardly into the position shown in Fig. 27. The solenoid 2B is energized and draws the valve rod 2V¹ downwardly and valve piston 33ᵇ is caused to engage the end cap 33ⁱ'. The rod and valve are held in this position by the latch lever 35. Fluid then flows from the pump 6P through conduit 27ᵃ into chamber 36 of the valve casing and then via 36ᵃ, 36ᵇ, 37ᶠ, 37ᵉ, 37ᵈ, 37ᶜ, through rate control valve 38 and then through 37ᵇ, 37ᵃ, 37 to conduit 27ᵇ which connects with the forward end of the motor 6M. Fluid is discharged from the opposite end of the motor through conduit 27ᶠ, chamber 36ᵈ, around the reduced portion 36ᵉ of valve 33ᵃ to chamber 36ᶠ from whence it is returned to the reservoir through conduit 27ⁱ.

Retraction of the tool-head 2H at a rapid traverse rate is then effected by energizing the solenoid 2A thus again drawing the rod 2V² and valve piston 33ᵃ to their lowermost positions in which positions they are held by the latch lever 34. The valve 33ᵇ remains latched in its lowermost position. Fluid from the pump 6P then flows through conduit 27ᵃ into chamber 36 and from there about the reduced portion 36ᵃ of the valve 33ᵃ and thence through chamber 36ᵈ and around reduced portion 36ᶜ of valve 33ᵇ to conduit 27ᶠ connected with the rear end of the motor 6M. Fluid discharged from the forward end of the motor flows through conduit 27ᵇ into chamber 37, thence about reduced portion 37ᵃ of valve 33ᵃ, through chamber 36ᵇ, through chamber 37ᶠ, about a reduced portion 37ᵍ of the valve 33ᵇ to a chamber 37ʰ in the valve casing 33. From the chamber 37ʰ the fluid flows through a port 37ⁱ into a chamber 37ᵏ adjacent the valve 33ᵃ and thence around reduced portion 36ᵉ to chamber 36ᶠ, from which it is returned to the reservoir through conduit 27ˡ.

The rate at which the head is advanced during the feeding stroke is determined by the setting of the rate control valve 38. As shown in Fig. 29 this valve may comprise a stem 38ᵃ threaded as at 38ᵇ, in a bore 38ᶜ formed in the casing 33 with which the chamber 37ᵇ is connected. The inner end of the stem 38ᵃ is unthreaded and forms a close fit with a bore 38ᵈ connecting the chamber 37ᶜ and the bore 38ᶜ. This end of the valve stem is provided with an aperture 38ᵉ adapted, by axial adjustment of the valve stem, to be withdrawn more or less from the bore 38ᵈ into the larger bore 38ᶜ. It will be readily understood that should the valve stem 38ᵃ be screwed in sufficiently to locate the aperture 38ᵉ wholly within the bore 38ᵈ no fluid could flow from the chamber 37ᶜ to the bore 38ᶜ and thence through the chamber 37ᵇ and ultimately to the motor 6M and therefore no feeding movement of the toolhead would be effected. Axial adjustment of the valve stem 38ᵃ outwardly withdraws the aperture 38ᵉ from the bore 38ᵈ and permits fluid to flow from the chamber 37ᶜ to the chamber 37ᵇ and from there to the motor. The more the aperture 38ᵉ is withdrawn the greater will be the flow therethrough under a given pressure differential and the faster will the tool-head be moved thereby.

It is well understood that in the operation of machine-tools, due, for example, to variations in the workpiece, etc., the resistance to movement to which the tool or tool-head is subjected may vary considerably, thereby increasing or diminishing the pressure differential across the rate control valve. Unless prevented, this will, with a given setting of the rate control valve, result in a varying flow through the control valve and irregular feeding movements of the tool which obviously is objectionable. This invention proposes to eliminate this objectionable feature of prior hydraulic systems by maintaining a given pressure differential across the rate control valve whereby the flow therethrough will be constant and any predetermined rate of feed may be maintained regardless of the resistance to movement to which the tool may be subjected. This has been accomplished by providing in the system a flow of fluid greater than is required for the fastest available feed rate and by-passing from the system intermediate the pump and the rate control valve all except so much of the fluid as is required to maintain a given pressure differential across the control valve. To that end the valve units IV, 2V, and 3V are each provided with a pressure control valve which is subject to the differential pressures on the opposite sides of the rate control valve and which so regulates the amount of fluid by-passed from the system as to maintain the pressure differential constant at a predetermined value.

As shown in Fig. 27 this pressure control valve comprises a feed governor piston 40 slidingly mounted in aligned bushings 41 and 42, fitted within a bore in the casing 33, and provided with disconnected central bores 40ᵃ and 40ᵇ extending from a central dividing wall to the opposite ends of the piston. A relatively small radial port 40ᶜ formed in the piston 40 connects a chamber 37ˣ, which is in communication with the chamber 37ᶜ, with the central bore 40ᵇ and thereby subjects the lower end 40ˣ of the piston in the bushing 42 to the pressure in said chambers 37ᶜ and 37ˣ. A coil spring 43 located within the bore 40ᵃ and bearing at one end against the piston 40 and at the other end against a cap 44 normally tends to shift the piston 40 downwardly (as in Fig. 27) to cause the cone 40ᵈ of the piston to close the normally open end 42ᵃ of the bushing 42 thereby to prevent flow of fluid from the chamber 37ˣ through the bushing 42, out through radial ports 42ᵇ and through chamber 36ᵐ connected with the chamber 36ᵈ. The other end 40ʸ of the valve piston 40, i. e. the end containing the spring 43, is continuously subjected to the pressure in a chamber 37ᵇ' constantly in communication with the chamber 37ᵇ, being connected therewith through longitudinal groove 40ᵉ and annular groove 40ᶠ in the piston and small radial port 41ᵃ and annular groove 41ᵇ in the bushing 41.

From the foregoing it will be perceived that one end of the pressure control valve 40 is constantly subject to the pressure in chamber 37ᶜ at one side of the rate control valve 38 and the opposite end of the piston is constantly subject to the pressure in the chamber 37ᵇ at the opposite side of the rate control valve. When these pressures are equal the valve is balanced hydraulically but the spring 43 holds the cone 40ᵈ on the seat 42ᵃ with a certain pressure, the value of which corresponds to the desired pressure differential across the rate control valve.

In order that the function of the pressure control valve may be clearly understood a typical operation thereof will be described. Assume that it is desired to have the head feed forward at a rate such as will be produced by a flow of fluid through the rate control valve under a given setting and under a pressure differential of ten pounds per square inch. Assume also that the area of each end of the pressure control valve 40 is one square inch. Then the strength of the spring must be ten pounds. The spring forces the cone 40ᵈ of the valve against the seat 42ᵃ of the bushing and closes same to prevent flow of fluid from the chamber 37ˣ (which in turn is connected with the pressure line) to the discharge line connected back to the reservoir. Fluid then flows through the rate control valve until a pressure of ten pounds per square inch is built up in the chambers 37ᵇ and 37ᵇ' and on the end 40ʸ of the pressure control valve. Inasmuch as the supply is greater than the demand, pressure also will build up on the end 40ˣ of the pressure control valve. When this pressure has exceeded the combined hydraulic and spring pressures on the end 40ʸ of the valve it shifts the valve axially and lifts the cone 40ᵈ from the open end 42ᵃ of the bushing 42. This permits the escape of the total amount of oil entering the valve through conduit 27ᵃ less the amount required to pass through the rate control valve to maintain a pressure of ten pounds in the chamber 37ᵇ and the intake side of the motor.

Should for any reason the movement of the piston tend to slow up (which might, for example, be effected by the tool engaging a hard spot in the workpiece) a continued flow through the valve 38 would cause the pressure in the chamber 37ᵇ and on the end 40ʸ of the valve piston 40 to be increased. This would shift the valve piston 40 axially, causing the cone portion 40ᵈ to close the open end 42ᵃ of the bushing and thereby discontinuing the discharge therethrough until the pressure in the chamber 37ᶜ and on the end 40ˣ of the valve piston has again built up to a value ten pounds in excess of the pressure in chamber 37ᵇ, at which time the piston 40 is again shifted axially to open the discharge or by-pass line.

Should the pressure in the motor and chamber 37ᵇ drop below the desired ten pounds differential the pressure on end 40ˣ of the valve would cause the valve to be shifted in opposition to the spring 43 thereby lifting the cone 40ᵈ from the seat 42ᵈ. This increases the capacity of the by-pass line and therefore reduces the pressure in the chamber 37ᶜ to produce the required pressure differential of ten pounds across the valve 38. Thus it will be seen that by-passing varying amounts of the pressure fluid the pressure control valve effectively maintains any desired pressure differential across the rate control valve.

It is to be noted that the pressure regulating valve is controlled by a shunt circuit 37ˣ, 40ᶜ, 40ᵇ—37ᵇ', 41ᵇ, 41ᵃ, 40ᵉ, 40ᵃ taken off the main hydraulic circuit 37ᶜ—37ᵇ and not by the main circuit itself. Also that the shunt circuit includes restricted ports and passages which permit only a relatively slow flow of fluid to the opposite ends of the control valve. This construction and arrangement is important as it obviates chattering of the valve by surges or pulsations in the flow due to the action of the pump or sudden variations in the resistance to movement, and produces a smooth and even control for the system.

Valves 1V and 3V are actuated by solenoids 1A—1B and 3A—3B which correspond to solenoids 2A—2B of the valve 2V and their actuating rods (corresponding to the rods 2V¹ and 2V² of valve 2V) are numbered 1V¹—1V² and 3V¹ and 3V².

Valve 1V

Fig. 28 shows that portion of valve 1V, (which controls the movement of head 1H) which differs from the valves 2V and 3V above described in detail. In this valve instead of the chamber 37ᵇ extending from the rate control valve 38 directly to the chamber 37 of the valve 33ᵃ it is connected thereto indirectly through the second feed rate control valve 8V as shown in Fig. 23. A port 91 formed in the valve casing 33 connects with the chamber 37ᵇ and a port 94 connects with the chamber 37. These ports are connected by conduits 91ᵃ—94ᵃ, respectively, with the intake and discharge ports of the second rate feed control valve 8V. Thus any flow of fluid through the valve 38 must pass through the second rate feed control valve before it can pass through chamber 37 and conduit 26ᵇ to the motor 5M. Otherwise the valve 1V is the same as valve 2V shown in Fig. 27.

Second rate feed valve

The second rate feed control valve 8V is shown in section in Fig. 31. This valve comprises a casing 45 provided with a bore 45ᵃ, in which is slidingly fitted a valve piston 45ᵇ, and inlet and outlet ports 92 and 93, respectively, connected by conduits 91ᵃ and 94ᵃ with the ports 91 and 94 of the valve 1V. A coil spring 45ᶜ fitted within the bore 45ᵃ and engaging the piston 45ᵇ serves to hold the piston in its uppermost or "off" position at all times except during the second rate feed which may be used for the counterboring operations. In this position of the valve it has no effect on the flow of fluid, permitting a free flow from the port 91 of the valve 1V through conduit 91ᵃ into intake port 92 of the valve 8V, through chamber 45ᵈ, around reduced portion 45ᵉ of the valve piston, through outlet port 93 and conduit 94ᵃ to the port 94 of valve 1V. To an ear 46, formed on the valve casing 45, there is fulcrumed a lever 47 having a rounded portion 47ᵃ which bears against the upper end of the valve piston 45ᵇ and a portion 47ᵇ adapted, during reciprocation of the head 1H, to be engaged by a suitable dog carried by that head. At the proper time in the feed cycle the dog depresses the lever 47 which in turn depresses the piston valve to the dotted line position shown in Fig. 31. In this position fluid flowing through conduit 91ᵃ into port 92 flows about the reduced portion 45ᵉ of the valve piston 45ᵇ, into a chamber 45ᶠ, through a port 45ᵍ, and thence through a throttle valve 48 and port 45ʰ to the outlet port 93. Thus the rate of flow through the valve 8V is restricted and the head 1H is caused to advance at a reduced rate. This rate may be varied by adjustment of the throttle valve 48.

Valve 4V

Valve 4V which controls the hydraulic motor 1M, which in turn actuates the work-carrier, comprising the slide-bars 4ᵃ—4ᵇ and the work-receiving plugs 5ᵃ—5ᵇ is shown in section in Fig. 32 with the parts in the neutral position or, in other words, in the position which they occupy after the completion of a cycle which includes the forward movement of the work-carrier to receive two new workpieces. This valve comprises a casing having ports 53, 52, 54, and 55 to which are connected, respectively, the fluid pressure conduit 29ᵃ, the conduit 29ᵇ connected with the forward end of the hydraulic motor 1M, conduit 29ᶜ connected with the rear end of said motor, and conduit 32 constituting a drain and extending back to the reservoir. A valve piston 51 slidingly mounted in a bore in the casing has reduced annular portions 51ᵃ, 51ᵇ, and 51ᶜ adapted, in various positions of the piston, to connect certain ones of said ports as hereinafter will be described. At one end the piston 51 is connected by a lost motion connection 51ᵈ with an actuating rod 56, a coil spring 51ᵉ interposed between the end of the piston and a shoulder on the rod 56 normally holding the two in the position shown in Fig. 32. The rod 56 is coupled by connection 56ᵃ with the core f of a solenoid F. A second solenoid E has its core e connected by link e¹ and lever e², pivoted at e³ on an ear e⁴ on the valve casing, with the actuating rod 56. The opposite end of the piston 51 is coupled to one end of a rod 57, the other end of which is pivoted to one arm 58ᵃ of a bell-crank lever 58 fulcrumed on a stud 58ᵇ threaded into the pedestal F. The other arm 58ᶜ is connected to one end of a feeler rod 59, the free end of which is adapted to engage the side of the feed slide bar 4ᵃ (see Figs. 3 and 4) and, when the feed carriage has been advanced to carry new workpieces into the first machining station and to advance each of the workpieces previously operated on, to enter an aperture 59ᵃ in the slide-bar 4ᵃ for a purpose later to be described.

In the position shown in Fig. 32 solenoids E and F are de-energized and valve piston 51 is held in engagement with the head 56ᵇ of the rod 55 by the spring 51ᵉ. The pressure line 29ᵃ is connected with the conduit 29ᶜ by ports 53 and 54 and the reduced portion 51ᵇ of the valve piston. Conduit 29ᵇ, connected with the forward end of the motor 1M, is connected with the drain conduit 32 through ports 52 and 55 and reduced portion 51ª of the valve piston.

The starting of an operating cycle is effected by actuating a suitable switch to close an electric circuit which causes the solenoid E to be energized. This causes the core e to be drawn inwardly thus swinging the lever e² counter-clockwise, as viewed in Fig. 32 which in turn shifts the rod 56 from the position indicated by the arrow Z to the position indicated by arrow Y. This shifts piston 51 and the rod 57 from the position shown in Fig. 32, and indicated by the arrow C, to the position indicated by the arrow B, the piston and the rod 57 being held against further movement to the left by reason of the fact that the free end of the rod 59 has been brought into contact with the side of the feed slide 4ª. The rod 56 has a greater axial movement than the valve piston 51 and the connecting rod 57, this being permitted by compressing the spring 51ᵉ and taking up the lost motion between the head 56ᵇ and the end of the valve piston. Shifting of the valve piston 51 to the position indicated by the arrow B causes fluid to flow from the pressure line 29ª, through port 53, about the reduced portion 51ᵇ of the valve and thence through port 52 and conduit 29ᵇ to the forward end of the hydraulic motor IM. This causes the piston 29ᵉ and the feed carriage including the slide bars 4ª and 4ᵇ to be moved toward the rear of the machine, the end of the feeler rod 59 being maintained in engagement with the slide bar 4ª by the spring 51ᵉ. During the indexing movement of the feed carriage fluid discharged from the rear end of the motor IM flows through conduit 29ᶜ into port 54 of the valve 4V, thence through cross port 54ª to port 55 and back to the reservoir through conduit 32.

When the feed slide has reached the end of its feed indexing movement the aperture 59ª is brought adjacent the end of the feeler rod which thereupon, under the influence of the spring 51ᵉ, enters the aperture thus permitting the valve piston 51 and the rod 57 to be moved to the position indicated by the arrow A. In this position the pressure line 29ª continues to be connected with the conduit 29ᵇ.

Secured to the casing of the valve 4V is a normally open limit switch S1 which controls an electric circuit connected with a solenoid H which actuates the valve 5V. As before stated, the valve 5V controls the hydraulic circuit which actuates the latch actuating motor 4M and the work-transferring motors 3M. A switch actuating lever 60, fulcrumed on a pin 60ª carried by an ear 60ᵇ on the valve casing, has one end 60ᶜ in engagement with the switch S1 and another end 60ᵈ adapted to be engaged by a shoulder 57ª on the rod 57. As the rod 57 moves from the position B to the position A the shoulder 57ª engages and swings the lever 60 thus causing it to close the limit switch S1, thus causing the solenoid H of the valve 5V to be energized.

At a predetermined time in the machining cycle the head 3H closes a limit switch S17 which causes solenoid F to be energized. This causes the core f to be pulled inwardly thus shifting the rod 56, valve piston 51 and connecting rod 57 to the right as seen in Fig. 32 to the positions indicated by the arrows C and Z. In this position of the valve piston the fluid pressure line 29ª is connected, through port 53, reduced portion 51ᵇ of the valve piston and port 54 with the conduit 29ᶜ which is connected with the rear end of motor IM. Thus the piston 29ᵉ and the work-carriage attached thereto are moved forwardly to loading position, the fluid in the forward end of the motor being discharged back to the reservoir through conduit 29ᵇ, port 52, reduced portion 51ª of valve 51, port 55 and conduit 32.

Valves 5V, 6V, and 7V

The valves 5V, 6V, and 7V which control, respectively, the hydraulic motors 4M, 2M, and 3M are identical in construction each being adapted to effect a flow of fluid under pressure first to one end of one or more hydraulic motors and then to the opposite end thereof. Each of the valves 5V and 6V comprises a sliding piston connected at its opposite ends to electric solenoids each of which, when energized, causes the valve piston to be shifted axially in one direction. The valve 7V is actuated mechanically by the movement of the latch-actuating rods 17ª and 17ᵇ. Inasmuch as the valves are identical, a detailed description of one will suffice for all three. For convenience, the valve 5V will be described, see Fig. 33.

The valve comprises a casing having ports 61, 62, 63, and 64 connected, respectively, with the pressure conduit 29ª, the forward conduit 31ª, the reverse conduit 31ᵇ and the drain conduit 32. A piston valve 65, slidably mounted in the casing, is provided with reduced annular portions 65ª, 65ᵇ, and 65ᶜ adapted to permit the flow of fluid thereabout.

The valve piston is connected at one end by coupling rod 66ª with the core g of an electric solenoid G. At its opposite end it is connected by coupling rod 66ᵇ with the core h of an electric solenoid H. In Fig. 33 the valve piston is shown in the position to which it is moved when the solenoid H is energized. In this position it connects the pressure line 29ª with the conduit 31ª through port 61, reduced portion 65ᵇ of the valve piston and port 62. The conduit 31ᵇ is connected to the drain conduit through port 63, reduced portion 65ª and port 64. When the solenoid H is de-energized and the solenoid G is energized the valve piston is shifted to the left and connects the pressure line with the conduit 31ᵇ via 61, 65ᵇ, and 63, and the conduit 31ª is connected to the drain via 62, 65ᶜ, and 64.

The foregoing description of valve 5V will also suffice for valves 6V and 7V, the only differences being that in the latter valves the conduits which correspond to conduits 31ª and 31ᵇ connected with valve 5V are numbered 30ª and 30ᵇ and 31ᶜ and 31ᵐ respectively. The solenoids which actuate valve 6V are lettered K and J respectively instead of G and H. Valve 7V is actuated mechanically by the latch-actuating mechanism.

Pressure relief valves

Fig. 30 shows a sectional elevation of the pressure relief valve 26ᵍ hereinbefore referred to. Inasmuch as the pressure relief valves 27ᵍ, 28ᵍ, and 29ᵍ are similar in construction and operation to this valve a description of one will suffice for all.

The valve comprises a casing 67 having inlet and outlet ports 67ª and 67ᵇ and a by-pass or drain port 67ᶜ connected back to the reservoir by a suitable conduit. Within a bore 67ᵈ, formed in the casing 67, is a plunger 68 normally maintained in the position shown in Fig. 30, with one end in engagement with a cap 69, by a coil spring 70 arranged mainly within a housing 70ª screwed into the casing 67. One end of the spring engages one end of the plunger 68 and the other end engages a collar 70b carried by one end of an endwise adjustable screw 70c threaded through a portion of the housing 70a. The tension of the spring 70 may be varied by adjustment of the screw 70c. One end of the plunger 68 is formed with a bore 68a into which is fitted a piston 71 having an enlarged head 71a seated against the cap 69. A small radial port 68b connects the inner end of the bore 68a with a chamber 67x connecting the ports 67a and 67b. Thus the inner end of the bore is subject to the pressure in the chamber 67x and when the pressure in the bore exceeds the strength of the spring 70 the plunger 68 is caused to be shifted axially to the right. When the plunger has moved sufficiently to cause the reduced portion 68c to communicate with a chamber 67e in the casing 67 and with which the drain port 67c connects, a portion of the fluid entering the valve through port 67a will be by-passed to the reservoir thereby preventing the building up of pressure in the system above the pressure determined by the setting of the spring 70.

It is to be noted that each of the valves IV, 2V, 3V, 4V, 5V, 6V, 7V, 26g, 27g, 28g, and 29g is provided at its opposite ends with vents $t$ which lead to the atmosphere. If desired, small drain pipes (not shown) may be connected with these vents and extend back to the reservoirs to return thereto any fluid which may escape from the valves.

*Electric controls and actuating means therefor*

In this application there are shown and described a number of relays each of which may be of conventional construction, and comprise a coil, a magnetic structure and a switch or switches actuated by the magnetic structure. To facilitate an understanding of the various parts of these relays, each relay is designated CR followed by a suitable number, such for example as CR8, and the switch thereof is given a similar number followed by an exponent $a$ or $b$, for example CR8a. The exponent $a$ is used to designate those switches which are closed when the relay is energized and opened when the relay is deenergized. The exponent $b$ indicates that the switch is opened when the relay is energized and closed when the relay is deenergized. A similar system of reference characters are used for various other electrically actuated devices, for example FO indicates the forward contactor for one of the motors and FOa a switch which is closed thereby. This contactor is similar in construction and operation to a conventional relay. Likewise, 3A designates a solenoid which actuates a valve and 3Ab a switch which is opened when that solenoid is energized. TRI designates a time relay and TRIa designates the switch which is closed thereby.

The various hydraulic systems hereinbefore described and the means for starting and stopping the rotation of the boring spindles and bringing them to rest in a predetermined angular position with the boring tools aligned with the clearance apertures in the spindle bushings are controlled electrically. The controlling electric circuits are designed to produce the desired cycle of movement of the work-carriage, the work-transfer devices, the reciprocating tool-heads and the rotation of the tool spindles and they are so arranged and interlocked as to preclude inconsistent movement of those elements. Conveniently the various movable elements may be utilized to actuate switches which control the various electric circuits. These various electric circuits, their control switches and the means for actuating the switches will now be described.

At the upper side of the work-fixtures F2 there are fulcrumed a plurality of switch actuating levers 75a, 75b, 75c, 75d, 75e, 75f, 75g, 75h. One end of each lever is connected to a plunger 76 normally maintained depressed by a coil spring 76a. In the two core-reaming stations, the lower end of each plunger is normally located slightly below the lower face of the fixed work-stops 12 and in the two boring stations they are normally maintained slightly below the lower face of the temporary work-stops 13, when those stops are in their lowermost positions. The opposite ends of the levers 75a, 75b, 75c, 75d, 75e, 75f, 75g, 75h, are adapted, when the plungers 76 are forced upwardly by the workpieces, to actuate switches S28, S27, S5, S4, S13, S12, S11, S10 respectively. These switches are all double throw switches serially connected and in one position form a part of an electric circuit which, when fully established, energize solenoids 1A, 2A and 3A which in turn actuate the valves IV, 2V, and 3V to effect a rapid forward traverse movement of the tool-heads 1H, 2H and 3H. In the two boring stations, final upward movement of the work-pieces (which is effected by the withdrawal of the temporary stops 13) causes a further actuation of the levers 75e, 75f, 75g, and 75h. By this movement, they actuate additional switches S25, S24, S23, and S22 connected in series and forming a part of another electric circuit which, when fully established, starts the rotation of the electric motor 3K, which rotates the boring bars of the head 3H.

The switches S28, S27, S5, and S4, as above stated, are double-throw switches and, when their actuating plungers 76 are in depressed position (work-pieces "down"), they are closed and form a part of a starting electric circuit which, when completely established, initiates an automatic operative cycle of the machine. This latter circuit also includes double-throw switches serially connected S15, S16, and S17 which are closed to one position upon the final retractive movement of the heads 1H, 2H, and 3H, by dogs D5, D15, and D20 respectively, carried by said heads; the switches S10, S11, S12, and S13 above referred to, which are closed to another position when the work-pieces are in their "down" position; a double-throw switch S21 which is closed to one position when the work-transferring devices are down; a normally closed switch CR12b; and a manually operable start switch AS. The switch S21 is actuated by the oscillatory movement of an arm 20a secured upon the shaft 20 which is oscillated by the hydraulic motor 2M and which, through the slide bars 22, cams 18b etc., determines the positions of the temporary work-stops 13. The switch S21, when in its other position, (i. e. when the temporary work-stops are up) constitutes a part of the electric circuit which controls the rotation of the boring bar driving motor 3K, as later will be described.

As the heads 1H, 2H, 3H start forward from their retracted positions the dogs D5, D15, and D20 close the switches S15, S16, and S17 to another position in which they are serially arranged in an electric circuit which, when completely established energizes solenoid F which shifts valve 4V to a position in which it effects, through hydraulic motor 1M, retraction of the feed carriage, the solenoid E being at that time de-energized.

Under the sub-heading "Valve 4V" it has been explained that the establishing of the starting circuit energizes the solenoid E which, in turn, shifts the piston of the valve 4V and effects a feeding movement of the work-carriage to place the new workpieces in the first operating station. It is also explained that, at the completion of the feed movement of the carriage, the switch S1 is closed which completes an electric circuit which then energizes solenoid H and shifts the valve 5V to one position in which it actuates the hydraulic motor 4M thereby to cause the work-retaining latches L¹ to be rendered effective. This actuation of the motor 4M also shifts the valve 7V which then causes the work-transferring devices to be elevated. Upon retraction of the work-carriage, a dog D29 carried thereby closes a normally open switch S9 and completes an electric circuit which, when completed (by the complete retraction of the three heads) energizes a solenoid H which shifts the valve 5V to another position which causes the hydraulic motor 4M to render the latches L ineffective and thereby the valve 7V to effect lowering of the work-transferring devices.

During rapid traverse forward of the head 1H, a dog D2 carried thereby closes a normally open switch S3 and a dog D1 also carried by the head trips the latch lever 34 and releases the valve plunger 1V² which then moves upwardly resulting in the closing of a switch 1A$^b$ in series with the switch S3. The closing of switches S3 and the switch 1A$^b$ completes an electric circuit which energizes the relay CR3 which closes switch CR3$^a$. The closing of switch CR3$^a$ establishes an electric circuit to solenoid 1B of valve 1V. This causes the valve plunger 1V¹ to be drawn downwardly which thereby effects forward movement of the head at a feeding rate. When the tool-head 1H has received the desired forward feed (which has been effected at two different rates as hereinbefore described) it comes into contact with a fixed stop FS1. Just prior to the contact with this stop a dog D3 carried by the tool-head closes a normally open switch S7 embodied in an electric circuit in series with a time relay TR1 which, after a predetermined time, (during which the counterboring and chamfering tools continue to act upon the work without further feed thereby causing them to clean up or "finish" the tooled surfaces) completes the circuit to the solenoid 1A of valve 1V. This causes the valve plunger 1V² to be drawn downwardly and held by the latch 34 and inasmuch as the plunger 1V¹ is, at that time, latched down by the latch 35 the head will start rapid traverse reverse. Downward movement of the plunger 1V² opens the switch 1A$^b$ thus causing the relay CR3 to open and solenoid 1B to be de-energized and as the dog D3 moves away from the switch S7 the latter opens and breaks the circuit to the time relay TR1 and solenoid 1A. At the end of the retractive movement of the head a double faced dog D4, carried by the head, trips the latches 34 and 35 and the plungers 1V¹ and 1V² are moved upwardly and stop translation of the head, the dog D5 again actuating the switch S15 to close a portion of the starting circuit.

As the tool-head 2H moves forward at a rapid traverse rate (which has previously been effected by downward movement of the valve plunger 2V² by solenoid 2A, in which position it is held by latch 34), a dog D8 carried by the head closes a normally open switch S2 and a dog D9 trips the latch 34. As the latch is tripped valve plunger 2V² moves upwardly under the influence of the spring. This movement of the valve plunger effects the closing of a switch 2A$^b$ in series with the switch S2 and when both are closed the circuit to a relay CR5 is completed and effects closing of a switch CR5$^a$. The closing of switch CR5$^a$ completes the circuit to the solenoid 2B of the valve 2V. This causes the piston 33$^b$ of the valve 2V to be shifted to a position in which it effects forward movement of the tool-head at a slow, or feeding, rate.

After a predetermined feed movement of the head a dog D10 carried by the head 2H closes a normally open switch S26 in series with a normally closed switch 2B$^b$ adapted to be opened by the movement of the core of the solenoid 2B when that solenoid is energized. The switch 2B$^b$ ordinarily will be open at the time the switch S26 is closed by dog D10. A dog D11 carried by the head releases the latch 35 which thereby permits the valve plunger 2V¹ to be moved upwardly by spring pressure thereby closing switch 2B$^b$, then current flowing through this circuit energizes the relay CR4 and the switch CR4$^a$ actuated thereby closes and completes a circuit connected with the solenoid 2A of the valve 2V. Valve plunger 2V² thereupon is moved downwardly. This position of the valves effects a second rapid traverse forward of the head 2H to carry the tools adjacent to the next bearings to be machined. As the dog D10 moves away from switch S26 the latter opens, relay CR4 is de-energized and switch CR4$^a$ opens, which breaks the circuit to solenoid 2A. When the tools have almost reached the next bearings a dog D12, carried by the head, closes the switch S2 and another dog D13 also carried by the head shifts the latch 34 from above the valve plunger 2V² which thereupon moves upwardly, under the influence of the spring, closing switch 2A$^b$. This again energizes relay CR5 and causes the relay switch CR5$^a$ to be closed which again energizes solenoid 2B and draws the valve plunger 2V¹ downwardly thereby producing a forward movement of the tool-head at a feeding rate. The head continues to advance at said feeding rate until a dog D14, carried by the tool-head, engages and closes a normally open switch S8 in the circuit to the relay CR4. Switch CR4$^a$ thereupon closes and completes a circuit to the solenoid 2A of valve 2V and the valve plunger 2V² is drawn downwardly. The plunger 2V¹ is then held down by the latch 35 and the head will be given a rapid traverse reverse movement. A fixed stop FS2 is provided to limit forward movement of the head but under normal operating conditions does not function. This stop is provided as an emergency protective feature, only. As the dog D14 moves away from switch S8, that switch and the relay switch CR4$^a$ open, and the solenoid 2A is de-energized. As shown in Fig. 34A the switch S8 is in a shunt circuit around switches S26 and 2B$^b$. When the head reaches its completely retracted position a double dog D7 carried by the head trips the latches 34 and 35 thus permitting the valve plungers 2V¹ and 2V² to be moved upwardly by their springs to shift the valve pistons to positions in which the flow to the head translating motor 6M is discontinued and the head, therefore, comes to rest. The final retractive movement of the head also causes the dog D15 to shift the double-throw switch S16 to close another portion of the starting circuit.

Before the head 3H will start forward, upon the pressing of the start button, certain conditions must obtain, and as these conditions are effected by the movement of certain parts at the completion of a previous cycle those conditions and the manner in which they are attained will now be described, preparatory to describing the new cycle. At the end of a normal machining cycle the boring head 3H comes to rest in its retracted position, a dog D20 carried thereby having shifted the switch S17 into a position in which it closes another portion of the starting circuit hereinbefore mentioned. A double face dog D16 trips the latch levers 34 and 35 of the valve 3V just prior to the head coming to rest and the valve plungers 3V¹ and 3V² move to the stop position. In the retracted position of the boring head a dog D21 carried by the head overlies and opens a normally closed switch S14 in a circuit embodying a rotary limit switch RLS and a time relay TR2 (the time relay TR2 controls a relay CR10 which in turn controls one of two circuits to the solenoid 3A of valve 3V). The opening of the switch S14 breaks the circuit and prevents the time relay TR2 from restarting the head 3H in rapid traverse forward after the dog D16 has tripped the latches 34 and 35 of the valve 3V. Also when the head 3H has reached its retracted position, the workpieces have been lowered and the hydraulic motor 2M has been actuated to retract the slide bars 22 thereby to cause the temporary work-stops to be lowered. One of the slide bars 22, to wit:—the rearmost one, carries a dog D30 adapted during the retraction of the slide bar to engage and close a normally open switch S19 connected in a control circuit embodying switches S17, S16, S15, S10, S11, S12, S13, S4, S5, S27, and S28 and CR7ᵇ for the relay CR6. When the relay CR6 is energized, thus closing switch CR6ᵃ, the other of the two control circuits for the solenoid 3A of valve 3V will be completed and the valve plunger 3V² will be moved to start the head 3H forward at a rapid traverse rate. The relay will not be closed and consequently, the head 3H cannot start forward until the next workpieces have been raised into the work fixtures and have closed the switches S10, S11, S12, S13, S4, S5, S27, and S28 above mentioned.

As the head 3H starts forward at a rapid traverse rate dog D21 permits switch S14 to close, dog D20 throws switch S17 to its other position to connect it in the circuit where it, together with switches S16 and S15 cause the solenoid F of valve 4V to be energized thereby to effect retraction of the feed carriage. Also, forward movement of the boring head removes the dog D16 from above the latches 34 and 35 of the valve 3V to permit those latches to become effective to hold down the valve plungers 3V² and 3V¹ whenever they are drawn downwardly by the solenoids 3A and 3B. The plunger 3V² has, as above explained, already been pulled down by the solenoid 3A and the latch 34, therefore, retains it in that position, after which the relay CR6 may be opened and the solenoid 3A de-energized without affecting the position of valve plunger 3V².

During the rapid traverse movement of the boring head and when the boring bars and the boring tools carried thereby have been projected through the bearing bushings in the work fixtures and each tool has reached a position approximately ¼ inch from the bearing it is designed to bore, a dog D19 carried by the head closes a normally open switch S18 connected in series with a switch 3Aᵇ (controlled by the movement of valve plunger 3V²) in the control circuit to a solenoid K. A dog D17 carried by the head 3H trips the latch 34 of valve 3V and (the solenoid 3A having previously been de-energized) the valve plunger 3V² is moved upwardly thereby discontinuing the traverse movement and bringing the head to rest, and closing the switch 3Aᵇ. The closing of this switch completes the circuit to the solenoid K and the valve 6V is shifted and effects withdrawal of the temporary work stops. Just prior to the head 3H coming to rest one-way acting dog D18 carried thereby depresses and closes a spring pressed double throw switch S6 in series with switch CR7ᵃ in the control circuit for the relay CR8. Relay CR8 controls, in part, the shifting of the forward and high speed boring motor contactors, as later will be explained.

Closing of switch S18 effected shifting of the valve 6V which thereupon admitted fluid pressure into the lower end of motor 2M thus causing the piston 2p thereof to be elevated. This movement will, through the shaft 20 and the rack and gear connections hereinbefore described, cause the cams 18ᵇ to be rotated counter-clockwise as viewed in Figs. 6 and 20 and to remove the portion 18ᵉ from above the stop pins and place the portions 18ᵈ thereabove. The workpieces are then given their final upward movement into machining position against the fixed stops 12. Rotation of the shaft 20 to rotate the cams, as above described, causes the arm 20ᵃ to actuate the switch S21 to connect it in series with the normally open switches S22, S23, S24, S25 (which are closed by the final upward movement of the workpieces) in the control circuit for relay CR7. The completion of this circuit causes relay CR7 to be energized which, in turn, closes switch CR7ᵃ and opens switch CR7ᵇ. Closing of switch CR7ᵃ completes the circuit to relay CR8 which thereupon closes switches CR8ᵃ and establishes a circuit to the forward and high speed contactors FO and HI. When the coils of the contactors are energized the motor control switches actuated thereby are thrown and the driving motor 3K is caused to rotate forwardly at a relatively high rate of speed. Energizing of relays FO and HI also close switches FOᵃ and HIᵃ and thereby establish an electric circuit to solenoid 3B of valve 3V. This causes the valve plunger 3V¹ to be drawn downwardly thereby shifting the valve piston to a position in which it effects forward movement of the boring head at a slow, or feeding, rate. The energizing of coil FO also closes switch FOᵃ′ in the circuit of the relay CR11 which in turn closes switches CR11ᵃ in the brake solenoid SB control circuit. When the brake solenoid is energized it renders ineffective a brake mechanism, later to be described, which normally engages a brake wheel carried by the shaft of the motor 3K. Thus, during forward rotation of the tool spindles, the brake is ineffective.

Closure of the switch HIᵃ also completes the circuit to a relay CR13 which thereupon closes a switch CR13ᵃ in the control circuit of the solenoid ROS which controls a rotary limit switch RLS, later to be described. The relay CR13 also closes the switch CR13ᵃ′ and establishes a holding circuit. This holding circuit is completed, during forward rotation of the spindles at both high and low rates, by a friction relay FR which is rotated by one of the tool spindles. Thus, the high contactor coil HI may be de-energized and the switch HIᵃ opened without de-energizing the relay CR13. Rapid forward rotation of the tool spindles and slow forward feed of the head are continued until each boring tool has completely machined its respective bore, at which time the one-way acting dog D18 passes off and thereby releases the plunger of switch S6 which thereupon moves to its upper position in which it cuts out the forward and high speed contactors and closes a circuit connected with a slow speed contactor LO of the motor 3K, thereby causing that motor to rotate at a relatively slow speed. The head continues to advance until it engages a fixed stop FS3. Closing of the switch S6 also serves to connect a suitable power line with one contact of the rotary limit switch RLS which thereupon in conjunction with a suitable brake takes control of the stopping of the motor and the locking of the spindles in a predetermined position, as hereinafter will be more fully described.

Four electric circuits are controlled by the rotary limit switch as hereinafter will more fully appear. One circuit is connected with the coil of a forward contactor FO and when established causes the motor 3K and the tool spindles to be rotated forwardly. Another which includes a normally open switch CR14a connects with the coil of a motor reverse contactor REV which, when effective, causes the motor 3K to rotate in a reverse direction. The circuit to the time relay TR2 is also controlled by the rotary limit switch and has embodied therein the switch S14, which is closed by the initial forward movement of the head 3H and a switch CR14a'. When this circuit is completely established the time relay is set in operation and after a predetermined period of time effects rapid retraction of the tool-head, as later will be described. The fourth circuit controlled by the rotary limit switch includes a relay CR14 which, when energized closes switches CR14a and CR14a' in the control circuit of the timing relay TR2 and motor reversal contactor. The action produced by the rotary limit switch is as follows:—The forward and reverse circuits connected therewith are alternately rendered effective. This causes the motor shaft and the tool spindles driven thereby to oscillate until the motor comes to rest in such position that the boring tools carried by the spindles are in alignment with the clearance apertures in the fixtures. There is a slight interval of time between the breaking of the forward circuit and the establishing of the reverse circuit and vice versa. During this interval the brake is rendered effective to overcome momentum of the motor and the parts driven thereby. When the forward circuit is rendered ineffective by the rotary limit switch, the switch FOa' is opened, thereby causing the brake to be applied, and the switch Fb in an auxiliary control circuit for the reverse contactor REV is closed. When the reverse contactor is thrown in the spindles turn backwardly and the friction relay FR closes the circuit embodying the switch REVa. This causes the relay CR11 to close switches CR11a which again causes the brake to be released. When the motor is brought to rest both the forward and reverse circuits will be cut out and therefore the switches FOa' and REVa will be open. This causes the brake to be actuated to grip the motor shaft and prevent accidental rotation of the motor and boring bars.

As the rotary limit switch effects the reversal of the motor, preparatory to stopping, it closes the circuit of the time relay TR2 which after a predetermined time, during which the motor and the tool spindles are brought to rest, closes switch TR2a in circuit with relay CR10 which thereupon closes switch CR10a to establish a circuit connected with solenoid 3A of valve 3V. This causes the plunger rod 3V² to be drawn downwardly and, as the plunger rod 3V¹ is thus latched down, the valve 3V then effects rapid retraction of the boring head.

Locating means for boring bars

As hereinbefore stated, an object of this invention is to bring the boring bars to rest after the completion of a boring operation in a predetermined angular position so that the bars and their projecting cutters may be withdrawn through the guide bushings in the work-holding fixtures and subsequently re-inserted therethrough and through the bores in the workpieces. This has been effected by the provision of a rotary limit switch RLS, actuated by the driver for one of the boring spindles 3f, in conjunction with a friction relay FR actuated by the driver for one of the boring spindles 3r, and a solenoid actuated brake device.

The rotary limit switch is shown in detail in Figs. 10 and 11. This device comprises a housing 80, secured, by bracket 80a, to the rear wall of the cluster box of head 3H. Within a bearing 80b, provided by the housing, there is rotatably journaled a cam shaft 80c operatively connected with one of the spindle drivers. Fixed to the shaft 80c to rotate therewith are a plurality of discs 81a, 81b, 81c, and 81d made of fiber or other suitable non-conducting material. Spring pressed contactor fingers 82a, 82c, supported by a contactor block 83, carry rollers 82a' and 82c' adapted to engage the peripheries of the discs 81a and 81c respectively. Similar contactor fingers 82b and 82d, supported by a contactor block 84 at the opposite side of the axis of the shaft 80c, carry rollers 82b' and 82d' adapted to engage the peripheries of the discs 81b and 81d. The contactor blocks 83 and 84 are mounted upon levers 83a and 84a fulcrumed upon studs 83b and 84b, respectively, carried by the switch housing. These levers are adapted, at certain times, to be rocked about their fulcrums thereby alternately to place the contactor rollers into and out of contact with the discs for a purpose later to be described. Within the switch housing 80, and adjacent the lever 84a, there is fulcrumed, at 85a, lever 85, connected at one end by a link 85b with the lever 83a. Adjacent its other end the lever 85 is connected by a link 85c with the lever 84a. A coil spring 85d, connected at one end to the lever 85 and at its other end to a stud 85e carried by the switch housing tends to swing the lever 85 clockwise, as viewed in Fig. 10 and hold it against an adjustable stop 85f. This movement of the lever 85, through the action of the links 85b and 85c turns the levers 83a and 84a clockwise about their fulcrums thereby shifting contact rollers into engagement with the discs. Movement of the levers in the opposite direction, to remove the contact rollers out of engagement with the discs, is effected by a solenoid ROS mounted in the switch housing and having its core connected by a link 85g with one end of the lever 85. The electric circuit for the solenoid ROS embodies a switch CR13a adapted to be closed by a relay CR13 when the boring spindles are rotated forwardly at a high rate. This circuit is maintained by a holding circuit, and the rotary limit switch held ineffective, during the continued forward rotation of the spindles at a low rate preparatory to reversing and stopping.

When the rotation of the spindles is reversed, the circuit to the relay CR13 is broken and the relay de-energized, the switch CR13ª opens, the solenoid ROS is de-energized and spring 85ᵈ shifts the contactors into engagement with the cams, whereupon the rotary limit switch assumes control of the motor 3K and brings it to rest with the boring tools in alignment with the clearance apertures in the spindle bearing bushings.

As shown most clearly in Fig. 12 in which the discs are shown in the position they occupy when the driving motor and the boring tools are at rest, the disc 81ᶜ has an unbroken circular periphery which, when the solenoid ROS is de-energized and the rotary limit switch assumes control, is engaged by the roller 82ᶜ' of the contact finger 82ᶜ thus causing the finger to complete a circuit from the main supply line through switch S6 to the contact fingers 82ª, 82ᵇ, and 82ᵈ which form part of the control circuits of the time relay, and the forward and reverse motor contactors, respectively, and through a relay CR14 which closes switch CR14ª in the time relay circuit. The disc 81ª is provided with a notch 81ª' adapted to receive the roller 82ª' of the contact finger 82ª. When the roller drops into that notch the finger 82ª closes the time relay circuit which, after a predetermined time, sufficient to permit the boring spindles to come to rest in the proper angular position, effects retraction of the tool-head.

The periphery of the disc 81ᵇ, which controls the forward circuit of the motor 3K, is formed with a substantially semi-circular portion 81ᵇ² which when engaged by the roller 82ᵇ' of the contact finger 82ᵇ permits that finger to close the forward circuit, and a larger substantially semi-circular portion 81ᵇ³ which, when engaged by said roller causes the forward circuit to be broken. The two semi-circular portions are connected together by cam surfaces 81ᵇ⁴ adapted to shift the finger 82ᵇ to effect opening and closing of the forward circuit.

Disc 81ᵈ, likewise, is provided with smaller and larger substantially semi-circular peripheral portions 81ᵈ² and 81ᵈ³ connected together by cam portions 81ᵈ⁴ adapted, when engaged by the roller 82ᵈ' of the contact finger to effect, respectively, closing and opening of the reverse circuit.

The operation of the rotary limit switch can best be understood by referring to Fig. 41. Consider that the boring operation is in progress. The spindles are being rotated at a high rate and the tool-head is being advanced at a slow or feeding rate. The coil of relay CR13 is energized and switch CR13ª embodied in the control circuit of the solenoid ROS of the rotary limit switch is closed, the solenoid is energized and the contact fingers are held out of contact with the discs. When the boring operations are completed the dog D18 rides off the plunger of the switch S6 and permits that plunger to rise thereby breaking the forward and high speed circuits and establishing the low speed circuit. Simultaneously with opening of motor contactor FO, switch FOᵇ is closed in the auxiliary control circuit of the reverse contactor REV and the latter also closes. This movement of the switch S6 also closes a circuit leading into the rotary limit switch. Thus the forward circuit is broken and the reverse circuit established. After the forward inertia has been overcome the motor and spindles begin to rotate reversely at a slow rate. Reverse rotation of the spindles causes the friction relay to break the auxiliary circuit to the reverse contactor REV and also the circuit through the relay CR13 whereupon the switch CR13ª is opened, the solenoid ROS de-energized and the contact fingers 82ª, 82ᵇ, 82ᶜ, and 82ᵈ moved into engagement with the discs 81ª, 81ᵇ, 81ᶜ, and 81ᵈ. The finger 82ᶜ immediately makes contact with the supply line regardless of the angular position of the discs and transmits electric current to each of the other contact fingers. Assume that at that instant the roller of contactor finger 82ᵈ is in engagement with the smaller diameter 81ᵈ² of the disc 81ᵈ and the roller of contactor finger 82ᵇ is in engagement with the larger diameter 81ᵇ³ of the disc 81ᵇ. The forward circuit will be broken and the finger 82ᵈ will close the reverse circuit and the motor and the tool spindles will continue to turn reversely. Reverse rotation will continue until the cam portion 81ᵈ⁴ of disc 81ᵈ shifts the contactor finger 82ᵈ to open the reverse circuit. This takes place when the boring tool clears the edge Y of the clearance slot in the spindle bushing. (See Fig. 13.) Should momentum carry the tools out of alignment with the clearance slot and beyond the edge X thereof the roller of contactor finger 82ᵇ rides down the cam 81ᵇ⁴ of the disc 81ᵇ and the contactor finger 82ᵇ closes the forward circuit and the motor and tool spindles are again rotated forwardly. Eventually, that is, after one or more changes in direction, the motor is brought to rest with the discs in the position shown in Fig. 12 in which both the forward and reverse circuits are open and with the boring tools aligned with the clearance apertures in the bearing bushings. A brake, later to be described, is then effective and serves to prevent rotation of the boring spindles.

During oscillation of the motor and the tool spindles the notch 81ª' of disc 81ª passes beneath the roller of contactor finger 82ª. That finger thereupon closes the time relay circuit which, after a predetermined time, energizes solenoid 3A of valve 3V and effects rapid retraction of the tool-head. It will be understood that the time relay provides a sufficient interval of time before retraction of the head is effected to permit the motor and boring bars to be brought to rest.

Brake

The brake hereinbefore referred to, which assists in bringing the motor 3K to rest and which locks the motor shaft and thereby the boring spindles against accidental rotation between machining cycles, may be of conventional form.

A brake suitable for the purpose is sold commercially by Westinghouse Electric & Manufacturing Co., and is known in the trade as "Type AI Magnetic Brake". A device of this nature is shown in Fig. 14 and comprises a base 90, a pair of brake arms 90ª and 90ᵇ pivoted to the base and carrying brake shoes 90ᶜ and 90ᵈ adapted to engage a brake wheel which in the present machine is secured upon the armature shaft of the motor 3K. The shoes are normally forced against the brake wheel by a spring 90ᵉ surrounding a connecting rod 90ᶠ which passes through the arm 90ᵇ and has one end connected with the arm 90ª. The spring 90ᵉ is interposed between the arm 90ᵇ and a nut 90ᵍ threaded on the connecting rod. The arms are swung outwardly, in opposition to the spring 90ᵉ thereby to withdraw the brake shoes out of contact with the brake wheel, by a lever 90ʰ fulcrumed in the arm 90ᵇ and connected with the connecting rod 90f. The free end of the lever 90h is connected with the core of a solenoid CR11. When the solenoid is energized movement of its core wings the lever 90h and releases the brake. When the solenoid is de-energized the spring 90e applies the brake.

Friction relay

The friction relay FR previously referred to, which closes certain circuits when the boring spindles are rotated forwardly and breaks those circuits and closes another when the spindles are rotated in the reverse direction, also may be of conventional form. Such devices are sold, for example, by General Electric Co. and inasmuch as their structural characteristics are well known and form no part of this invention detailed illustration and description thereof is deemed unnecessary.

BORING HEAD MOTOR
Forward and reverse, high and low speed

Fig. 39 illustrates diagrammatically the forward and reverse switches for the boring spindle motor at the head 3H, and their actuating coils. Inasmuch as the various control circuits for the actuating coils FO, REV, HI, and LO are elsewhere explained herein it will suffice to explain here how the various connections of the boring motor are made when certain of the coils are energized.

Reference characters T12, T13, and T14 represent the terminals for the high speed forward and reverse windings of the motor. Characters R1, R2, and R3 represent the terminals of the low speed windings of the motor; and characters L1, L2, and L3 are the main power lines.

When the forward and high speed relays FO and HI are actuated lines L1, L2, and L3 are connected with terminals T12, T13, and T14 respectively and the motor runs forward at relatively high speed; when relays FO and LO are actuated the power lines are connected with terminals R1, R2, and R3 respectively and the motor runs forward at a relatively low speed; to reverse the motor relay FO must be de-energized and relay REV energized. This reverses the connections of certain of the motor windings and the motor is caused to rotate in a reverse direction at high or low speed, depending upon which of the relays HI or LO are actuated.

Drill and pump motors control

Fig. 40 illustrates diagrammatically the starting switches and control circuits for all of the pump and all of the head motors except the boring head motor. The pump motor starters are indicated as A, B, and C, and the spindle motor starters as D, E and F; while G represents a magnetically operated switch that controls an oiler motor. Each of the starters A to F, are of standard conventional form and need be described but briefly. Suffice it to say that each comprises a relay mechanism having an armature wired to close the contacts of a number of switches to complete the electrical circuit to the motor it controls. When the control circuit of the relays are completed, the switches actuated thereby are thrown which connects power lines L1, L2, L3 with the motor terminals T1, T2, and T3 and the motors start operating; when the relay control circuits are broken, for any reason, the switches for the respective motors open and the motors stop.

So that the operator may exercise complete control over the starting or stopping of the several motors at his normal working position, it is expedient to provide each relay with a remote control means in the form of push button switches and group all of these switches at a point local to the operator.

For convenience in operation the push button switches are arranged in separate panels, as indicated in the drawings (Figs. 1 and 40), one panel being the "central control station" on which the main start, stop, hand and automatic control switches are placed which control all the motor starters simultaneously and collectively; and one or more are auxiliary panels on which switches are mounted for controlling the several starter switches independently.

Referring to the diagram, Fig. 40, it will be noted that the power line L1, in addition to being connected with each of the starters A to F, is also connected as by line x1 with one terminal of the "start" switch at the central control station. The "start" switch is normally open and when the button is depressed a circuit is established through lines x1 and x3 and, assuming that the "stop" switch and "automatic" switch are closed, the current continues through line x4 to line x5 where it divides into a plurality of parallel branches x7, x8, x9, x17, x18, x19, and x20 connected respectively to the solenoids of the motor starter switches A, B, C, D, E, F, and G; the other side of each of the solenoids is connected with line x2. Interposed in the respective branch lines above mentioned are control switches A1, B1, C1, D1, E1, F1, and G1, which are adapted to be in closed position when it is desired that the main "start" and "stop" button control the operation of the motors collectively. For example, when the switch A1 is closed, the circuit to the solenoid of relay A is completed through the branch x7, when the switch B1 is closed the circuit to the solenoid of relay B is completed; switch C1 completes the circuit to the solenoid of relay C, etc. For simultaneous operation of any selected number or group of motors, the respective switches A1, B1, etc. are closed and consequently as soon as the main "start" button is depressed the motor starting switches are thrown and the selected pump and/or spindle motors start operating. So that the operator is not required to hold the "start" switch closed, a holding circuit is established therefor simultaneously with the throwing of one of the starter switches. This holding circuit, as shown in Fig. 40, includes an auxiliary switch which is closed whenever the solenoid of the relay C is energized. As illustrated in the drawings a line x3 from the central control station connects with one of the contacts of the auxiliary switch in the relay C. The other contact of the auxiliary switch connects with power line L1 as shown and thus when the relay C is energized by the closing of the "start" button the circuit between x1 and x3 is completed independently of the start button. Should the holding circuit just described be interrupted or broken, the relay C opens and remains open until it is again closed by the actuation of the "start" button.

A convenient and ready means for breaking the holding circuit is provided by a "stop" button at the central control station. This switch normally bridges or establishes an electrical connection between lines x3 and x4, but may be opened at any time to break this circuit.

When the "stop" switch is opened current no longer flows in lines $x4$, $x5$, and the branch lines above referred to, and all relays are de-energized and the starting switches move to their open position. The auxiliary switch at relay C also opens and breaks the holding circuit.

Independent control

When it is desired to operate one or more of the pump or spindle motors independently the "automatic" switch at the central control station is "opened." The opening of that switch breaks the connection between lines $x4$ and $x5$ and in effect cuts out, or renders ineffective, all of the branch connections and switches connected with the line $x5$. The "hand" switch at the central control station is then closed thereby to establish a connection between lines $x1$ and $x6$. Similar to line $x5$, the line $x6$ divides into a plurality of branches each one of which is adapted to be connected with the solenoid of one of the starter switches of the motors in a manner similar to the $x5$ branches previously explained.

Independent switches A2, B2, C2, D2, E2, F2, and G2 are also placed in the respective $x6$ branches and when one or more of same are manually closed the associated relay or relays are actuated and the starter switches thrown as above explained. In this way each motor may be started or stopped at will, or all that are in operation may be stopped merely by the opening of the "hand" switch at the central control station. The "hand" switch as well as the "automatic" switch being in series with the respective sets of parallel connected auxiliary switches at the independent control stations function, it will be seen, as master switches, each one controlling the operation of a plurality of mechanisms.

When the "automatic" switch is open and the "hand" switch closed, thereby rendering the various motor starters selectively operable, the "start" switch and its holding circuit, and the "stop" switch are cut out of the circuit and perform no active part in the controlling of the motors, these switches and holding circuit being effective to control the starting and stopping of the motors only when the automatic switch is closed.

Safety

In the event that the load on any particular motor should increase above a given maximum or the motor become jammed for any reason, safety means have been provided which automatically de-energizes the relays of all motor starters then effective, whereupon the starting switches open and the motors stop.

How the above is effected will be made clear by referring to Figs. 34B, 40, and 41. In these figures it will be noted that a plurality of overload switches OL1, OL2, OL3, OL4, OL5, and OL6; and OL7 and OL8 have been illustrated, one overload switch being associated with each of the motors. (The starters for the motor that drives the boring spindles $3^r$, $f^3$, $3^r$, and $r^3$ embody two overload switches OL7 and OL8, one for the motor at low speeds and one for the motor at high speeds.)

The boring motor overload switches OL7 and OL8 are connected in series between lines $yy$ and L2 and consequently if one of these switches open, as by the motor encountering an excessive resistance, all circuits that are connected with the line $yy$ immediately become ineffective. The following circuits are those effected in this manner,—the control circuits for the motors of heads 1H and 2H, the control circuits for all pumps, the circuits of relay CR10, CR11, CR13, TR2, the circuits to the high speed forward and reverse solenoids HI, FO and REV; one of the circuits to valve shifting solenoid 3B; and the circuit of the solenoid ROS. Consequently all spindle driving motors stop, all pump motors stop and the entire machine comes to rest.

The overload switches OL1, OL2, OL3, OL4, OL5, OL6 associated with the pump and spindle motors of heads 1H and 2H are serially connected between lines $yy$ and $x2$ and consequently if any one of these should open the control switches for the spindle motors of heads 1H and 2H as well as the control switches for all of the pumps automatically open.

Automatic cycle and interlocks

Before the machine may be operated automatically the "automatic" switch at the central control station must be closed, likewise all of the independent automatic selector switches for the motors of the pumps and driller heads must be closed (Fig. 40). The operator then presses the "Start" button and all pumps and drill spindles start operating simultaneously. The Stop-Run switch S/R, (see Figs. 34A and 41) is then closed which puts current in the line $xx$ and the automatic cycle is ready to be started.

I. After assuring himself that all heads are back, the work-transfer devices are down and the temporary work-stops 13 are down, the operator presses the automatic start button AS and energizes control relays CR2 and CR9. If one or more of the heads, transfer devices, or temporary work-stops are not in the position just mentioned, one or more of the serially connected switches S17—S16—S5—S10—S11—S12—S13—S4—S5—S27—S28—S21 will be open, thus breaking the circuit to the start button AS and the pressing thereof has no effect upon relays CR2 and CR9. Relay CR12 must also be open (switch CR12$^b$ closed) to render the starting circuit complete. When the protective switches S17—S16—S15—S10—S11—S12—S13 and CR12$^b$ are closed, the circuit to solenoid J is completed. This solenoid controls the shifting of valve 6V which in turn controls the lowering of the temporary work-stops and when all stops are down limit switch S21 will be closed. Assuming, however, that all of the members are positioned as stated and the relays CR2 and CR9 are energized the following circuits are established.

(a) CR2$^a$ closes establishing holding circuit with line $xx$ through limit switches S17—S16—S15.

(b) CR2$^b$ opens breaking circuit to solenoid F which in part controls the shifting of the work-carrier control valve 4V.

(c) CR2$^{a'}$ closes establishing a portion of the circuit to the valve-shifting solenoids 1A and 2A.

(d) CR9$^a$ closes establishing holding circuit with line $xx$ through the limit switches S17—S16—S15.

(e) CR9$^{a'}$ closes connecting line $xx$ with solenoid E and valve 4V is thereupon shifted to a position causing the carriage to be indexed forward.

II. As the carriage moves forward
 (a) Limit switch S9 opens (see Fig. 38) breaking circuit to valve shifting solenoid G (valve 5V).
 (b) When the carriage reaches the end of its forward movement limit switch S1 closes which completes the circuit to valve shifting solenoid H. Valve 5V is thereupon shifted which, through the mechanism hereinbefore described, effects throwing in of the latches L¹ and elevates the workpieces against the temporary work-stops.

III. When all of the workpieces have been moved against their locating stops (switches S10—S11—S12—S13—S4—S5—S27—S28 are moved to another position and closed) and the heads are back (S17—S16—S15 closed) and stops 13 are down (S19 closed) current from line xx passes through protective switches S17—S16—S15—S19—S10—S11—S12—S13—S4—S5—S27—S28 to relays CR1 and CR6 through the switch CR7ᵇ which at this time is closed.
 (a) CR1ᵃ closes completing circuit to valve shifting solenoid 1A which shifts valve causing head 1H to traverse forward.
 (b) CR1ᵃ' closes and completes the circuit to solenoid 2A and that valve is shifted and head 2H starts forward.
 (c) CR6ᵃ closes and completes the circuit to valve shifting solenoid 3A and the valve is moved causing head 3H to start forward.

Head 1H (a) When head 1H starts forward, switch S15 is thrown to a position which breaks the holding circuit to relays CR2 and CR9 (refer to items I (a) and (d) above) and establishes a portion of the circuit to solenoid F. When the circuit is later completed the solenoid actuates the valve 4V to effect retractive movement of the carriage.

(b) The breaking of the CR2 holding circuit allows switches CR2ᵃ and CR2ᵃ' to open and switch CR2ᵇ to close.

Head 2H

When head 2H starts forward, switch S16 is thrown (breaking the CR2 and CR9 holding circuits) and closes another portion of the circuit to the carriage control valve solenoid F.

Head 3H

When head 3H starts forward, switch S17 is thrown (the CR2 and CR9 holding circuits are broken) and the circuit to the carriage control valve F is completed.

Thus it will be seen that first head to leave its rearmost position causes the holding circuits to CR2 to be broken which closes interlock switch CR2ᵇ, and simultaneously completes a portion of the circuit to solenoid F, meanwhile the other heads wil have started and the last one to start completes the F solenoid circuit and the valve controlled thereby is shifted to a position causing the carriage to start on its return movement. Simultaneously with the breaking of holding circuit for relay CR9, switch CR9ᵃ' opens de-energizing solenoid E which is also connected with the carriage control valve 4V.

Tool-heads 1H and 2H continue their forward movements and perform their normal cycle of operation as elsewhere set forth herein. The boring head 3H, however, in addition to performing its normal cycle, controls other functions of the machine as follows:

IV. Head 3H moves forward until it is stopped by the tripping of the latch of the valve plunger 3V2 by the dog D17.
 (a) Limit switch S18 is closed in this position.
 (b) Switch S6 is down and closes a portion of the circuit to boring motor control relay CR8.
 (c) Valve plunger 3V2 moves up and closes switch 3Aᵇ thus completing the circuit to the valve shifting solenoid K. The control valve 6V actuated by the solenoid K is then moved to a position which permits upward movement of the stops 13 and the workpieces are elevated further to their boring position.
 (d) Upward movement of the stops closes switch S21 and completes a portion of the circuit to relay CR7, and as the workpieces reach their final positions switches S22—S23—S24—S25 are closed and the circuit to relay CR7 is completed, whereupon:—
 (1) Switch CR7ᵇ opens breaking another portion of the circuit to relay CR6.
 (2) Switch CR7ᵃ closes and completes another portion of the circuit to relay CR8. This relay in turn controls starting switches FO and HI of the boring motor, and when both of the switches CR7ᵃ and S6 are closed (S6 down) relay CR8 will be energized whereupon switches CR8ᵃ and CR8ᵃ' will close and CR8ᵇ will open.
 (2a) When CR8ᵃ closes a circuit is completed to the boring motor starting switch FO and the latter is thrown to closed position.
 (2b) When CR8ᵃ' closes a circuit is completed to the boring motor starting switch HI and the latter is also thrown to closed position whereupon the motor runs forward at relatively high speed.
 (2c) When CR8ᵇ opens it breaks the connection between the contactor 82ᵇ of the switch RLS and the motor switch FO.
 (e) Simultaneously with the closing of motor relay switch FO, additional switches FOᵃ and FOᵃ' are closed and switch FOᵇ is opened.
 (1) Switch FOᵃ completes a portion of the circuit to control valve shifting solenoid 3B.
 (2) Switch FOᵃ' completes the circuit to relay CR11 and the brake is released.
 (3) Switch FOᵇ opens and breaks one of the circuits to the motor switch REV.
 (f) When motor relay switch HI closes:—
 (1) Switch HIᵃ (in series with FOᵃ) also closes and completes the circuit to the valve solenoid 3B and the head 3H starts forward at a feeding rate.
 (2) The closing of HIᵃ also completes the circuit to relay CR13 which closes switch CR13ᵃ' and establishes a holding circuit through friction relay FR1, and switch CR13ᵃ which completes the circuit to the solenoid ROS of rotary limit switch RLS whereby RLS is rendered ineffective.

Tool-head 3H is now moving forward at a feed rate and the boring spindles are turning and performing the intended operation. This continues until the tools complete the tooling operation.

Thereafter the following circuits are made or broken. (The carriage encounters the fixed stop FS3.)

(g) The dog D18 rides off the switch S6 and the latter moves to its "up" position which—
     (1) Breaks the circuit to relay CR8. CR8$^a$ opens which opens one of the circuits to motor relay switch FO, CR8$^a{}'$ opens which opens the circuit to motor relay switch HI; CR8$^b$ closes and completes a portion of another circuit to motor switch FO.
     (2) The movement of switch S6 to its "up" position closes the circuit to the contactor 82$^c$ of rotary limit switch RLS and to the low speed motor switch LO, and the boring motor runs at low speed. Since the rotary limit switch RLS may at this moment be maintained in an ineffective position due to the fact that the boring motor and spindles may coast forward by momentum, the rotary switch does not assume control of the stopping of the motor at this moment.
     (3) As the forward switch FO opens a switch FO$^b$ actuated thereby closes and completes one of the circuits to the motor reverse switch REV. (Switch FO$^b$ and friction relay FR are in series when the boring spindles are turning forward. See Fig. 34B).
     (4) As the forward switch FO is opened, switches FO$^a$ and FO$^a{}'$ open further breaking the circuit to valve shifting solenoid 3B, and de-energizing the brake control relay CR11 respectively, and the brake goes "on".
     (5) The closing of the reversing switch REV
      (a) Puts current in the reverse windings of the boring motor 3K.
      (b) Closes switch REV$^a$ which is also in the circuit to relay CR11 and the brake goes "off".
   (h) As soon as the boring motor stops forward rotation and starts its reverse movement the friction relay FR moves to its other effective position which:—
     (1) Breaks the holding circuit to relay CR13 and the relay opens.
     (2) Breaks the circuit to motor reverse switch REV which opens; switch REV$^a$ opens and de-energizes brake control relay CR11.
   (j) The opening of relay CR13 (refer to h1 above) deenergizes solenoid ROS of the rotary limit switch RLS and the contactors 82$^a$, 82$^b$, 82$^c$, and 82$^d$ are moved against their respective cams. Thereupon contactor 82$^c$ immediately closes the circuit to relay CR14 and switches CR14$^a$ and CR14$^a{}'$ are closed.
     (1) The closing of switch CR14$^a$ completes a portion of the circuit to the boring motor reversing switch REV and the motor switch will be thrown (causing the boring motor to run in a reverse direction) whenever the circuit thereto is completed by the operation of the rotary limit switch RLS which is driven in timed relation with the movement of the boring spindles. Should the rotary switch be in a position such that motor switch FO is or remains in its effective position, the motor continues forward movement, or should the rotary switch at that instant be in a position rendering the motor switch REV effective then the motor will be driven in the reverse direction. This alternate forward and reverse movement of the motor, assisted intermittently by an application of the brake, shortly brings the spindles to rest in a predetermined angular position. Both switches FO and REV being in an ineffective position and the switches FO$^a{}'$ and REV$^a$ respectively opening the circuits to the relay CR11 which applies the brake to lock the spindles in their proper position with the tools in alignment with the clearance apertures in the bearing bushings.
     (2) During oscillation of the rotary switch, the contactor 82$^a$ intermittently completes the circuit to the timing relay TR2, through switches S14 and CR14$^a{}'$, which at that time are, ordinarily, closed, and the timing relay TR2 thereupon repeatedly starts operating and is repeatedly reset. When the spindles come to rest with the tools in the correct position, contact 82$^a$ closes and remains closed. The timing relay TR2 starts operating and after a definite interval of time the time relay closes the circuit to a relay CR10, thereupon switch CR10$^a$ closes and completes the circuit to valve shifting solenoid 3A and the valve plunger is moved downwardly and automatically latched in position. When this occurs the head 3H will move rapidly in the reverse direction withdrawing the tools from the workpieces. Upon the return movement of the head the one-way acting dog D18 rides over the switch S6 without again actuating it.
   (k) As the tool-head 3H nears its rearmost position the dog D21 opens switch S14; dog D20 moves switch S17 to its other effective position, and the double dog D16 trips the latches 34 and 35 of the control valve 3V.
     (1) The opening of switch S14 breaks the circuit to the timing relay TR2. Relay CR10 opens and de-energizes valve shifting solenoid 3A.
     (2) Movement of switch S17 to its other effective position completes a portion of the starting circuit and holding circuits hereinbefore explained, and also a portion of the circuit to solenoid G which controls the shifting of the valve 5V.
     (3) The tripping of the latches 34 and 35 of the valve 3V allows the valve plungers to move to their up position thereby stopping the movement of the tool-head. The opening of switch S14, it is to be noted, prevents the head from restarting at the end of rapid traverse reverse movement. (Refer to (k1) above.)
     (4) When the solenoid ROS is energized, as by the closing of relay CR13 (Refer to j above) the contactors 82$^a$, 82$^b$, 82$^c$ and 82$^d$ are moved away from their respective cams, consequently relay CR14 will be de-energized and switches CR14$^a$ and CR14$^a{}'$ opened breaking up back circuits.
   (l) When all of the heads 1H, 2H and 3H, have reached their rearmost positions the switches S15, S16, and S17 will be thrown, and when the work-carriage W is in its retracted position (see Fig. 38) the switch S9 will be closed. Upon the closing of all of these four switches the circuit is completed to the solenoid G of valve 5V. The valve is thereupon shifted to a position such that the latches L are withdrawn, the final movement of which opens a valve 7V and the work elevators 3M, 11c, etc. start moving downward. Should any of the tool-heads or the work-carriage be in a position such that any of the respective switches controlled thereby remain open, the circuit to solenoid G is not completed and the valve 5V will not be shifted.

(m) As the work-pieces in the core reaming stations leave their "up" position, switches S10, S11, S12, and S13 are actuated and complete a circuit (also through switches S17, S16 and S15) to solenoid J. When the solenoid J is energized the valve 6V is shifted and the stops 13 at the boring stations are lowered, and when all stops are down, limit switch S21 is closed.

(n) As the work-pieces in the boring stations leave their "up" position, switches S4, S5, S27, and S28 are closed. This completes the circuit through switches S15, S16, S17, S10, S11, S12, S13, CR12b, S4, S5, S27, S28, and S21 to the start button AS and the next automatic cycle of the machine may be started by again pressing the start button AS.

From the foregoing it will be perceived that once the machine organization is set up and started, its operation is completely automatic and the continuity of action remains unbroken during a normal cycle. Occasionally there may be a condition where less than the machine's full complement of workpieces are to be machined and under such conditions certain of the automatic controls will not be rendered effective. Means have been provided, however, for running one or any number less than the full complement of workpieces through the machine as will now be explained.

*Manual control*

Referring to the diagrammatic Figs. 34A and 34B the characters L1 and L2 represent the main power lines leading to the automatically controlled and operated devices embodied in this machine. With the exception of one electrical circuit, namely, the brake circuit, the electric current to all of the controlling devices must first pass the main switch S/R. This switch controls the interlocking controls of the various hydraulic motors and also the boring head motor which is started in sequence with other functions of the machine, and whenever the machine is to be operated automatically the switch S/R must be closed.

Now, when the Stop-Run switch S/R is open, all circuits which control automatically the movements of the hydraulic control valves and the boring motor switches are rendered ineffective, and when the "Stop" switch at the central control station (Fig. 40) is open all automatic control circuits for the control switches of the pump motors and spindle motors of heads 1H and 2H are rendered ineffective. Thus to stop the entire machine both Stop switches must be opened.

Under these conditions the heads may be actuated independently of collectively under the control of the operator by first closing all of the globe valves GV which control the flow of fluid to the various hydraulic motors; next, at the central control station depress the "Hand" button which transfers the control of the pump motors and spindle motors of heads 1H and 2H to the independently operable selector switches A2, B2, C2, D2, E2, F2 and then start the proper pump or spindle motor by pressing the proper selector switch; the next step is to operate the various hydraulic control valves manually to obtain the desired movement and thereafter open the proper globe valves.

*Loading and unloading*

To facilitate loading and unloading operations a push button control switch "Up-Down" Fig. 34A is provided and so connected in the circuits that whenever the "Up" switch is pressed the relay CR12 is energized. The relay CR12 closes switch CR12a which establishes a holding circuit through the "Down" button, closes CR12a' and CR12a'', and opens switch CR12b. The opening of the last mentioned switch breaks the circuit to the "Start" button and renders same ineffective to start the automatic cycle. (Normally the pressing of the "Start" button starts the index traverse forward.) The closing of switch CR12a' completes a circuit around the protective limit switches S10—S11—S12—S13—S4—S5—S27—S28, and the switch CR12a'' completes a circuit around switches S22—S23—S24—S25 which are operated by the final upward movement of the workpieces. When the "Down" button is depressed the holding circuit for the relay CR12 is broken, CR12b closes, and CR12a, CR12a', and CR12a'' open whereupon the protective switches above mentioned and the "Start" button are again cut into the circuit. However, to avoid inconsistent movements the "Up" button should not be depressed until all workpieces have been moved up, and the "Down" button should not be depressed until all of the workpieces are in their down position.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention, and, therefore, such adaptations should be, and are intended to be, comprehended within the meaning and range of equivalency of the following claims:—

Having thus revealed this invention, we claim as new and desire to secure the following combinations and elements, or equivalents thereof, by Letters Patent of United States:—

1. A machine tool combining a main frame; a plurality of sub-frames extending laterally therefrom and to opposite sides thereof; a tool head slidingly mounted on each of said subframes; a plurality of sets of tools carried by each tool head; a work-carrier extending lengthwise of said main frame; means to give said work-carrier indexing movements simultaneously to present a plurality of workpieces to each of said tool heads; a plurality of work-holders supported by said main frame above said work-carrier adjacent each of said tool heads; a work elevator located beneath each of said work-holders and adapted to lift a workpiece off said work-carrier and place it in one of said work-holders; means to cause said tools to operate on said workpieces while in said holders; and means to cause said work elevators to replace the workpieces on said work-carrier for advance by a subsequent indexing movement.

2. A machine tool combining a main frame; a plurality of sub-frames extending laterally therefrom; a tool head slidingly mounted on each of said sub-frames; a tool carried by each tool head; a work-carrier extending lengthwise of said main frame; hydraulic means to give said work-carrier indexing movements to present a workpiece successively to said tool heads, a work-holder supported by said main frame above said work-carrier adjacent each of said tool heads; a hydraulically actuated work elevator located beneath each of said work-holders and adapted to lift a workpiece off said work-carrier and place it in one of said work-holders; means controlled by the positioning of the workpieces in the work-holders to cause said tools to operate on said workpieces while in said holders; and means to cause said work elevators to replace the workpieces on said work-carrier for advance by a subsequent indexing movement.

3. A machine tool combining a pedestal; a plurality of sub-frames extending laterally therefrom; a tool head slidingly mounted on each of said sub-frames; hydraulic means to reciprocate said tool heads; a tool carried by each tool head; a work-carrier extending lengthwise of said main frame; hydraulically actuated means to give said work-carrier indexing movements successively to present a workpiece to said tool heads, a work-holder supported by said main frame above said work-carrier adjacent each of said tool heads; a hydraulically actuated work elevator located beneath each of said work-holders and adapted to lift a workpiece off said work-carrier and place it in one of said work-holders; means controlled by the positioning of the workpieces in the work-holders to cause said tools to operate on said workpieces while in said holders; and means to actuate said work elevators to cause them to replace the workpieces on said work-carrier for advance by a subsequent indexing movement.

4. A machine tool combining a main frame; a plurality of opposed tool heads slidingly mounted thereon; a plurality of sets of tools carried by each tool head; a work-carrier extending lengthwise of said main frame between said tool heads, means to give said work-carrier indexing movements successively to present a plurality of workpieces to each of said tool heads, a work-holding fixture supported by said main frame above said work-carrier adjacent each of said tool heads; a work elevator located beneath each of said fixtures and adapted to lift a workpiece off said work-carrier and place it in one of said fixtures; means controlled by the positioning of the workpieces in the fixtures to cause said tools to operate on said workpieces while in said fixtures; and means to cause said work elevators to replace the workpieces on said work-carrier for advance by a subsequent indexing movement.

5. In a machine tool a work-carrier; a work-holding fixture adjacent said carrier and at one side thereof; means to give said work-carrier an indexing movement to move a workpiece adjacent to said fixture; a work-transfer device located at the side of said work-carrier remote from said fixture and movable transversely of said carrier, said transfer device being adapted, when said work-carrier comes to rest, to remove a workpiece from said work-carrier and to place it into said fixture; a tool adapted to operate upon a workpiece in said tool-holder; hydraulic means for actuating said tool; and electrically actuated means controlled by the movement of the workpiece into said work-holder to control said hydraulic means.

6. In a machine tool a work-carrier; work-locating means on said work-carrier; a work-holding fixture adjacent said carrier and at one side thereof; means to give said work-carrier indexing movements first to move a workpiece adjacent to said fixture and subsequently to remove it therefrom; a work-transfer device adjacent said fixture and movable transversely of said work-carrier and between the indexing movements of said work-carrier, to remove a workpiece from said work-locating means and to place it into said fixture; a tool adapted to operate upon a workpiece in said work-holder; means to actuate said tool; and electrically actuated means to control the actuation of said tool, including an electric circuit and a switch adapted to be closed by the movement of the workpiece into the work-holder.

7. In a machine tool a work-carrier; work-locating studs on said work-carrier adapted to engage apertures in the workpiece; a work-holding fixture adjacent said carrier and at one side thereof; means to give said work-carrier reciprocatory movements first to move a workpiece adjacent to said fixture on one forward reciprocation and subsequently to remove it therefrom by the next succeeding forward reciprocation; a work-transfer device movable transversely of said work-carrier and adapted, when said work-carrier comes to rest after a forward reciprocation, to remove a workpiece from said work-locating studs and to place it into said fixture; a rotary tool adapted to operate upon a workpiece in said work-holder; electrically actuated means to rotate said tool; hydraulic means to reciprocate said tool; and electrically actuated means to control said hydraulic means, including an electric circuit and a control switch therefor adapted to be closed by the movement of the workpiece into the work-holder.

8. In a machine tool a reciprocatory work-carrier; a work-holding fixture adjacent said carrier and at one side thereof; a hydraulic means to give said work-carrier indexing movements first to move a workpiece adjacent to said fixture and subsequently to remove it therefrom; a hydraulically actuated work-transfer device movable transversely of said work-carrier and adapted, when said work-carrier comes to rest at the end of a forward reciprocation, to remove a workpiece from said work-locating means and to place it into said fixture and subsequently to replace the workpiece on said work-carrier, in a position in advance of its former position, when said work-carrier is retracted; and means adapted to be rendered effective by the movement of the workpiece into the work-holding fixture to effect a machining operation on said workpiece while it is held in said fixture.

9. A machine tool combining an indexible work-carrier; a plurality of work-locating devices carried thereby, adapted to carry workpieces; a plurality of machining stations located along and at opposite sides of said work-carrier; a work-holder in each of said machining stations; means to index said work-carrier to cause it to place a workpiece in each of said stations; a transfer device in each of said stations; hydraulically actuated means operable after an indexing movement of said work-carrier to advance said transfer devices to cause each of them to transfer a workpiece from said work-carrier into one of said work-holders; a tool in each of said machining stations; combined electric and hydraulic means rendered effective by the movement of the workpieces into the work-holder to cause each tool to operate on a workpiece while it is held in one of said work-holders; and means operable after the machining operation has been completed to retract said work-transfer devices to cause them to replace the workpiece on said work-carrier for subsequent advance to the next machining station.

10. A machine tool combining an indexible work-carrier comprising a pair of spaced apart slide-bars; hydraulic means for reciprocating said slide-bars; a plurality of machining stations located along said work-carrier; a work-holder in each of said machining stations above said work-carrier; means to index said work-carrier to place a workpiece in each of said stations; a transfer device located below said work-carrier and between said slide-bars in each of said machining stations; hydraulically actuated means operable after an indexing movement of said work-carrier to elevate said transfer devices to cause each of them to transfer a workpiece from said work-carrier into one of said work-holders; a tool in each of said work-stations; means to cause each tool to operate on a workpiece while it is held in one of said work-holders; means operable after the machining operation is completed to lower said work-transfer devices to cause them to replace the workpieces carried thereby on to said work-carrier for subsequent advance by the next indexing movement of said work-carrier.

11. In a machine tool a work-carrier comprising a pair of spaced apart slide-bars; a work holding fixture adjacent said carrier; a work-transfer device movable transversely to the movement of said work-carrier; hydraulically actuated means to give said work-carrier an indexing movement to move a workpiece carried thereby into the path of movement of said work-transfer device; hydraulically actuated means to advance said work-transfer device to cause it to remove a workpiece from said work-carrier and place it in said fixture; means supplemental to the last named means to retain said transfer device in advanced position; and a tool adapted to operate on said workpiece while it is held in said fixture by said work-transfer device.

12. In a machine tool a work-carrier; a work holding fixture adjacent said carrier; a work-transfer device movable transversely to the movement of said work-carrier; means to give said work-carrier an indexing movement to move a workpiece carried thereby into the path of movement of said work-transfer device; means to advance said work-transfer device to cause it to remove a workpiece from said work-carrier and place it in said fixture; a latch device rendered effective by the advance movement of said transfer device to retain said transfer device in advanced position; a tool adapted to operate on said workpiece while it is held in said fixture by said work-transfer device; means to render said latch device ineffective to hold said work-transfer device advanced; and means to retract said transfer device to replace the workpiece on said work-carrier.

13. In a machine tool a work-carrier; a work holding fixture adjacent said carrier; a work-transfer device movable transversely to the movement of said work-carrier; means to give said work-carrier an indexing movement to move a workpiece carried thereby into the path of movement of said work-transfer device; hydraulically actuated means to advance said work-transfer device to cause it to remove a workpiece from said work-carrier and place it in said fixture; a spring pressed latch device adapted to engage a portion of said transfer device to retain it in advanced position; a tool adapted to machine said workpiece while it is held in said fixture by said work-transfer device; hydraulic means operative after the machining operation is completed to disengage said latch device from said transfer device; and means to retract said transfer device thereby to replace the workpiece on said carrier.

14. A machine tool combining a frame; a work-carrier translatable thereon; a work holding fixture adjacent said carrier; a work-transfer device movable transversely to the movement of said work-carrier means to give said work-carrier an indexing movement to move a workpiece carried thereby into the path of movement of said work-transfer device; means comprising a hydraulic motor supported by said frame to advance said work-transfer device to cause it to remove a workpiece from said work-carrier and place it in said fixture; a plurality of spring pressed latch levers adapted to engage said work-transfer device to retain it in advanced position; a tool adapted to perform a machining operation on said workpiece while it is held in said fixture by said work-transfer device; a plurality of rods reciprocably mounted in said frame; a collar on each rod adapted to engage one of said latch levers; an hydraulic motor operatively connected with said rods; means operative after the completion of said machining operation to actuate said hydraulic motor to cause said rods to release said work-transfer device; and means thereafter to retract said transfer device to replace the workpiece on said carrier.

15. A machine tool for machining cylinder blocks combining a reciprocable work-carrier; a plurality of work-locating devices carried thereby, said devices being spaced apart lengthwise of said work-carrier and adapted to carry cylinder blocks; a plurality of machining stations located along said work-carrier; a work-holder in each of said machining stations; means to index said work-carrier to carry a cylinder block successively to said stations; a transfer device in each of said stations, said transfer devices each comprising a reciprocatory plunger having a portion adapted to engage within a bore of said cylinder block means to advance said transfer devices to cause each of them to transfer a workpiece from said work-carrier into one of said work-holders; a tool in each of said work-stations; and means to cause each tool to operate on a workpiece while it is held in one of said work-holders.

16. A machine tool comprising a main frame; a work-carrier movable lengthwise thereof; a plurality of machining stations arranged along said work-carrier; means to give said work-carrier indexing movements to present workpieces successively to said machining stations; a work-holding fixture supported from said main frame at each of said machining stations, said fixtures being located above said work-carrier; work-transfer means in each of said stations to lift a workpiece from said work-carrier and place it in said work-holding fixture; a rotatable and reciprocable tool spindle in each of said stations; a plurality of bearings for each of said spindles provided by each of said fixtures, said bearings being spaced apart in the direction of the axes of the spindles and located intermediate portions of the work to be machined; and means to coordinate the movements of said work-carrier and said work-transfer means.

17. A machine tool for machining cylinder blocks combining an indexible work-carrier; a plurality of work-locating devices carried thereby, said devices being spaced apart lengthwise of said work-carrier and having portions adapted to fit into bores in said cylinder blocks; a plurality of machining stations located along said work-carrier; a work-holder in each of said machining stations at one side of said work-carrier; means to index said work-carrier to carry a cylinder block successively to said stations; a transfer device in each of said stations said transfer devices each comprising a reciprocatory plunger having a portion adapted to engage within a bore of said cylinder block; hydraulically actuated means to advance said transfer devices to cause them to transfer a workpiece from said work-carrier into one of said work-holders; a tool in each of said work-stations; and means to cause each tool to operate on a workpiece while it is held in one of said work-holders.

18. A machine tool for machining cylinder blocks combining an indexible work-carrier adapted to carry cylinder blocks; a plurality of machining stations located along said work-carrier; a work-holder in each of said machining stations; means to index said work-carrier to carry a cylinder block successively to said stations; a work-transfer device in each of said stations; said transfer devices each comprising a reciprocatory plunger adapted to engage said cylinder block; means to advance said transfer devices to cause them to transfer a cylinder block from said work-carrier into one of said work-holders; means to maintain the cylinder block in said work-holder; a tool in each of said work-stations; and means controlled by the movement of a cylinder block into a work-holder to cause each tool to operate on a cylinder block while it is held in one of said work-holders.

19. A work-indexing means for machine tools comprising a pair of reciprocatory slide-bars provided with a plurality of spaced sets of work-locating devices; hydraulic means acting on one of said slide-bars and a mechanical connection between that slide-bar and the other slide-bar to give to said slide-bars an advancing movement thereby to advance a workpiece carried thereby; means located and operating between said slide-bars to remove said workpiece from said work-carrier; means operative after the removal of the workpiece to effect retraction of said work-carrier the retractive movement of said work-carrier corresponding to the spacing of said work-locating devices whereby an advanced set is placed beneath said workpiece; and means thereafter to place the workpiece on said advanced set of work-locating devices for a further advance by the next advancing movement of said slide-bars.

20. A work-indexing means for machine tools comprising a reciprocable work-carrier including a pair of spaced slide-bars, each provided with a plurality of sets of work-locating devices spaced apart lengthwise thereof; hydraulically actuated means connected with one of said slide-bars and a rack and pinion connection between said slide-bars to give said work-carrier an advancing movement thereby to advance a workpiece carried by one set of said work-locating devices; hydraulically actuated transfer means adapted to remove said workpiece from said pair of work-locating devices; control means for the first mentioned hydraulic means thereafter to effect retraction of said work-carrier after the removal of the workpiece; and means to cause said transfer means to replace the workpiece on said work-carrier in engagement with an advanced set of work-locating devices.

21. In a machine tool, a rotatable and translatable tool spindle; a tool carried thereby; means to translate said spindle; means including a reversible high and low speed motor to rotate said spindle in forward and reverse directions at high and low speeds; forward and reverse control circuits for determining the direction of rotation of said motor; high and low speed control circuits for determining the rate of rotation of said motor; means actuated by the forward translation of said spindle to render the high speed circuit effective; means actuated by further translation of the spindle to break the high speed circuit and to make the low speed circuit; and auxiliary control means, rendered effective by the last named means, adapted to assume control of the forward and reverse circuits and alternately to render them effective and finally to bring the motor and spindle to rest with the tool in a predetermined angular position.

22. A machine tool as set forth in the preceding claim in which the auxiliary control means includes a plurality of switches in said forward and reverse control circuits; a plurality of rotary cams, rotated in timed relation with the rotation of said spindle, each adapted to actuate one of said switches, two of said cams being so constructed and arranged that in one position thereof both the forward and the reverse circuits are open and the motor is brought to rest.

23. In a machine tool, a rotatable and translatable tool spindle; a tool carried thereby; means to translate said spindle; means including a reversible variable speed electric motor to rotate said spindle in forward and reverse directions at rapid and slow rates; means actuated by the forward translation of said spindle to cause rapid forward rotation of said spindle; means actuated by further translation of said spindle to reduce the rate of rotation of said motor; auxiliary means rendered effective by the last named means to control the direction of rotation of said motor and to arrest its rotation with said tool in a predetermined angular position; and means controlled by said auxiliary means to effect retraction of said tool spindle.

24. A machine tool as set forth in the preceding claim in which the auxiliary control means includes a forward electric circuit, a reverse electric circuit, an electric circuit which controls the retraction of said spindle, a switch in each of said circuits, a plurality of rotary cams, rotated in timed relation with said spindle and each adapted to control one of said switches, said cams being so constructed and arranged that in one position thereof both the forward and the reverse circuits are open and the motor is brought to rest and the circuit which effects retraction of the spindle is closed and effects retraction of the spindle.

25. A machine tool combining a plurality of machining stations; a translatable tool head at each of said stations; an hydraulic motor for translating each of said tool heads; an individual hydraulic system for actuating each of said motors; an indexible work-carrier for presenting workpieces to the action of tools carried by said tool heads; a work-holder in each of said machining stations; work-transfer devices for removing workpieces from said work-carrier and placing them in said work-holders; latch devices for holding said workpieces in said holders; a single hydraulic system for actuating said work-carrier, work-transfer devices and said latches; and means to coordinate the movements of said devices.

26. A machine tool combining a reciprocable tool head; a tool carried thereby; an hydraulic motor for effecting reciprocations of said tool head; an hydraulic system for actuating said motor; a work-carrier; a work-holder; means to index said work-carrier to place workpieces beneath said work-holder; a work-transfer device adapted to remove a workpiece from said work-carrier and place it in said work-holder for actuation thereon by the tool carried by said tool head; latch devices to maintain said workpieces in said work-holders during the operation of said tool; and a single hydraulic system for actuating said work-carrier, work-transfer device and said latch means.

27. In a machine tool having a plurality of relatively movable head members, work transfer members, power transmissions for moving said members and control means for the said transmissions, the combination of a plurality of electrically controlled and operated devices for actuating said control means including a control relay; a starting circuit and a holding circuit for said relay; a plurality of switches in said starting circuit, one of said switches being associated with each of said relatively movable members and adapted to be closed thereby when the respective member is moved to a predetermined position, a start switch in said starting circuit for said relay adapted when in closed position concurrently with said first mentioned switches to render said relay operative to establish said holding circuit and to effect actuation of the control means of said power transmissions thereby to effect movement of said members; and means for rendering said starting circuit ineffective irrespective of the positions of said movable members.

28. In a machine tool having a plurality of relatively movable members including a tool head and work-transferring member, power transmissions for moving said members and control means for each of the said transmissions, the combination of a plurality of electrically controlled and operated devices for actuating said control means including a control relay mechanism; a starting circuit and a holding circuit for said relay mechanism; a plurality of switches in said starting circuit, one of said switches being associated with each of said relatively movable members and adapted to be closed thereby when the respective member is moved to a predetermined position, a start switch in said starting circuit adapted when in closed position concurrently with said first mentioned switches to render said relay mechanism operative to establish said holding circuit and to effect actuation of the control means of the power transmission for said tool head; and means operative upon the movement of said tool head from said predetermined position to break the holding circuit and render said relay mechanism ineffective.

29. In a machine tool having a plurality of relatively movable members, power transmissions for moving said members and control means for the said transmissions, the combination of a plurality of electrically controlled and operated devices for actuating said control means including a control relay mechanism; a starting circuit and a holding circuit for said relay mechanism; a plurality of switches in said starting circuit, one of said switches being associated with each of said relatively movable members and adapted to be closed thereby when the respective member is moved to a predetermined position, and a start switch in said starting circuit adapted when in closed position concurrently with said first mentioned switches to render said relay mechanism operative to establish said holding circuit and to effect actuation of the control means of said power transmissions thereby to effect movement of one of said members; and means operative upon the movement of one of another of said members from said predetermined position to break said holding circuit and render said relay mechanism ineffective.

30. In a machine tool having a plurality of relatively movable members including a translatable head member, a work-transferring mechanism, and work locating devices and power transmissions for effecting movement of said elements, the combination of controlling devices for said transmissions; a plurality of electrically actuated controls and control circuits for said devices including a starting circuit; a self-opening starting switch and a plurality of limit switches in said circuit, each of said limit switches being adapted to be moved to a closed position by one of said members thereby completing a portion of the said starting circuit; a branch circuit rendered effective upon the closing of one of said limit switches to effect movement of said work locating devices which in turn effects closing of another of said limit switches; and means rendered effective upon the closing of all of the said switches in said starting circuit to render the power transmissions for said head member operative.

31. In a machine tool having a plurality of relatively movable members and power transmissions for effecting movement of said members, the combination of controlling devices for said transmissions; a plurality of electrically actuated controls for said devices including a starting circuit, a self-opening starting switch and a plurality of limit switches in said circuit, each of said limit switches being adapted to be moved to a closed position by one of said members thereby completing a portion of the said starting circuit; a relay mechanism including a holding circuit rendered effective upon the completion of said starting circuit; means controlled by said relay for rendering one of said power transmissions operative to move one of said members; means normally effective to maintain the said transmission operative; and means controlled by the movement of said last mentioned member for interrupting said holding circuit thereby to render said relay mechanism ineffective.

32. In a machine tool having a plurality of translatable head members, a translatable work carriage, a plurality of movable work-transferring devices and means for locking said devices in an operative position the combination of means for coordinating the movements of said elements comprising a plurality of electrically operated control devices for said elements, control circuits for said devices, means operative when said head members are in a predetermined position for completing the circuit to the control devices for said work carriage, thereby to effect a forward movement of said carriage; means actuated by the movement of said carriage for effecting movement of said work-transferring devices and for rendering said locking devices effective, means controlled by the movement of said work-transferring devices for completing the circuit to the control devices for said head members thereby to effect movement of said members after the workpieces have been translated, transferred and locked in position.

33. The combination set forth in the preceding claim characterized by the provision of means controlled by the movement of said head members for effecting a return movement of said carriage.

34. In a machine tool having a translatable carrier and power means for translating the carrier the combination of means for controlling the action of said power means including a rate and direction control valve mechanism operable to effect movement of the carrier selectively in a forward or reverse direction at a feed or a traverse rate, said valve mechanism comprising two valve elements having a plurality of positions in which they cooperate to provide passages for the desired actuation of the carrier; means for actuating said valve mechanism comprising a pair of solenoids one for each valve element, control circuits for said solenoids, means actuated by one of said solenoids for effecting the completion of a portion of the control circuit to another of said solenoids, and means actuated by the movement of said carrier for completing the control circuit of said second mentioned solenoid thereby to effect actuation of its valve element and a change in the valve mechanism to effect the action of said power means.

35. In a machine tool having a rotatable and translatable spindle, power means for rotating and translating said spindle selectively in forward and reverse directions the combination of means for stopping the forward translation of said spindle; means controlled by the translatory movement of said spindle to effect stopping of the rotation thereof in a predetermined angular position including a rotary limit switch, driving means for said switch, a plurality of relays controlled by said switch, one of said relays being adapted to control the forward rotation of said spindle, and one of said relays being adapted to control the reverse rotation of said spindle; and means controlled by said limit switch to effect a reversal in the translatory movement of said spindle a predetermined time after the rotation thereof has ceased.

36. A machine tool having a rotatable spindle normally having a predetermined angular position of rest, power means for rotating said spindle selectively in forward and reverse directions combining means controlled by the movement of said spindle for alternately effecting reversals in the direction of rotation of said spindle comprising a rotary limit switch, driving means for said switch, a plurality of relays controlled by said switch, one of said relays being adapted to control the forward rotation of said spindle, and one of said relays being adapted to control the reverse rotation of said spindle; and means controlled by said limit switch to effect alternately forward and reverse movements of said spindle and to bring it to rest in said predetermined angular position.

37. In a machine tool having a rotatable tool spindle, power means for rotating said spindle in forward or reverse direction and control devices for said power means the combination of a brake mechanism normally effective to retard the movement of said spindle and to maintain said spindle in a predetermined position; means driven by said power means for rendering said power means and brake means alternatively effective and ineffective; and means effective upon the actuation of the control devices to a stop position thereby to render said last mentioned means effective to control said brake and power means; and means responsive to an overloading of said power means for rendering said brake mechanism effective.

38. In a machine tool having a spindle having a predetermined position of rest combining means for stopping the rotation of said spindle in said predetermined angular position comprising a reversible motor; a forward and a reverse switch for controlling the actuation of said motor; a rotary switch driven by said spindle, said switch embodying a plurality of contact elements, two of which when closed control the actuation of said forward switch, and others of which when closed control the actuation of said reverse switch; and means cyclically closing and opening selected pairs of said contact elements to cause alternate actuation of said forward and reverse switches and thereby oscillation of said motor; and means controlled by said rotary switch and operable at points intermediate the points of closing of the said pairs of contact elements for applying a braking force on said spindle.

39. A machine tool having a spindle to be driven and subsequently stopped in a predetermined angular position combining means for stopping the rotation of said spindle in said predetermined angular position comprising a reversible motor; a forward and a reverse switch for controlling the actuation of said motor; means actuated in timed relation with the angular movement of said spindle to effect alternate closing and opening of said motor switches thereby to effect reversal in the direction of rotation of said spindle; a normally ineffective braking device associated with said spindle; and means for rendering said braking device operative at points intermediate the opening and closing of said motor switches for the purpose of overcoming spindle inertia.

40. In a machine tool having a plurality of independently movable head members and independently operable self-contained power transmissions for each member including a separate prime mover and control means therefor, a support member movable relative to said head members selectively in forward and reverse directions and a separate power transmission for said support, the combination of control means for the power transmission for said support adapted when actuated to render the transmission operative to move said support; and means rendered effective by the movement of all of said head members rearwardly to a given position for rendering the power transmission to said support operative to move said support in a forward direction; and means operative by the movement of all of said head members forwardly from said given position to effect movement of said support in its reverse direction.

ROBERT A. SCHAFER.
CHAS. H. MUHL.
EARL E. OPEL.
JOHN B. BEISSMAN.

CERTIFICATE OF CORRECTION.

Patent No. 2,108,779.   February 15, 1938.

ROBERT A. SCHAFER, ET AL.

It is hereby certified that error appears in the printed specification of the above numbered patent requiring correction as follows: Page 6, first column, line 8, for the word "presents" read prevents; page 18, first column, line 3, for "wings" read swings; and that the said Letters Patent should be read with these corrections therein that the same may conform to the record of the case in the Patent Office.

Signed and sealed this 10th day of May, A. D. 1938.

(Seal)

Henry Van Arsdale,
Acting Commissioner of Patents.